(12) United States Patent
Mizutani et al.

(10) Patent No.: US 6,892,587 B2
(45) Date of Patent: May 17, 2005

(54) ROTATION DETECTING DEVICE AND WHEEL SUPPORT BEARING ASSEMBLY UTILIZING THE SAME

(75) Inventors: Masatoshi Mizutani, Iwata (JP); Eiji Tajima, Iwata (JP); Hisashi Ohtsuki, Iwata (JP); Takayuki Norimatsu, Iwata (JP); Koichi Okada, Iwata (JP); Toru Takahashi, Iwata (JP); Hiroaki Ohba, Iwata (JP); Katsuyuki Ikei, Iwata (JP)

(73) Assignee: NTN Corporation, Osaka (JP)

( * ) Notice: Subject to any disclaimer, the term of this patent is extended or adjusted under 35 U.S.C. 154(b) by 154 days.

(21) Appl. No.: 10/382,505

(22) Filed: Mar. 7, 2003

(65) Prior Publication Data
US 2004/0105602 A1 Jun. 3, 2004

(30) Foreign Application Priority Data

| Mar. 8, 2002 | (JP) | .................................... | 2002-064070 |
| Mar. 18, 2002 | (JP) | .................................... | 2002-073501 |
| Mar. 22, 2002 | (JP) | .................................... | 2002-080085 |
| Mar. 29, 2002 | (JP) | .................................... | 2002-094097 |

(51) Int. Cl.$^7$ .............................................. G01L 3/02
(52) U.S. Cl. .............................................. 73/862.193
(58) Field of Search ..................... 73/862.192, 862.321, 73/862.322, 862.331

(56) References Cited

U.S. PATENT DOCUMENTS

| 4,011,551 A | * | 3/1977 | Adler ..................... 340/870.28 |
| 4,059,993 A | * | 11/1977 | Greene ..................... 73/178 R |
| 6,513,394 B1 | * | 2/2003 | Gutjahr et al. ......... 73/862.324 |

* cited by examiner

Primary Examiner—Max Noori

(57) ABSTRACT

To provide a rotation detecting device with a function of transmitting a rotational speed detection signal wireless and enable the rotation detecting device to be assembled compact in size without requiring any anti-rusting treatment to a multi-pole magnet assembly and a magnetic ring assembly, the rotation detecting device includes an electric power generator (11) for generating an electric power by a relative rotation between a non-rotatable member (1) and a rotatable member (7). The electric power generator (11) includes a multi-pole magnet assembly (13) and a magnetic ring assembly (12). A wireless transmission device (14) for transmitting the rotational speed detection signal outputted by the electric power generator (11) is employed. A sealing member (18) is also employed for sealing a working space delimited between the non-rotatable member (1) and the rotatable member (7), and the multi-pole magnet assembly (13) and the magnetic ring assembly (12) of the electric power generator (11) confront with each other at a location inwardly of the sealing member (18). The sealing member (18) is mounted on the magnetic ring assembly (12) or the wireless transmission device (14) of an annular configuration.

6 Claims, 28 Drawing Sheets

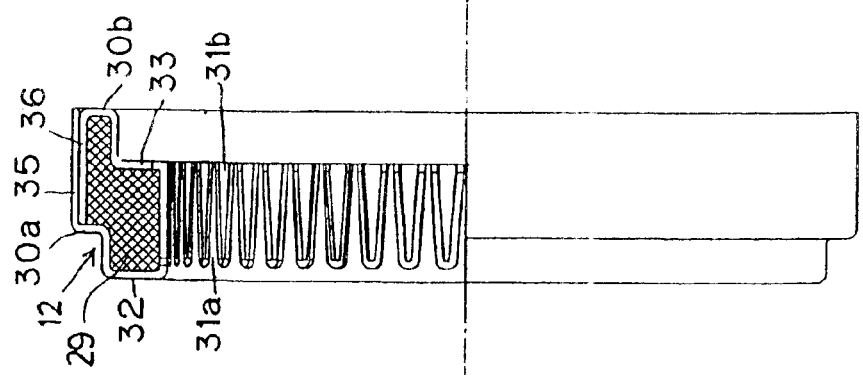
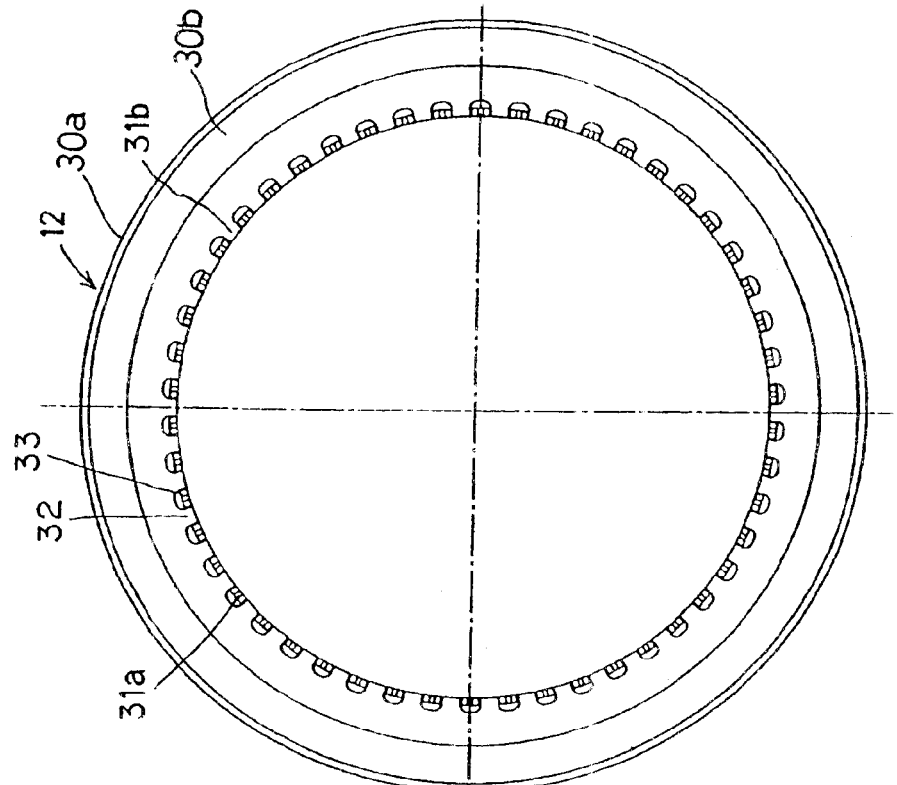
Fig. 4A
Fig. 4B

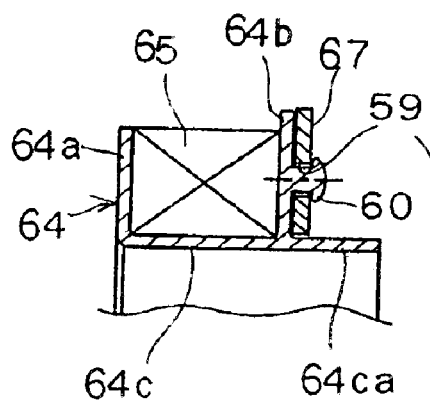
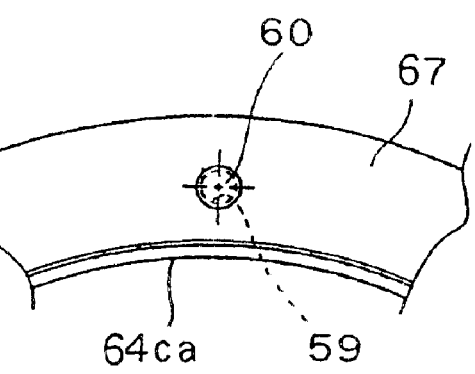
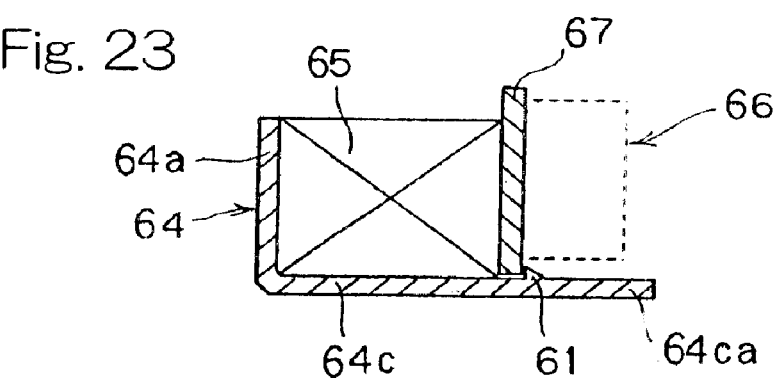
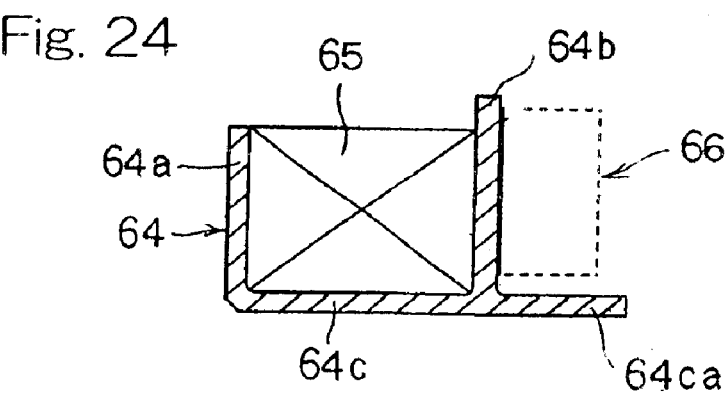

ROTATION DETECTING DEVICE AND WHEEL SUPPORT BEARING ASSEMBLY UTILIZING THE SAME

BACKGROUND OF THE INVENTION

1. Field of the Invention

The present invention relates to a rotation detecting device for detecting the number of revolutions of a rotating element such as a wheel and for transmitting wireless an electric signal indicative of the detected number of revolutions. The present invention also relates to a wheel support bearing assembly utilizing the rotation detecting device referred to above and to a rolling bearing assembly equipped with an electric power generator that provides an electric power source or the like for the rotation detecting device of the type referred to above. The rolling bearing assembly equipped with the electric power generator can find a variety of applications such as in a wheel support bearing assembly provided with a wireless sensor and an ABS system.

2. Description of the Prior Art

A rotation detecting device for detecting the number of revolutions, or the rotational speed for short, that is equipped with an electric power generator and a wireless transmission unit has been well known in which the electric power generator includes a magnetic ring assembly accommodating a coil and a multi-pole magnet assembly. In this electric power generator employed in the known rotation detecting device, the magnetic ring assembly is mounted fixedly on one of rotatable and non-rotatable members while the multi-pole magnet assembly is mounted fixedly on the other of the rotatable and non-rotatable members, so that a relative rotation of those rotatable and non-rotatable members can result in generation of an electric power. An output signal indicative of the rotational speed, which is generated from the electric power generator, is transmitted wireless by the wireless transmission unit.

The electric power generator referred to above is disposed between pluralities of raceways defined in the non-rotatable and rotatable members, respectively, with the multi-pole magnet assembly and the magnetic ring assembly disposed between the pluralities of such raceways. Also, a sealing member for sealing a working space delimited between the non-rotatable and rotatable members is integrated together with the multi-pole magnet assembly, while the structure may also be available in which the multi-pole magnet assembly and the magnetic ring assembly are positioned externally of the seals.

In the electric power generator in which the multi-pole magnet assembly and the magnetic ring assembly are disposed externally of the seals, the multi-pole magnet assembly is exposed to foreign matter such as saline dirt and grits and, therefore, an anti-rusting treatment is required where the multi-pole magnet assembly makes use of magnets such as rare-earth magnets that are susceptible to rusting. Also, where the magnetic ring assembly is also susceptible to saline dirt and grits, the anti-rusting treatment has to be applied to the magnetic ring assembly. The anti-rusting treatment to be applied to the magnets and the magnetic ring assembly includes a plating process, in which zinc or nickel is plated on surfaces of the magnets and the magnetic ring assembly, a painting process in which an anti-rusting paint is applied to surfaces of the magnets and the magnetic ring assembly, and a resin molding process in which the magnets and the magnetic ring assembly are covered with a resin material.

When the anti-rusting treatment against the saline dirt and grits is employed, the plated or painted layer must have a relatively large film thickness. In particular, where the resin molding process is used, the resultant resin layer has a film thickness generally greater than the plated or painted layer. Accordingly, if the anti-rusting treatment is applied to the magnets and the magnetic ring assembly, particularly to respective surfaces of the magnetic ring assembly and the magnets that confront with each other, a gap between the magnets and the magnetic ring assembly would undesirably increase enough to lower the electric power output generated by the electric power generator. Although the problem associated with reduction in electric power output of the electric power generator would be resolved if the number of turns of the coil accommodated in the magnetic ring assembly is increased and/or the magnets of a relatively large thickness are employed, any of those measures would result in an undesirable increase of the size of the electric power generator.

Also, if foreign matter enter between the respective surfaces of the magnetic ring assembly and the magnets that confront with each other, those surfaces would be scratched or otherwise damaged in contact with the foreign matter and the anti-rusting film or mold would then be impaired enough to allow rusting to occur in those surfaces. Because of this, additional seals would be required to avoid ingress of the foreign matter.

One example of the rolling bearing assembly equipped with the electric power generator of the kind discussed above is currently available and is shown in FIG. 38A. Referring to FIG. 38A, the rolling bearing assembly 71 includes an inner race 72 defining the non-rotatable member and an outer race 73 defining the rotatable member. An electric power generator 76 used therein includes a stator 74, i.e., a magnetic ring assembly mounted on one end of the inner race 72, and a rotor 75, i.e., a multi-pole magnet assembly mounted on an adjacent end of the outer race 73, and generates a rotational speed detection signal indicative of the number of revolutions of the outer race 73 in terms of the electric power generated thereby. In such structure, an electric circuit unit 77 is provided at a location outwardly of one end of the inner race 72 defining the non-rotatable member, so as to extend axially outwardly from the position where the multi-pole magnet assembly 75 is disposed. In the example now under discussion, this electric circuit unit 77 includes an electric circuit substrate 79 encased within, for example, a metallic protective casing 78 as shown in FIG. 38B and having various electric component parts necessary to form a signal processing circuit, an electric power source circuit, a transmission circuit and others. The coil 80 in the magnetic ring assembly 74 and the electric circuit unit 77 are electrically connected with each other by means of an electric wiring 81. According to the conventional example shown in FIGS. 38A and 38B, the electric power generated by the electric power generator 76 is utilized not only as the rotational speed detection signal, but also as an electric power source for electrically powering the signal processing circuit and the transmission circuit through an electric power source circuit, and the rotational speed detection signal is subsequently transmitted wireless from a transmitting antenna 82 of the transmission circuit to an external receiver circuit.

However, with the above discussed conventional rolling bearing assembly of the type equipped with the electric power generator, the electric circuit unit 77 including the electric power source circuit, the processing circuit for processing the rotational speed detection signal, the transmission circuit and others is necessarily disposed at a location distant and separate from the electric power generator 76, hence involving a problem associated with complication in structure. Also, a complicated procedure is required to electrically connect the coil 80 in the magnetic ring assembly 74 and the electric circuit unit 77 together through the electric wiring 81. Considering that the coil 80 makes use of a relatively thin electric wire, a terminal treatment is required to lead the electric wire out from the coil 80, resulting a substantial amount of manual intervention. In addition, a measure to avoid any possible breakage of joints in the electric wiring 81 and a protective casing 78 for protecting the electric circuit unit 77 from external environment are needed and does therefore provide a cumbersome addition to the complicated structure and the complicated assemblage.

Furthermore, an anti-skid braking system (ABS) is known, which operates to detect the onset of a wheel skid, which would be likely to occur when the wheel rotates on a low friction ground surface or is abruptly braked, and then to loosen the braking to thereby maintain tire grip to secure a steering control. A rotational speed sensor for detecting the onset of the wheel skid is generally disposed in the wheel support bearing assembly. This sensor has a sensing portion disposed in face-to-face relation with a pulsar ring mounted on, for example, one end of a raceway member positioned externally of the bearing assembly. However, since the pulser ring and the sensing portion are exposed to the outside, a problem would often occur in that reduction in size of the wheel support bearing assembly tends to be hampered. In order to alleviate such problem, wheel support bearing assemblies have been suggested in which an electric power generator that serves as a rotational speed sensor for providing an output signal indicative of the number of revolutions of the wheel is employed and in which, as shown in FIG. 39, arrangement is made to transmit the rotational speed detection signal wireless.

Referring now to FIG. 39, the wheel support bearing assembly shown therein makes use of an electric power generator 86 of a structure in which a multi-pole magnet assembly 85 is mounted on an inner member 82 of the bearing assembly and a magnetic ring assembly 84 is mounted on an outer member 83 so as to confront the multi-pole magnet assembly 85 in a direction radially of the bearing assembly, so that a relative rotation between the inner and outer members 82 and 83 can result in generation of an electric power. The inner member 82 is arranged inside the outer member 83 through a plurality of circumferential rows of rolling elements 88. A coil is disposed within the magnetic ring assembly 84. This magnetic ring assembly 84 is fixed to an inner peripheral surface of a ring-shaped mounting member 89 mounted on the outer member 83, while the multi-pole magnet assembly 85 is mounted on an outer peripheral surface of a ring-shaped mounting member 90 mounted on the inner member 82. The mounting member 90 is a member concurrently serving as a core metal for the multi-pole magnet assembly 85. The mounting member 89 on which the magnetic ring assembly 84 is fixed is provided with a wireless transmission device 87 for transmitting wireless the rotational speed detection signal, represented by the electric power output generated by the electric power generator 86, through a transmitting antenna of the wireless transmission device 87 to the outside of the wheel support bearing assembly in the form of a radio wave for use in anti-skid control performed by the automobile anti-skid braking system (ABS). The mounting member 90 referred to above is a member that defines a core metal for the multi-pole magnet assembly 85 and includes a portion that defines a slinger 90a cooperable with a sealing member 91. The outer member 83 is operatively coupled with a knuckle 92, while the inner member 82 is operatively coupled with an outer race 93 of a constant velocity universal joint.

However, with the rolling bearing assembly equipped with the electric power generator of the structure discussed above, since the mounting members 89 and 90 are mounted respectively on the outer and inner members 82 and 83 of the bearing assembly and the magnetic ring assembly 84 and the multi-pole magnet assembly 85 are in turn mounted on the mounting members 89 and 90, respectively, a relatively large number of components are required. Also, the magnetic ring assembly 84 is required to be incorporated in the mounting member 89 with no gap formed therebetween to avoid the possibility that the magnetic ring assembly 84 may separate from the mounting member 89 under the influence of vibrations, resulting in complicated assemblage. Also, in order to secure a gap between the magnetic ring assembly 84 and the multi-pole magnet assembly 85 confronting the magnetic ring assembly 84, the mounting members 89 and 90 need to be exactly aligned coaxially with each other. For this reason, the mounting members 89 and 90 have to be precisely machined, resulting in increase of the cost. Yet, since even in this example, the electric power generator 86 and the wireless transmission device 87 are positioned at respective locations separate from each other, the wheel support bearing assembly of the structure shown in and described with reference to FIG. 39 has problems similar to those involved in the wheel support bearing assembly of FIGS. 38A and 38B.

Also, in the wheel support bearing assembly of the structure discussed above, in view of the relation in position with a wheel and a tire housing, the inboard side is in an environment exposed to saline dirt and grits splashed from the ground surface and, therefore, for protection of the raceways within the bearing assembly and, also, the electric power generator 86, a reliable and firm sealing performance is required.

However, in the wheel support bearing assembly of the structure shown in and discussed with reference to FIG. 39, the sealing member 91 is interposed between the mounting members 89 and 90 and, therefore, no contact pressure would be secured in the sealing member 91 due to an error in positioning of the mounting members 89 and 90 relative to each other, resulting in a risk of incomplete sealing. For this reason, in order for the positioning error to be compensated for, the sealing member 91 must have an increased sectional surface area, but the increased sectional surface area cannot often be secured in the sealing member 91 in view of the relation in position thereof relative to the peripheral component parts such as the knuckle 92, the outer race 93 of the constant velocity universal joint and others. Also, in the face of a pressing demand for compactization of the wheel support bearing assembly, the space delimited between the knuckle 92 and the outer race 93 of the constant velocity universal joint is extremely small. Yet, in view of the presence of the peripheral component parts, the sectional surface area of the electric power generator 86 cannot be increased and, therefore, it is generally difficult to secure the electric power that can be generated.

If the sealing member 91 is disposed directly between the outer and inner members 83 and 82 such as found in the standard wheel support bearing assembly having no electric power generator incorporated therein, the sealing performance could be secured, but the electric power generator 86 would be positioned outside the sealing member, resulting in addition of one or more extra sealing member.

It is also suggested to dispose the slinger 90a, cooperable with the sealing member 91, on the outer race 93 of the constant velocity universal joint to thereby increase the space for installation of the electric power generator 86 and, also, the space for installation of the sealing member 91, but it is difficult to secure a sufficient space for installation of the electric power generator 86 after all. Depending on the size of the electric power generator 86 and that of the sealing member 91, the cup portion of the outer race 93 of the constant velocity universal joint would be incapable of securing a required wall thickness. Where the wireless transmission device 87 is employed, the space for installation thereof is additionally limited.

SUMMARY OF THE INVENTION

In view of the foregoing, one object of the present invention is to provide a rotation detecting device compact in structure and having a function of transmitting wireless a rotational speed detection signal, but utilizing a multi-pole magnet assembly and a magnetic ring assembly both requiring no anti-rusting treatment, and also to provide a wheel support bearing assembly.

Another object of the present invention is to provide a rolling bearing assembly equipped with an electric power generator, that is simple in structure and can easily be assembled.

A further object of the present invention is to provide a rolling bearing assembly equipped with an electric power generator, in which the electric power generator can easily and accurately be incorporated with a minimized number of component parts.

A still further object of the present invention is to provide a wheel support bearing assembly equipped with an electric power generator, in which a sufficient space for installation of the electric power generator can be secured and a freedom of design choice can be available.

In order to accomplish these objects of the present invention, in accordance with a first aspect of the present invention, there is provided a rotation detecting device which includes a rotatable member rotatably supported on a non-rotatable member; an electric power generator for generating an electric power by a relative rotation between the non-rotatable member and the rotatable member; a transmission device of an annular configuration for transmitting wireless at least one of a rotational speed detection signal outputted by the electric power generator and an output signal from a sensor that operates using as an electric power source the electric power generated by the electric power generator; and a sealing member for sealing a space delimited between the non-rotatable member and the rotatable member. The electric power generator referred to above includes a multi-pole magnet assembly having a plurality of alternating magnetic poles arranged in a circumferential direction, and a magnetic ring assembly accommodating a coil and confronting the multi-pole magnet assembly. The wireless transmission device used therein is disposed axially outwardly, but adjacent the magnetic ring assembly of the electric power generator, while the sealing member is mounted on the wireless transmission device and has a lip member slidingly engaged with a seal contact area defined in the rotatable member. The magnetic ring assembly and the multi-pole magnet assembly of the electric power generator confront with each other at a location inwardly of the sealing member.

Where the wireless transmission device is made up of a wireless transmitter and members used to support it, that portion which defines the wireless transmitter is positioned axially outwardly, but adjacent the magnetic ring assembly. The non-rotatable and rotatable members referred to above may be those positioned radially outwardly and inwardly relative to each other, respectively. The multi-pole magnet assembly and the magnetic ring assembly may be so disposed as to confront with each other in an axial direction or a radial direction of the bearing assembly.

In the rotation detecting device according to a second aspect of the present invention, the wireless transmission device referred to above is integrated together with, for example, the magnetic ring assembly of the electric power generator. The term "integrated together" hereinabove and hereinafter referred to is intended to mean that the wireless transmission device and the magnetic ring assembly can be treated as a single unitary component.

Also, in the rotation detecting device according to a third aspect of the present invention, instead of the transmission device and the magnetic ring assembly being integrated together, the annular wireless transmission device is mounted on the non-rotatable member and the sealing member is mounted on the wireless transmission device then mounted on the non-rotatable member. Where the wireless transmission device is integrated together with the electric power generator or mounted on the non-rotatable member, the wireless transmission device is preferably disposed axially outwardly of the magnetic ring assembly of the electric power generator, but it may not be always disposed axially outwardly thereof.

In the rotation detecting device according to a fourth aspect of the present invention, instead of the magnetic ring assembly being mounted on the wireless transmission device, the sealing member is mounted on the magnetic ring assembly of the electric power generator. Even in this case, sealing lips of the sealing member are held in sliding contact with the seal contact area defined in the rotatable member and the magnetic ring assembly and the multi-pole magnet assembly of the electric power generator are held in face-to-face relation at a location inwardly of the sealing member.

According to the first to fourth aspects of the present invention, since a portion where the magnetic ring assembly and the multi-pole magnet assembly confront with each other is positioned inwardly of the sealing member to thereby avoid any possible ingress of saline dirt and grits, there is no need to apply the anti-rusting treatment to the magnet and the magnetic ring assembly to avoid the possible ingress of saline dirt and grits. Because of this, the multi-pole magnet assembly can be inexpensively assembled and the gap between the magnetic ring assembly and the multi-pole magnet assembly of the electric power generator can also be minimized, resulting in compactization of the electric power generator. Also, formation of the magnetic ring assembly by the use of a steel material having a high magnetic permeability and no rust proof makes it possible for the electric power generator to be further compactized. Also, since there is no need to mount the sealing member on the non-rotatable member, there is no need to provide the non-rotatable member with a seal mount and, therefore, the non-rotatable member can have a reduced size. For these reasons, the space for installation of the electric power generator and the transmission device can be expanded advantageously.

Where the wireless transmission device is assembled in a ring form and the sealing member is mounted on this ring-shaped wireless transmission device, there is no need to provide a sectional shape of the magnetic ring assembly of the electric power generator with surface projections or recesses necessary to engage with the sealing member and, therefore, the sealing member while simplifying the magnetic ring assembly in shape can easily be mounted on the wireless transmission device. Because of this, the magnetic ring assembly can have a reduced magnetic path and, hence, a reduced magnetic resistance. As a result thereof, the efficiency of electric power generation increases, allowing the electric power generator to be assembled further compact in size. On the other hand, where the annular wireless transmission device is mounted on the magnetic ring assembly to thereby integrate it together with the latter, the coaxial alignment between the non-rotatable and rotatable members can be improved, with the sealing performance consequently increased. It is, however, to be noted that the sealing member may not be always mounted directly on the wireless transmission device, but where any member is, for example, used for mounting the wireless transmission device on the non-rotatable member or for mounting it on the magnetic ring assembly of the electric generator, the sealing member may be mounted on such member.

Also, the distance of spacing between the multi-pole magnet assembly and the magnetic ring assembly can be reduced and material of a high magnetic permeability can be used for the magnetic ring assembly to thereby increase the efficiency of electric power generation.

In the rotation detecting device according to any one of the first to fourth aspects of the present invention, the wireless transmission device may have an inner peripheral surface formed with a to-be-engaged portion comprised of a projection or a recess and the sealing member may be formed with an engaging portion comprised of a recess or a projection engageable with the to-be-engaged portion on the inner peripheral surface of the wireless transmission device, so that the sealing member can be mounted inside the wireless transmission device with the engaging portion engaged with the to-be-engaged portion. Where the sealing member is mounted on the magnetic ring assembly of the electric power generator, the inner peripheral surface of the magnetic ring assembly is formed with a to-be-engaged portion comprised of a projection or a recess, so that the to-be-engaged portion can be engaged with the engaging portion formed in the sealing member. It is to be noted that the to-be-engaged portion and the engaging portion may be defined so as to extend over the entire circumference or may be defined at a single location or a plurality of discrete locations on the circumference.

The provision of the to-be-engaged portion and the engaging portion in the manner described above is effective to avoid any possible separation of the sealing member from the wireless transmission device or the magnetic ring assembly whichever the sealing member is mounted on. The to-be-engaged portion and the engaging portion may be of a respective kind having a minimized resistance with a relative movement for engagement and having a relatively large resistance with a relative movement for disengagement or drawing our, such as, for example, detent pawls.

A rolling bearing assembly equipped with an electric power generator according to a fifth aspect of the present invention may include first and second members rotatable relative to each other through rolling elements, an electric power generator capable of generating an electric power by a relative rotation between the first and second members, and an electric circuit disposed within a yoke, forming a part of the electric power generator, and utilizing the electric power generated by the electric power generator.

According to the fifth aspect of the present invention, since the electric circuit is disposed inside the yoke, there is no need to mount the electric circuit externally of the bearing assembly. A protective casing which is required when the electric circuit is mounted externally of the bearing assembly is not needed and, therefore, compactization is advantageously possible. Also, connection between the coil of the electric power generator and the electric circuit can easily be accomplished. For these reasons, the structure can be simplified and assemblage can be accomplished easily. A wire used to form the coil can be directly connected with a circuit substrate of the electric circuit and, in such case, no treatment of a wiring terminal is needed. Since an electric wiring to be led out can be drawn from the circuit substrate, the wiring can easily be accomplished.

If the electric circuit referred to above is provided with a rectifier circuit appropriate to characteristics of the electric power generator and an output protective circuit and is then mounted in the yoke, an electric power generator unit capable of being used as a stable electric power source can be obtained.

In the rolling bearing assembly equipped with the electric power generator according to the foregoing fifth aspect of the present invention, the first and second members rotatable relative to each other may be, for example, inner and outer members, respectively.

The electric power generator referred to above may include the multi-pole magnet assembly having a plurality of alternating magnetic poles arranged in a circumferential direction, and a magnetic ring assembly accommodating a coil therein and defining a yoke confronting the multi-pole magnet assembly, wherein the multi-pole magnet assembly is mounted on one of the inner and outer members while the magnetic ring assembly is mounted on the other of the inner and outer members.

The use of the multi-pole magnet assembly facilitates an accurate detection of the rotational speed and also permits the electric power to be generated efficiently with a compact structure.

In the fifth aspect of the present invention, the rolling bearing assembly equipped with an electric power generator may include a wireless transmission device for transmitting wireless at least one of a rotational speed detection signal outputted by the electric power generator and an output signal from a sensor that operates using as an electric power source the electric power generated by the electric power generator. The electric circuit disposed in the yoke has to include one of a rectifier circuit for rectifying a generated electric current, a signal processing circuit and a transmitter circuit of the wireless transmission device.

This design feature is effective to allow the rotational speed detection signal detected to be transmitted wireless to the outside of the bearing assembly with no possibility of breaking of wire while eliminating the need to use an extra electric power source of the wireless transmission.

Also, in the fifth aspect of the present invention, the electric circuit substrate mounting the electric circuit referred to above may be mounted on a coil bobbin included in the electric power generator. With the electric circuit substrate mounted on the coil bobbin, an electric connection between an electric power generator coil and the electric circuit can easily be accomplished.

Yet, in the fifth aspect of the present invention, the electric circuit substrate mounting the electric circuit may be a part of the coil bobbin of the electric power generator. If the electric circuit substrate and the coil bobbin are thus integrated together in this way, the axial dimension of the electric power generator can be reduced, making it possible for the electric power generator to be assembled compact in size.

Considering that the wheel support bearing assembly is used under a severe environment such as exposed to a ground surface and, accordingly, if a wiring is employed for outputting the rotational speed detection signal from the rotation detecting device and also for connection with the electric power source, a problem often occurs which is associated with breakage of the wiring. A water proofing treatment against dirt and grits is also required. Because of these, while the rolling bearing assembly equipped with the electric power generator according to the present invention has a structure easy to assemble and compact in size, an advantage of having the capability of generating the electric power generating capability can be effectively demonstrated.

A rolling bearing assembly equipped with an electric power generator according to a sixth aspect of the present invention may include the inner and outer members rotatable relative to each other through the rolling elements, and the electric power generator having the multi-pole magnet assembly mounted on one of the inner and outer members and having a plurality of alternating magnetic poles arranged in a circumferential direction and also having the magnetic ring assembly mounted on the other of the inner and outer members and accommodating a coil and confronting the multi-pole magnet assembly. The magnetic ring assembly includes a stepped portion made up of a peripheral surface portion and an end face portion and defined on an outer periphery or an inner periphery of one end thereof. This magnetic ring assembly is mounted on the other of the inner and outer members by press-fitting the peripheral surface portion of the stepped portion directly onto a peripheral surface of the other of the inner and outer members within a bearing space between the inner and outer members. The peripheral surface within the bearing space is an inner peripheral surface in the case of the outer member and an outer peripheral surface in the case of the inner member.

According to this sixth aspect of the present invention, since the magnetic ring assembly is provided with the stepped portion and is mounted on one of the outer and inner members directly under interference fit, no fixing member is necessary and the number of component parts used can advantageously be reduced. Also, since the peripheral surface within the bearing space in any one of the outer and inner members of the bearing assembly is precisely machined, the magnetic ring assembly can be precisely fitted and a gap can easily be secured between the magnetic ring assembly and the multi-pole magnet assembly. In addition, by causing the end face portion of the stepped portion of the magnetic ring assembly to be engaged with the end face of one of the outer and inner members, the magnetic ring assembly can be axially properly positioned. The magnetic ring assembly is mounted neither on the outer member nor the inner member in its entirety, but only an axial portion thereof is mounted and, therefore, a sufficient sectional dimension can be secured even though the bearing space is narrow.

In this sixth aspect of the present invention, the magnetic ring assembly may be made up of a plurality of divided ring members confronting in an axial direction. In such case, the divided ring members are connected together with respective portions in section along the axial direction being capped one over the other, and the connecting strength with which the respective portions of the divided ring members are connected with each other can increase as the magnetic ring assembly undergoes deformation upon press-fitting thereof on the other of the inner and outer members.

The use of the magnetic ring assembly of a divided structure facilitates mounting of the coil within the magnetic ring assembly. On the other hand, the divided structure often constitutes a cause of increase of a magnetic resistance in a joint between the divided ring members. However, since the divided ring members are so designed as to be combined together with the respective portions in section along the axial direction being capped one over the other, so that the connecting strength with which the respective portions of the divided ring members can be connected with each other can increase as the magnetic ring assembly undergoes deformation upon press-fitting thereof on the inner or outer member, the magnetic resistance in the magnetic circuit defined in the magnetic ring assembly does not increase, permitting the electric power generated to be secured satisfactorily.

The magnetic ring assembly referred to above may have a seal mount of a stepped or recess configuration defined at a portion on one side opposite to the stepped portion in the axial direction, and a sealing member may be mounted on the seal mount for sealing a working space delimited between the inner and outer members.

Utilization of the magnetic ring assembly as a seal mount facilitates assemblage of the sealing member. Also, since no extra member is necessary to define the seal mount, any undesirable increase in number of the component parts can be eliminated advantageously. Also, since the magnetic ring assembly can be precisely mounted owing to the engagement of the stepped portion as described above, the positioning accuracy of the seal member on the magnetic ring assembly can be increased and the sealing performance can easily be secured.

Instead of the outer surface of the magnetic ring assembly used as a seal mount, the magnetic ring assembly may include a mounting ring protruding outwardly from an end face opposite to the stepped portion of the magnetic ring assembly in the axial direction so as to define a seal mount, and the sealing member may be mounted on the mounting ring for sealing a working space delimited between the inner and outer members.

Even when the mounting ring is provided in the magnetic ring assembly as described above, incorporation of the sealing member can easily be accomplished. Although the use of the mounting ring results in increase of the number of component parts, a recessed portion that defines the seal mount is not needed in the magnetic ring assembly and, accordingly, the magnetic ring assembly can have a simplified shape. Also, if the mounting ring is beforehand mounted in the magnetic ring assembly, the mounting ring and the magnetic ring assembly can advantageously be handled as a single unitary structure during assemblage of the bearing assembly.

Where the mounting ring is used in the magnetic ring assembly, the magnetic ring assembly may be mounted on the outer member whereas the mounting ring is mounted on an outer periphery of the magnetic ring assembly with a portion engaged with an outer peripheral surface of the outer member.

Where the mounting ring is employed, the mounting ring can be utilized to fix the sealing member and the wireless transmission device and, at the same time, to prevent the magnetic ring assembly from being axially separated. In such case, the mounting ring can have a function of protecting the magnetic ring assembly from dirt and grits. Although due to the above reason an anti-rusting treatment is required, it is separate from the magnetic circuit and, therefore, a non-magnetic material can advantageously be employed therefor. Also, with this structure, the magnetic ring assembly may be made of a material having no resistance to corrosion but a high magnetic permeability, resulting in increase of the efficiency of electric power generation.

Also, in the sixth aspect of the present invention, the rolling bearing assembly equipped with the electric power generator may further include the wireless transmission device of an annular configuration for transmitting wireless one of a rotational speed detection signal outputted by the electric power generator and an output from a sensor that utilizes the electric power generator as an electric power source, and the wireless transmission device may be mounted on the magnetic ring assembly.

The provision of the wireless transmission device can simplify a wiring system and, therefore, the problem associated with breakage of the wiring can be eliminated advantageously. If the wireless transmission device is of an annular configuration and is then mounted on the magnetic ring assembly, the wireless transmission device will not unduly protrude outwardly and the bearing assembly as a whole can have a compact contour.

Where the mounting ring is used on the magnetic ring assembly, the wireless transmission device may be of an annular configuration and may be mounted on an peripheral surface of the mounting ring opposite to a different peripheral surface thereof defining the seal mount.

If one surface of the mounting ring is used as a seal mount and the other surface thereof is used to support the wireless transmission device, the sealing member and the wireless transmission device can be arranged compact in size.

The rolling bearing assembly equipped with the electric power generator in the practice of the present invention may be a wheel support bearing assembly. In other words, the rolling bearing assembly equipped with the electric power generator according to the sixth aspect of the present invention may be of a structure in which the outer member has an inner peripheral surface formed with inner raceways and the inner member has an outer peripheral surface formed with outer raceways confronting the inner raceways, with the rolling elements received in part in the inner raceways and in part in the outer raceways, so that the rolling bearing assembly can be used to rotatably support a wheel relative to an automobile body structure.

The wheel support bearing assembly is desired to be equipped with an electric power generator so that it can be used as a highly intelligent, high performance bearing assembly for detection of the rotational speed of the wheel for control by an anti-skid braking system or for any other purpose. However, demands for accuracy, assemblability and reduction in weight are severe and, therefore, the advantage of the present invention in which with a minimized number of component parts the electric power generator can be accurately and easily incorporated in the rolling bearing assembly can be effectively available.

According to a seventh aspect of the present invention, there is provided a wheel support bearing assembly equipped with the electric power generator, which assembly includes the outer member connected with an automobile body structure through a knuckle and having a plurality of the outer raceways defined in an inner peripheral surface thereof; the inner member having a corresponding number of the inner raceways defined in an outer peripheral surface thereof in alignment with the respective outer raceway in the outer member; a corresponding number of rows of the rolling elements rollingly accommodated in part within the inner raceways and in part within the outer raceways, respectively; and the electric power generator including the multi-pole magnet assembly mounted on the inner member and having a plurality of alternating magnetic poles defined therein in a circumferential direction thereof, and the magnetic ring assembly accommodating a coil and confronting the multi-pole magnet assembly. The magnetic ring assembly referred to above is mounted on the knuckle.

With the above discussed structure, since the magnetic ring assembly of the electric power generator is mounted on the knuckle, the space between the constant velocity universal joint and the knuckle can be effectively utilized as a space for installation of the electric power generator. Because of this, without a problem with the capacity being involved, the electric power generator can be mounted on an inboard end of the bearing assembly where the space is limitted and, therefore, a freedom of design choice can be appreciated.

In this seventh aspect of the present invention, the end face of the outer member on the inboard side may be axially inwardly set back from a plane flush with the end face of the inner member to define a set-back space in which the magnetic ring assembly of the electric power generator may be disposed. Where the magnetic ring assembly is mounted on the knuckle and the sealing member is mounted on the magnetic ring assembly, no sealing member needs mounted on the inner peripheral surface of the outer member and, therefore, the end face of the outer member can be set back as discussed above. By so doing, the amount of material for the outer member can advantageously be reduced, resulting in an inexpensive bearing assembly. Also, by a quantity corresponding to the set-back space so defined in the outer member, the space for disposition of the electric power generator and the sealing member can be increased, resulting in a relatively greater freedom of design choice.

In the seventh aspect of the present invention, a slinger may be provided axially outwardly of the multi-pole magnet assembly on the inner member, and the sealing member is then mounted on the magnetic ring assembly and slidingly engageable with the slinger while a non-contact seal is defined between each free end of the slinger and the sealing member.

When the slinger and the sealing members are so arranged as to slidingly engage with each other at a location axially outwardly of the bearing assembly relative to the multi-pole magnet assembly, that portion at which the multi-pole magnet assembly and the magnetic ring assembly confront with each other can be located radially inwardly of the sealing member and, therefore, any possible ingress and subsequent biting of dirt and grits onto a surface of the multi-pole magnet assembly can advantageously be avoided. The sealing member referred to above can serve for sealing the interior of the bearing assembly and also for protecting the surface of the multi-pole magnet assembly and, therefore, unlike the case in which a dedicated sealing member is employed for the electric power generator, the surface of the multi-pole magnet assembly can be assuredly protected. Also, since the sealing member cooperates with the slinger to define the non-contact seal between it and the free end of the slinger, a dual sealing effect can be obtained by the lip seal and the non-contact seal, resulting in a high performance seal. For this reason, a preventive performance to avoid any possible ingress of saline dirt and grits from the outside into the interior of the bearing assembly can advantageously be increased. Since the sealing member is mounted on the magnetic ring assembly, no extra member for mounting is needed and the efficiency of utilization of the space is high. Because of those features, the space hitherto used to accommodate the sealing member and the space available between the outer peripheral surface of the outer race of the constant velocity universal joint and the inner peripheral surface of the knuckle can be utilized for accommodating the electric power generator and the sealing member as desired, resulting in an increased freedom of design choice.

Where the multi-pole magnet assembly makes use of a metal core, the slinger may be an integral part of the core metal forming a part of the multi-pole magnet assembly. The integration of the core metal and the slinger results in reduction in number of the component parts and also that of manufacturing steps and, therefore, the wheel support bearing assembly can be manufactured inexpensively.

Also, the inner member may be fitted with the outer race of the constant velocity universal joint, or the outer race of the constant velocity universal joint may be used as an element forming the inner member, in which case the multi-pole magnet assembly may be mounted on the outer race of the constant velocity universal joint. The mounting of the multi-pole magnet assembly on the outer race of the constant velocity universal joint eliminates the necessity of a margin required in the inner member for the multi-pole magnet assembly to be mounted and, therefore, that portion which function as a bearing assembly can be compactized.

Yet, a support plate may be employed which is adapted to be fitted to the knuckle by means of a bolt used to secure the outer member to the knuckle. This support plate may have a cylindrical portion defined therein, and the magnetic ring assembly may then be fitted within an inner periphery of the cylindrical portion of the support plate.

Where the use is made of the support plate and the magnetic ring assembly is fitted inside the support plate, the magnetic ring assembly can easily be fitted inside the support plate by, for example, an engagement. Also, since the support plate is fitted by means of the bolt used to secure the outer member to the knuckle, the support plate can be fitted simultaneously when the outer member is secured to the knuckle. Therefore, no extra procedure for bolting solely the support plate is eliminated and, accordingly, the mounting of the magnetic ring assembly onto the knuckle can easily be accomplished.

Where the support plate is employed as described above, the support plate may have a flange extending radially inwardly beyond the inner peripheral surface of the outer member, and a sealing plate may be positioned axially inwardly of the radially inwardly extending flange and spaced a slight distance therefrom to define a labyrinth seal between the radially inwardly extending flange and the sealing plate.

Formation of the labyrinth seal in this way is effective to avoid a possible leakage of a lubricant such as a grease filled in the bearing assembly. Since the radially inwardly extending flange which is a part of the support plate is utilized, the labyrinth seal can be formed advantageously with a minimized number of component parts.

Also, where the support plate is employed as described above, a portion adjacent an opening of an inner peripheral surface of the knuckle adjacent an area where the support plate is secured may represent a generally stepped cylindrical surface flaring outwardly and the cylindrical portion of the support plate may be formed as a stepped cylinder engageable around the stepped cylindrical surface of the knuckle. An axial gap can then be defined between an annular step in the stepped cylindrical surface of the knuckle and an annular step in the cylindrical portion of the support plate representing a stepped cylindrical shape, and an elastic seal member can be disposed within such axial gap.

Intervention of the elastic seal in the axial gap between the annular step in the stepped cylindrical surface of the knuckle and the annular step in the cylindrical portion of the support plate is effective to ensure a firm sealing achieved between the knuckle and the support plate.

Again, where the support plate is employed as described above, a resin layer may be employed for sealing a gap defined between the portion adjacent the opening of the inner peripheral surface of the knuckle adjacent the area where the support plate is secured and an outer peripheral surface of the cylindrical portion of the support plate. This resin layer may be provided on the outer peripheral surface of the support plate.

The use of the resin layer is effective to achieve a seal between the knuckle and the support plate with no need to use any elastic seal element such as an O-ring. Accordingly, the number of component parts can be reduced and assemblage can be accomplished easily.

In the practice of the seventh aspect of the present invention, a sensor which operates using the electric power generated by the electric power generator as an electric power source may be provided in the wheel support bearing assembly. This sensor may be of a type used to detect rotation or to detect a parameter other than rotation, such as vibrations and/or temperature. Since the electric power generated by the electric power generator is used as an electric power source therefor, no wiring is routed, thereby simplifying the wiring system.

Also, in any of the various aspects of the present invention, the wheel support bearing assembly may have the transmission device for transmitting wireless at least one of a rotational speed detection signal outputted by the electric power generator and an output signal generated from the sensor that operates using the electric power of the electric power generator as an electric power source. This transmission device may be disposed in the vicinity of the magnetic ring assembly.

The provision of the wireless transmission device is effective to eliminate any use of a wiring used for electric connection between the wheel support bearing assembly and the automobile body structure. Also, since the electric power generator provides an electric power source for the rotation detection and also for the sensor, it is possible to eliminate the use of an electric power source wiring. For this reason, while the wheel support bearing assembly is of a type capable of detection, any complicated wiring job can be eliminated and assemblage into the automobile body structure can easily be accomplished. Although the use of the wireless transmission device requires a space for installation thereof, the fact that the magnetic ring assembly of the electric power generator is mounted on the knuckle provides a relatively great freedom of design choice with respect to the space available between the knuckle and the outer race of the constant velocity universal joint and, accordingly, the space for installation of the wireless transmission device can easily be available.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 4A illustrates a ring forming a part of an electric power generator used in the wheel support bearing assembly of FIG. 1, which ring is shown in part in a side sectional view and in part in a side view;

FIG. 4B is an end view of the ring shown in FIG. 4A;

FIG. 22A is a sectional view showing a still further example of the structure in which the electric circuit is mounted on the coil bobbin;

FIG. 22B is a fragmentary elevational view showing a still further example of the structure in which the electric circuit is mounted on the coil bobbin;

FIG. 23 is a sectional view showing a still further example of the structure in which the electric circuit is mounted on the coil bobbin;

FIG. 24 is a sectional view showing a still further example of the structure in which the electric circuit is mounted on the coil bobbin;

DETAILED DESCRIPTION OF THE EMBODIMENTS

Figure 1:
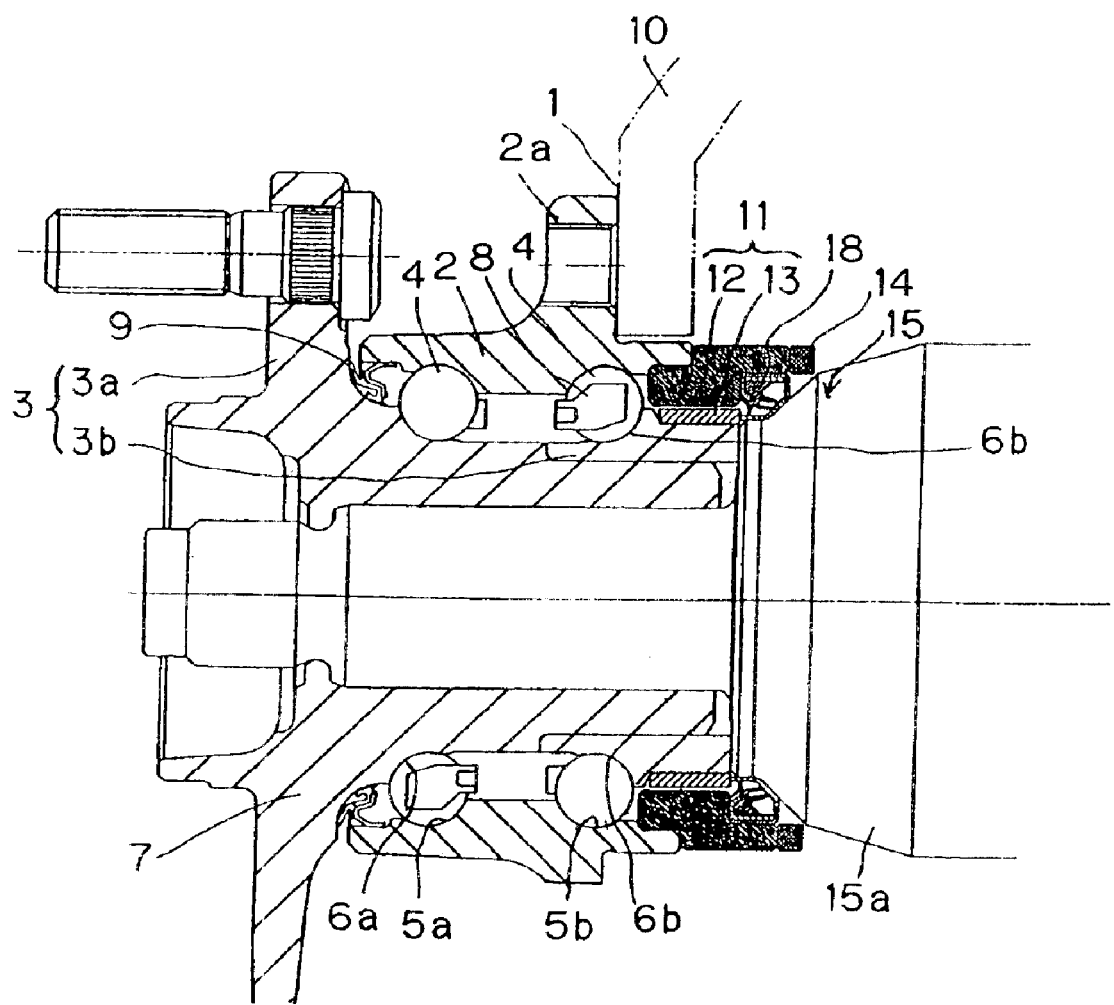
FIG. 1 is a longitudinal sectional view of a wheel support bearing assembly according to a first preferred embodiment of the present invention

FIG. 1 is a drawing of a wheel support bearing assembly of a type equipped with a rotation detecting device, which drawing is commonly used in describing the preferred embodiments of the present invention according to first to sixth aspects thereof. The wheel support bearing assembly shown therein includes a non-rotatable or stationary member 1 made up of a generally cylindrical outer member 2 and a knuckle 10 fixed to, for example, an automobile body structure or chassis. The outer member 2 is coupled with the knuckle 10 through a flange 2a that protrudes radially outwardly from the outer member 2. The wheel support bearing assembly also includes a rotatable member 7 made up of a generally cylindrical inner member 3 and an outer race 15a of a constant velocity universal joint 15 secured to an inner peripheral surface of the inner member 3. The outer member 2 has its inner peripheral surface formed with a plurality of, for example, two, axially spaced outer raceways 5a and 5b and, correspondingly, the inner member 3 has its outer peripheral surface formed with axially spaced inner raceways 6a and 6b aligned respectively with the raceways 5a and 5b.

The inner member 3 includes a hub wheel 3a and an inner race forming member 3b, and the inner raceways 6a and 6b referred to above are, so far as in the illustrated embodiment, defined in the hub wheel 3a and the inner race forming member 3b, respectively.

Rolling elements 4 arranged in circumferentially extending rows are accommodated within an annular working space defined between the outer and inner members 2 and 3 and are received in part within the outer raceways 5a and 5b and in part within the inner raceways 6a and 6b, respectively, to permit the inner member 3 to rotate relative to the outer member 2. As a matter of design, the rolling elements 4 of each circumferential row are retained in position by a retainer or cage 8. As such, the outer member 2, the inner member 3, the rolling elements 4 and the associated retainers 8 altogether constitute a rolling bearing assembly with the outer and inner members 2 and 3 defining outer and inner raceways. An outboard open end of the annular working space between the outer and inner members 2 and 3, that is adjacent the flange 3a, is sealed by a sealing member 9.

It is to be noted that the inner member 3 referred to above may not be always limited to the structure described, but may be of any suitable structure. By way of example, the inner member 3 may be of a structure made up of two raceway defining members for each row of the rolling elements 4 and a hub wheel, or of a structure formed integrally with the outer race 15a of the constant velocity universal joint 15 with at least one raceway defined on the outer race 15a for the rolling elements 4.

An electric power generator is generally identified by 11 and includes a generally cylindrical magnetic ring assembly 12 made of a magnetic material and having a coil built therein, and a multi-pole magnet assembly 13 positioned radially inwardly of the magnetic ring assembly 12 in face-to-face relation. This magnetic ring assembly 12 has its outer peripheral surface formed with a reduced diameter portion and a large diameter portion with a shoulder defined between the reduced and large diameter portions thereof and is carried by the outer member 2 with the reduced diameter portion of such magnetic ring assembly 12 fitted inside the inner peripheral surface of the outer member 2. In other words, the magnetic ring assembly 12 has one end portion fitted to the inner peripheral surface of the outer member 2. In the illustrated embodiment, the magnetic ring assembly 12 defines a stator of the electric power generator 11. On the other hand, the multi-pole magnet assembly 13 is magnetized to have a plurality of alternating magnetic poles spaced an equal distance from each other in a direction circumferentially thereof. This multi-pole magnet assembly 13 is fixedly mounted on the inner member 3 and, in the illustrated embodiment, defines a rotor of the electric power generator 11.

Referring now to FIGS. 4A and 4B, the magnetic ring assembly 12 is made up of two divided ferromagnetic ring members 30a and 30b held axially in face-to-face relation with each other. The ferromagnetic ring members 30a and 30b are each in the form of an annular member having such a sectional shape as best shown in FIG. 4B and are engaged with each other at their respective outermost peripheral portions 35 and 36. The first and second ferromagnetic ring members 30a and 30b have respective annular side walls 32 and 33 extending radially inwardly therefrom, and these annular side walls 32 and 33 are each formed with a plurality of claws 31a and 31b that are bent to protrude towards the opposed side walls 33 and 32 in a direction axially of the magnetic ring assembly 12. In an assembled condition of the magnetic ring assembly 12, the claws 31a integral with the first ferromagnetic ring member 30a and the claws 31b integral with the second ferromagnetic ring member 30b are interleaved with each other in a direction circumferentially of the magnetic ring assembly 12 with a predetermined space defined between the neighboring claws 31a and 31b. With the claws 31a and 31b interleaved with each other to represent a generally comb-shape and spaced a predetermined distance radially from the multi-pole magnet assembly 13, a so-called claw-pole type electric power generator is thus defined. It is to be noted that material for each of the ferromagnetic ring members 30a and 30b is preferably chosen to be a magnetic material having a resistance to rusting such as ferrite stainless steel, particularly that identified by SUS 430 according to the Japanese Industrial Standards (JIS).

The magnetic ring assembly 12 has a hollow defined between the first and second ferromagnetic ring members 30a and 30b and also has a coil (not shown) accommodated within such hollow. The coil within the hollow of the magnetic ring assembly 12 is retained in position by an elastic material 29 such as an elastic bonding material that fills up the hollow. This elastic material 29 serves not only to provide an electric insulation between the magnetic ring assembly 12 and the coil, but also to suppress a vibration of the coil relative to the magnetic ring assembly 12. This elastic material 29 furthermore serves to damp a force, which would be generated when the magnetic ring assembly 12 is press-fitted into the bearing assembly, to thereby prevent the coil from being adversely affected by such force.

Figure 2:
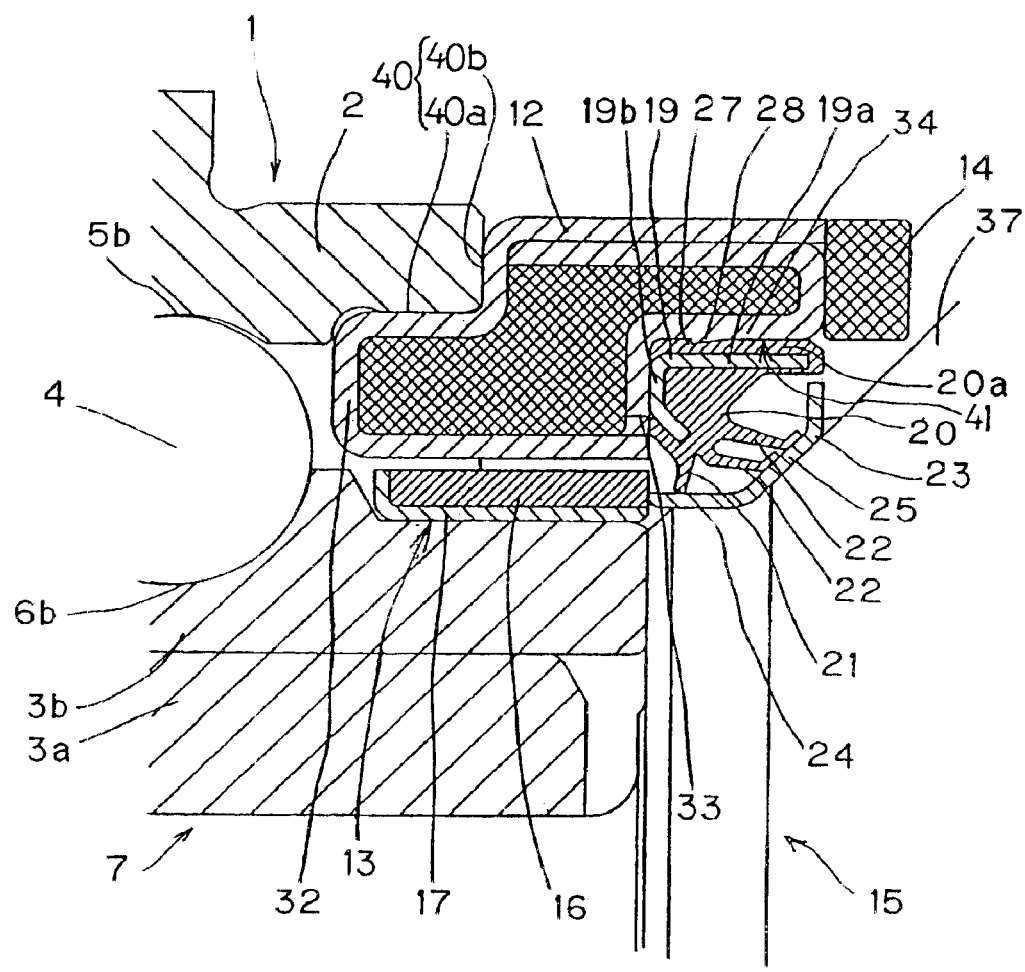
FIG. 2 is a fragmentary longitudinal sectional view, on an enlarged scale, of the wheel support bearing assembly of FIG. 1, showing the details of a rotation detecting device used therein.
Figure 3:
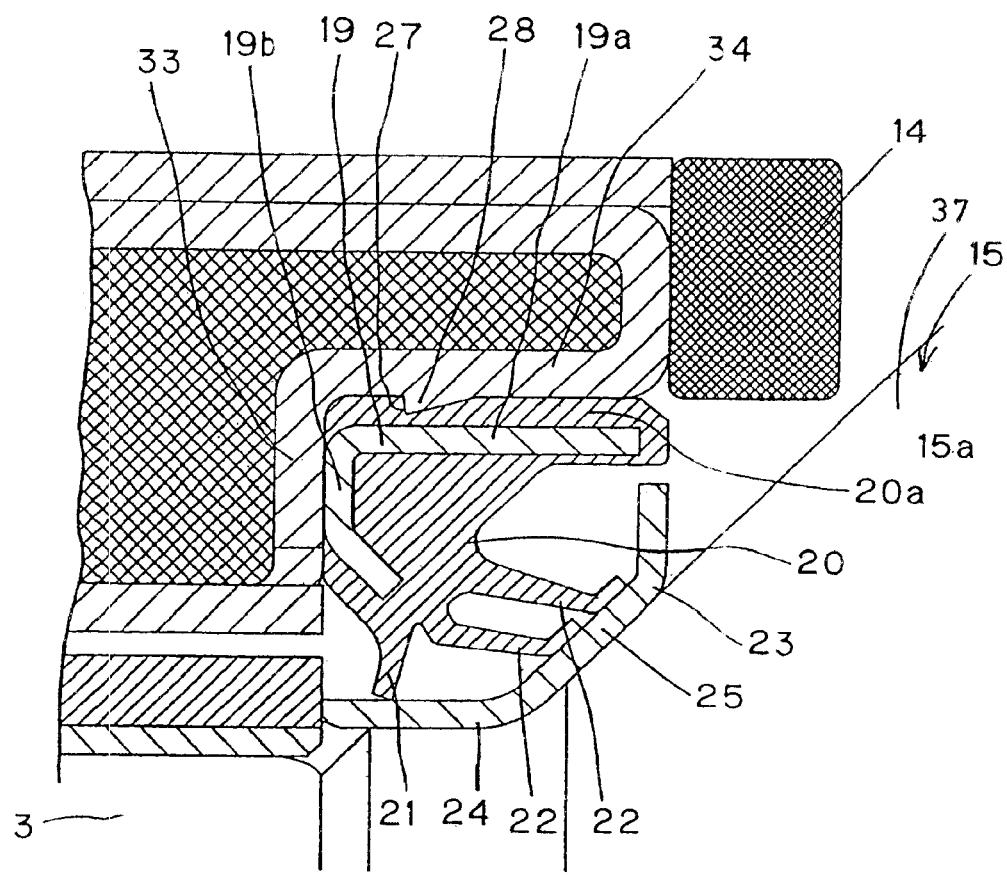
FIG. 3 is a fragmentary longitudinal sectional view, on a further enlarged scale, of the rotation detecting device of FIG. 2.

In the embodiment according to any one of the first to fourth aspects of the present invention, the multi-pole magnet assembly 13 is defined by a multi-pole magnet member 16 and an annular core metal 17 as best shown in FIG. 2. The magnet member 16 is in the form of, for example, a rubber magnet and is secured by vulcanization to the core metal 17. Where the core metal 17 is employed, the core metal 17 is preferably made of a magnetic material, particularly a ferromagnetic material. The core metal 17 may be in the form of either an annular member of a generally L-shaped section or an annular member of a generally U-shaped section. The annular core metal 17 is fixed in potion as press-fitted on the outer peripheral surface of the inner member 3. The multi-pole magnet assembly 13 may be either a plastic magnet or a sintered magnet and may be bonded to the outer peripheral surface of the inner member 3 by the use of, for example, a bonding agent. Where the multi-pole magnet assembly 13 is employed in the form of the plastic magnet or the sintered magnet, the use of the core metal 17 may be dispensed with.

A wireless transmission device 14 is of an annular shape and is integrated together with, that is, fixedly connected with the magnetic ring assembly 12. This wireless transmission device 14 is positioned at a location axially outwardly of the magnetic ring assembly 12 and has its inner and outer diameters generally matching with those of an axial outer end of the magnetic ring assembly 12. The wireless transmission device 14 may be of a box-like configuration instead of the annular configuration and may not necessarily be integrated together with the magnetic ring assembly 12, but may be fixedly secured to, for example, the knuckle 10. This wireless transmission device 14 is comprised of a transmitting device containing electronic component parts and an antenna and is electrically powered by the electrical power generator 11. Some or all of the electronic component parts of the wireless transmission device 14 may be accommodated within the magnetic ring assembly 12 of the electric power generator 11.

The magnetic ring assembly 12 has its inner peripheral surface of a generally stepped configuration having a depressed corner area delimited by the annular side wall 33 and an inner peripheral wall 34 thereof, and a sealing member 18 is mounted in this corner area. This sealing member 18 is of a structure including a core metal 19 of a generally L-shaped section bonded and, hence, integrated together with a sealing element 20 made of an elastic material. The sealing element 20 has a plurality of elastic lips. Although the number of the elastic lips may be suitably chosen, the sealing element 20 so far shown includes a single radial lip 21 and two side lips 22.

A slinger 23 made of a stainless steel and defining a seal contact area is provided in the rotatable member 7 so as to confront the sealing member 18. Specifically, this slinger 23 is press-fitted onto a shoulder of a cup portion 37 of the outer race 15*a* of the constant velocity universal joint 15 and includes a cylindrical portion 24, slidably engaged with the radial lip 21 of the sealing member 18, and an inclined collar 25 slidably engaged with the side lips 22 and 22 of the sealing member 18. While the seal contact area with which the radial lip 21 and the side lips 22 and 22 are slidingly engaged may be defined directly on an outer peripheral surface of the cup portion 37 of the constant velocity universal joint 15, the use of the slinger 23 is preferred in order to secure a high rust proof in the seal contact area and also to realize a high performance sealing.

While the core metal 19 referred to above has a hollow cylindrical wall 19*a* and a radial end wall 19*b* extending radially inwardly from one end of the hollow cylindrical wall 19*a*, the sealing member 18 having the sealing element 20 covering an outer peripheral surface of the hollow cylindrical wall 19*a* of the core metal 19 is mounted to the magnetic ring assembly 12 with the radial end wall 19*b* of the core metal 19 held in abutment with the annular side wall 33 of the magnetic ring assembly 12 and also with the hollow cylindrical wall 19*a* of the core metal 19 press-fitted into the inner peripheral wall 34 of the magnetic ring assembly 12. A portion 20*a* of the sealing element 20 that covers the outer peripheral surface of the hollow cylindrical wall 19*a* of the core metal 19 is formed with an engaging portion 27 over the entire circumference, or with a plurality of the engaging portions 27 at a corresponding number of locations on the circumference, which engaging portions 27 may be of a recess or projection. On the other hand, the inner peripheral wall 34 of the magnetic ring assembly 12 is formed with a to-be-engaged portion 28 over the entire circumference, or with a plurality of the to-be-engaged portions 28 at a corresponding number of locations on the circumference, which to-be-engaged portions 28 may be of a recess or projection. Accordingly, when the sealing member 18 is mounted inside the magnetic ring assembly 12, the engaging portions 27 of the sealing element 20 are engaged with the to-be-engaged portions 28 of the magnetic ring assembly 12, respectively. Although without the engaging portions 27 and the to-be-engaged portions 28 being formed, the sealing member 18 may be fitted inside the inner peripheral wall 34 of the magnetic ring assembly 12, formation of the engaging portions 27 and the to-be-engaged portions 28 is preferred in order to avoid any possible separation of the sealing member 18 from the magnetic ring assembly 12. It is to be noted that the sealing member 18 may be mounted inside the magnetic ring assembly 12 by fixing the hollow cylindrical wall 19*a* of the core metal 19 to the inner peripheral wall 34 of the magnet ring assembly 12 without an outer peripheral surface of the cylindrical wall 19*a* of the core metal 19 being covered by the sealing element 20 or with a part of an free end of the cylindrical wall 19*a* being covered by the sealing member 20 such that the radial end wall 19*b* of the core metal 19 can be held in abutment with the annular side wall 33 of the magnetic ring assembly 12.

The outboard sealing member 9 and the inboard sealing member 18 cooperate with each other to prevent external saline dirt and grits from entering the annular working space between the outer and inner members 2 and 3. In particular, the inboard sealing member 18 is highly effective in that three sealing lips including the side lips 22 and 22 and the radial lip 21 provide a high performance seal to avoid ingress of saline dirt and grits from the outside into the annular working space. Since the multi-pole magnet assembly 13 of the electric power generator 11 is disposed inside the high performance seal, there is no possibility that the multi-pole magnet assembly 13 may be exposed to foreign matters such as saline dirt and grits and, therefore, the need to use any additional sealing elements for a rust proofing and prevention of ingress of foreign matters can advantageously be eliminated.

Figure 5:
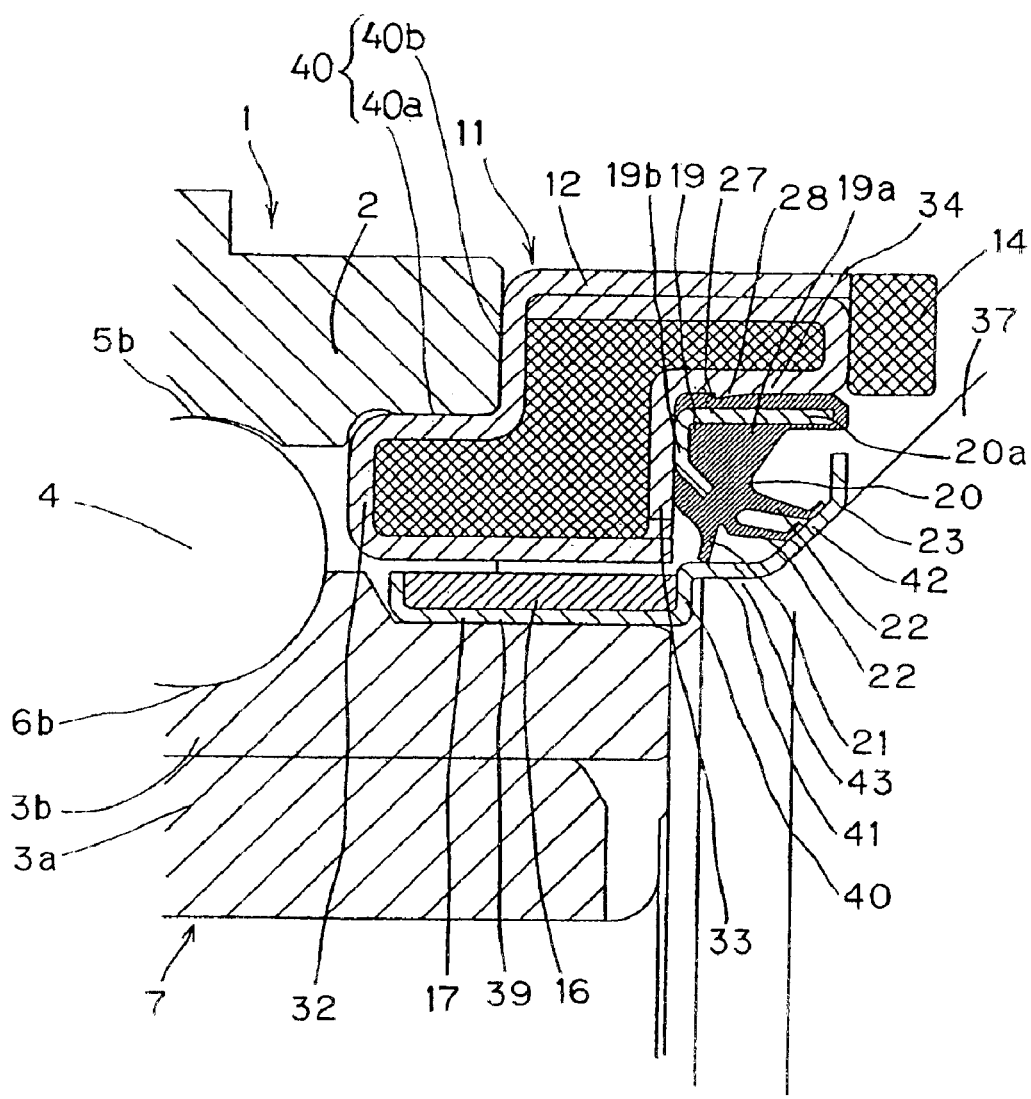
FIG. 5 is a fragmentary longitudinal sectional view showing the details of the rotation detecting device employed according to a second preferred embodiment of the present invention.

FIG. 5 illustrates a modified form of the seal contact area according to a second preferred embodiment of the present invention. In this modification, a core metal 39 of the multi-pole magnet assembly 13 is formed integrally with the slinger 23 that is made of stainless steel. This slinger 23 includes a first hollow cylindrical wall of a reduced diameter that defines the core metal 39, a second hollow cylindrical wall 41 of a large diameter, an intermediate annular shoulder 40 intervening between the first and second hollow cylindrical walls 39 and 41, and an inclined collar 42 continued axially outwardly from the second hollow cylindrical wall 41 with a free end of the inclined collar 42 bent to extend upright in a radially outward direction. This slinger 23 is mounted on the inner member 3, particularly the inner race forming member 3b with the second hollow cylindrical wall 41 thereof press-fitted onto a shoulder 43 of the cup portion 37 of the constant velocity universal joint 15. It is, however, to be noted that instead of the second hollow cylindrical wall 41 being press-fitted onto the cup portion 37 of the constant velocity universal joint 15, the slinger 23 may be mounted on the inner member 3 by press-fitting the core metal 39 onto the inner member 3. Other structural features of the wheel support bearing assembly shown in FIG. 5 are similar to those shown in and described with reference to FIGS. 1 to 4B in connection with the first embodiment and, therefore, the details thereof are not reiterated for the sake of brevity.

Figure 6:
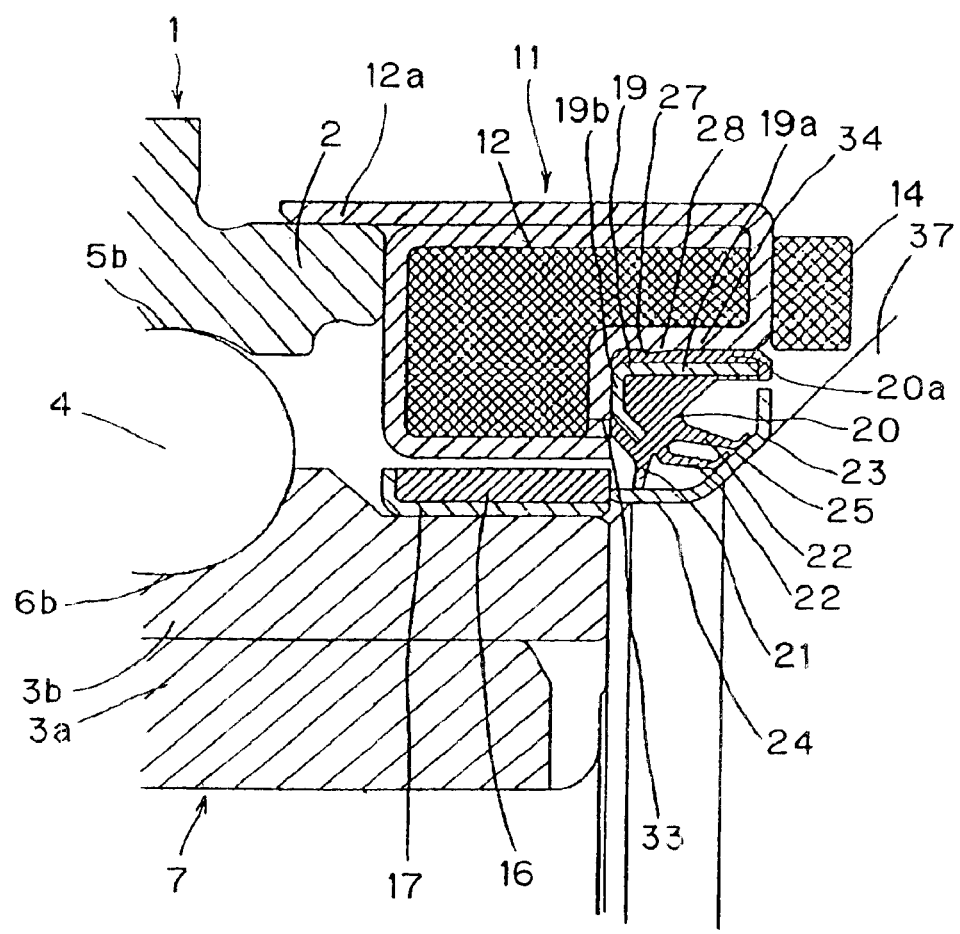
FIG. 6 is a fragmentary longitudinal sectional view showing the details of the rotation detecting device employed according to a third preferred embodiment of the present invention.

FIG. 6 illustrates the wheel support bearing assembly according to a third preferred embodiment of the present invention. This third embodiment is featured in that an outer peripheral wall of the magnetic ring assembly 12 of the electric power generator 11 is provided with a cylindrical extension 12a protruding axially thereof so that the electric power generator 11 can be mounted on the outer member 2 with the cylindrical extension 12a press-fitted onto the outer peripheral surface of the outer member 2. The cylindrical extension 12a is an integral part of a ferromagnetic ring assembly forming a part of the magnetic ring assembly 12. An annular end wall of the electric power generator 11 adjacent the outer member 2 is step-less and is held in abutment with an annular end face of the outer member 2. Other structural features of the wheel support bearing assembly shown in FIG. 6 are similar to those shown in and described with reference to FIGS. 1 to 4B in connection with the first embodiment and, therefore, the details thereof are not reiterated for the sake of brevity.

Figure 7:
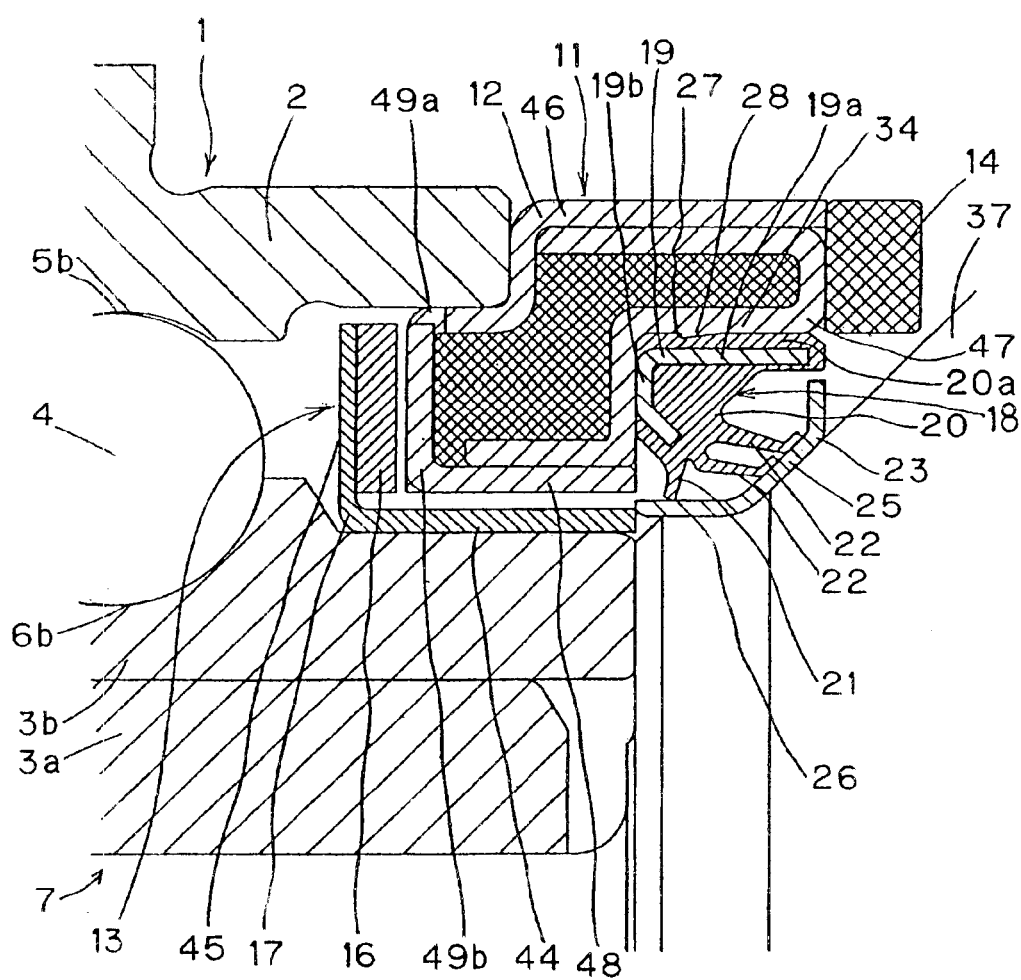
FIG. 7 is a fragmentary longitudinal sectional view showing the details of the rotation detecting device employed according to a fourth preferred embodiment of the present invention.

FIG. 7 illustrates the wheel support bearing assembly according to a fourth preferred embodiment of the present invention. The embodiment shown in FIG. 7 is featured in that the electric power generator 11 employed therein is of an axial type in which the multi-pole magnet assembly 13 and the magnetic ring assembly 12 confront with each other in a direction axially of the wheel support bearing assembly. As such, the core metal 17 is of a generally L-sectioned configuration having a hollow cylindrical wall 44 and a radially outwardly extending annular upright wall 45 lying perpendicular to the hollow cylindrical wall 44, and a magnet member 16 of the multi-pole magnet assembly 13 shown in FIG. 7 is secured to the annular upright wall 45 of the core metal 17. Specifically, the multi-pole magnet assembly 13 has a configuration in which the magnet member 16 is held to confront an axially oriented inner side face of the magnetic ring assembly 12 while the hollow cylindrical wall 44 of the core metal 17 is press-fitted onto the outer peripheral surface of the inner member 3 with the annular upright wall 45 oriented axially inwardly. Other structural features of the wheel support bearing assembly shown in FIG. 7 are similar to those shown in and described with reference to FIGS. 1 to 4B in connection with the first embodiment and, therefore, the details thereof are not reiterated for the sake of brevity.

FIGS. 8 to 11 illustrate fifth to eighth preferred embodiments of the present invention, respectively. In those embodiments, the wireless transmission device 14 is of an annular configuration and is fixedly connected with the magnetic ring assembly 12 and is positioned at a location axially outwardly of the magnetic ring assembly 12 of the electric power generator 11 with the sealing member 18 arranged radially inwardly of such wireless transmission device 14. Those embodiments shown respectively in FIGS. 8 to 11 differ from each other in a sectional shape of the magnet ring assembly 12 and also in respect of the manner in which the magnetic ring assembly 12 and the wireless transmission device 14 are installed, but other structural features thereof than the manner of positioning of the wireless transmission device 14 relative to the magnetic ring assembly 12 are similar and common to each other.

To describe the structural features common to all of those embodiments shown respectively in FIGS. 8 to 11, the magnetic ring assembly 12, even though having a slightly different sectional shape for each of those embodiments, is of the structure enough to define the claw-pole type electric power generator shown in FIG. 4. Also, this magnetic ring assembly 12 includes a pair of ferromagnetic ring members 30a and 30b. In addition, the multi-pole magnet assembly 13, the slinger 23 defining the seal contact area and the sealing member 18 employed in each of those embodiments of FIGS. 8 to 11 are similar to those shown in and described with reference to FIGS. 1 to 4B in connection with the first embodiment of the present invention.

The wireless transmission device 14 includes a wireless transmitting device 38 having electronic component parts and an antenna accommodated therein, which device 38 is fixed to a mounting ring 26. Some or all of the electronic component parts of the wireless transmitting device 38 may be built in the magnetic ring assembly 12. The mounting ring 26 has a generally Z-shaped section delimited by an inner cylindrical body 26a positioned radially inwardly of the wireless transmitting device 38, an annular stepped wall 26b lying perpendicular to the inner cylindrical body 26a, and an outer cylindrical body 26c lying perpendicular to the annular stepped wall 26b and extending axially in a direction counter to the inner cylindrical body 26a. This mounting ring 26 may be of one-piece construction including those walls 26a to 26c formed by the use of any known press work. The wireless transmitting device 38 is fixedly mounted externally on the inner cylindrical body 26a.

The sealing member 18 includes the sealing element 20 which may cover the outer peripheral surface of the hollow cylindrical wall 19a of the core metal 19. This sealing member 18 is accommodated within the inner cylindrical body 26a of the mounting ring 26 with the radial end wall 19b thereof held in abutment with the annular side wall 33 of the magnetic ring assembly 12.

The wireless transmission device 14 has an inner peripheral surface formed with a plurality of the to-be-engaged portions 28 which may be in the form of projections or recesses, while the sealing member 18 is formed with a corresponding number of the engaging portions 27 which may be in the form of recesses or projections and which engage the associated to-be-engaged portions 28 on the inner peripheral surface of the wireless transmission device 14. Accordingly, the sealing member 18 is mounted inside the wireless transmission device 14 with the to-be-engaged portions 28 engaged with the engaging portions 27. The to-be-engaged portions 28 are formed in the mounting ring 26. The engaging portions 27 and the to-be-engaged portions 28 may be formed over the entire circumference or at discrete locations.

Hereinafter, each of the fifth to eighth embodiments shown respectively in FIGS. 8 to 11 will be described. It is, however, to be noted that those embodiments are similar to the first preferred embodiment described with reference to FIGS. 1 to 4B, except for features specifically described hereinbelow.

Figure 8:
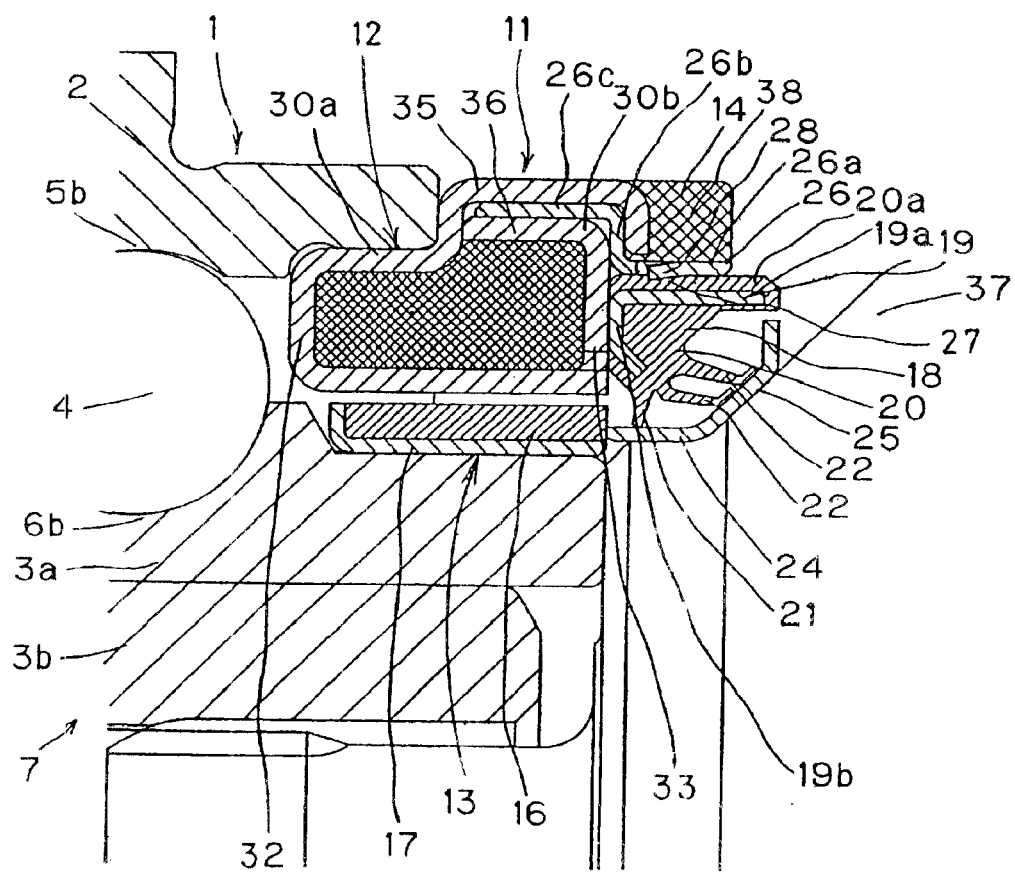
FIG. 8 is a fragmentary longitudinal sectional view showing the details of the rotation detecting device employed according to a fifth preferred embodiment of the present invention.

In the fifth embodiment shown in FIG. 8, the magnetic ring assembly 12 has an outer peripheral surface of a generally cylindrical configuration including a reduced diameter portion and a large diameter portion with an annular step intervening therebetween. This magnetic ring assembly 12 is carried by the outer member 2 with the reduced diameter portion thereof press-fitted into the inner peripheral surface of the outer member 2. In other words, the magnetic ring assembly 12 has an axial end portion press-fitted into the inner periphery of the outer member 2. The inner peripheral surface and the annular side wall 33 of the magnetic ring assembly 12 represent a flat surface with no step formed therein.

The mounting ring 26 for the wireless transmission device 14 is integrated together with the magnetic ring assembly 12 by allowing the mounting ring 26 to be firmly sandwiched between the respective outermost peripheral portions 35 and 36 of the first and second ferromagnetic ring members 30a and 30b while the annular stepped wall 26b is held in abutment with the annular stepped wall 33 of the ferromagnetic ring member 30b. It is, however, to be noted that, after the mounting of the ferromagnetic ring member 30b and the mounting ring 26, a free end of the outermost peripheral portion 35 of the ferromagnetic ring member 30a of the magnetic ring assembly 12 may be crimped to extend close towards the annular stepped wall 26b of the mounting ring 26 to thereby avoid any possible separation of such mounting members. The inner cylindrical body 26a protrudes axially outwardly from the annular stepped wall 33 of the magnetic ring assembly 12, and the sealing member 18 is engaged in the wireless transmission device 14 with the inner cylindrical body 26a of the mounting ring 26 intervening therebetween. The sealing member 18 is thus engaged in a corner area delimited by the inner cylindrical body 26a of the mounting ring 26 and the annular stepped wall 33 of the magnetic ring assembly 12. Material for the mounting ring 26 is, since it is sandwiched within the magnetic ring member 12 in the manner described above, chosen to be a magnetic material and, in particular, a magnetic material having a rust proof. It is to be noted that the mounting ring 26 may be rigidly connected with the magnetic ring assembly 12 by the use of any known welding technique.

Since the annular wireless transmission device 14 is positioned axially outwardly of the magnetic ring assembly 12 and is used as an element for carrying the sealing member 18, any possible use of otherwise required projection for supporting the sealing member of the electric power generator 11 can advantageously be eliminated and the length of the magnetic path in the magnetic ring assembly 12 can be reduced to thereby lower the magnetic resistance. As a result thereof, the efficiency of electric power generation can be increased advantageously and the electric power generator can be assembled compact in size. Also, in view of the fact that the annular wireless transmission device 14 is mounted onto and is hence integrated together with the magnetic ring assembly 12, the outer and inner members 2 and 3 can be accurately and exactly aligned coaxially with each other, resulting in increase of the sealing performance.

Figure 9:
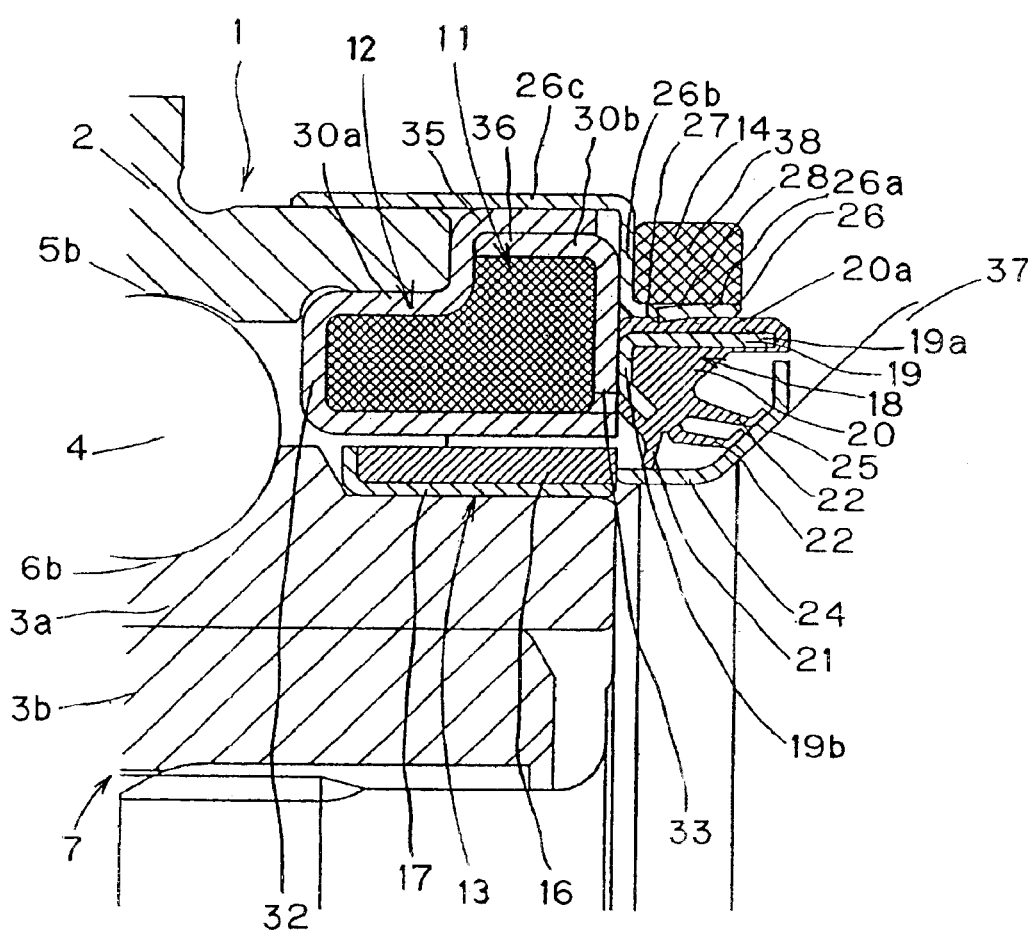
FIG. 9 is a fragmentary longitudinal sectional view showing the details of the rotation detecting device employed according to a sixth preferred embodiment of the present invention.

In the sixth embodiment shown in FIG. 9, the wireless transmission device 14 is mounted on the outer member 2 by mounting the outer cylindrical body 26c of the mounting ring 26 on the outer peripheral surface of the outer member 2. In this structure, material for the mounting ring 26 does not need to be magnetic provided that it has a rust proof. For example, austenite stainless steel such as identified by SUS 304 according to the Japanese Industrial Standard (JIS) may be employed therefor. However, the magnetic ring assembly 12 may be made of a material having no rust proof, but having a high magnetic permeability. By way of example, Permalloy®, silicon steel plate, rolled steel plate or the like may be employed as material for the magnetic ring assembly 12. The use of the material of a high magnetic permeability is effective to increase the efficiency of electric power generation and also to reduce the size of the electric power generator 11.

Figure 10:
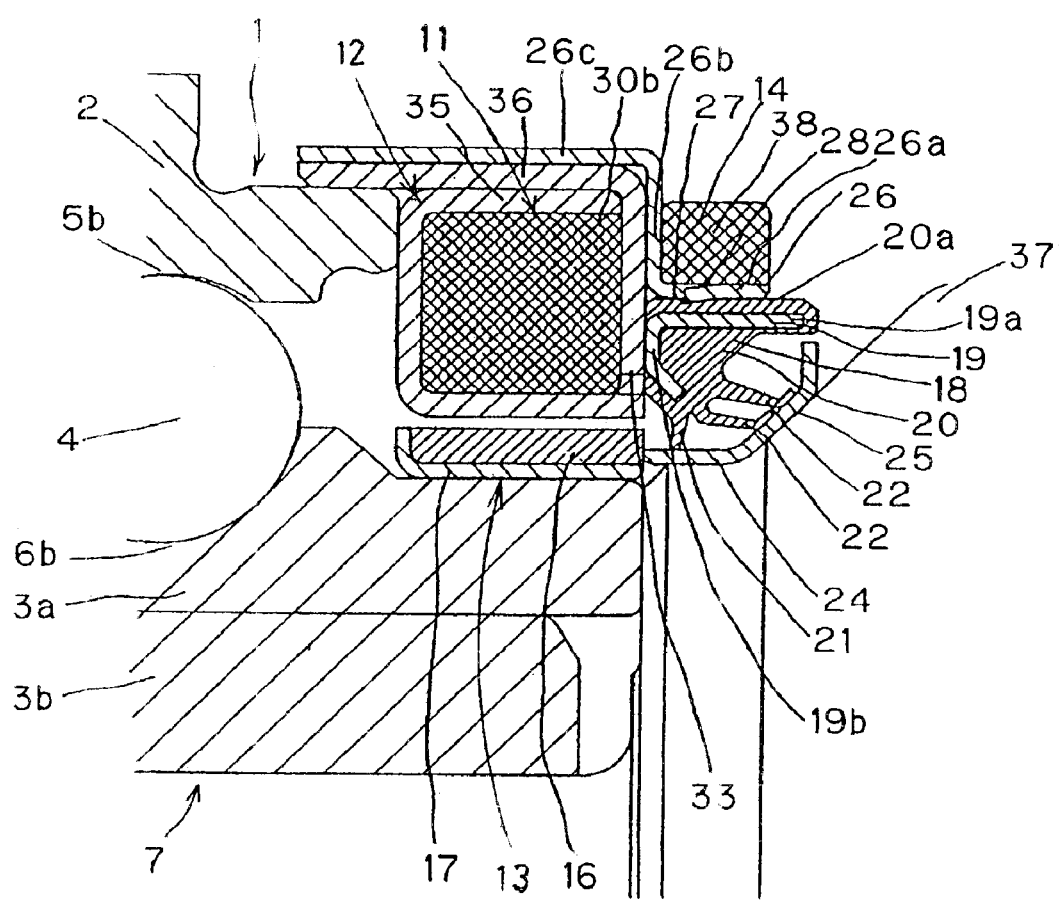
FIG. 10 is a fragmentary longitudinal sectional view showing the details of the rotation detecting device employed according to a seventh preferred embodiment of the present invention.

In the seventh embodiment shown in FIG. 10, the magnetic ring assembly 12 has a generally rectangular sectional shape and also has its outermost peripheral portion 36 protruding axially inwardly, so that the magnetic ring assembly 12 can be capped onto the outer member 2 by press-fitting the protruding extension to the outer peripheral surface of the outer member 2. The wireless transmission device 14 employed therein is mounted on the magnetic ring assembly 12 with the mounting ring 26 mounted under interference fit around the outer periphery of the magnetic ring assembly 12. The outer cylindrical body 26c of the mounting ring 26 extends to a position immediately above the outer peripheral surface of the outer member 2, while the annular stepped wall 26b of the mounting ring 26 is held in contact with the annular stepped wall 33 of the magnetic ring assembly 12. It is, however, to be noted that the mounting ring 26 may be rigidly connected with the magnetic ring assembly 12 by the use of any known welding technique.

Figure 11:
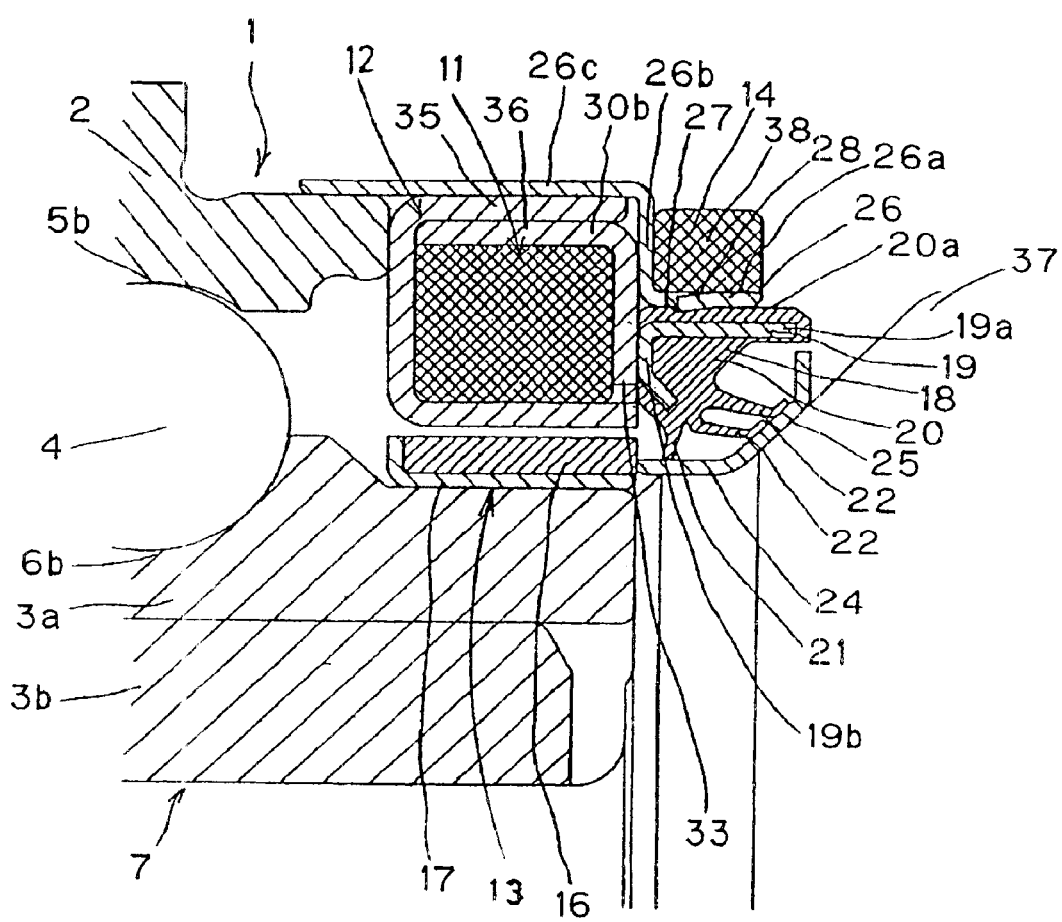
FIG. 11 is a fragmentary longitudinal sectional view showing the details of the rotation detecting device employed according to an eighth preferred embodiment of the present invention.

In the eighth embodiment shown in FIG. 11, the mounting ring 26 is fixedly mounted on the outer member 2 with the outer cylindrical body 26c thereof press-fitted around the outer peripheral surface of the outer member 2. The magnetic ring assembly 12 employed therein has a generally rectangular sectional shape and is press-fitted into the inner peripheral surface of the outer cylindrical body 26c of the mounting ring 26 to thereby integrate the magnetic ring assembly 12 and the wireless transmission device 14 together.

In describing any one of the foregoing various embodiments of the present invention, the electric power generator 11 has been described as concurrently serving as a rotation detecting device. However, according to a broad aspect of the present invention, the use may be made of a sensor (not shown), separate from the electric power generator 11, for detecting the number of revolutions, i.e., the rotational speed, in which case the electric power generator 11 may provide an electric power source for such sensor. By way of example, for the rotational speed sensor, a magnetic sensor such as a Hall element for detecting the multi-pole magnet assembly 13 of the electric power generator 11 may be used, while the multi-pole magnet assembly 13 is concurrently used as a rotor of the electric power generator 11 and also as a rotational speed detecting member. Where a rotational speed detecting sensor separate from the electric power generator 11 is employed, the wireless transmission device 14 may be used to transmit wireless a detection signal outputted from the sensor. In such case, the electric power generated by the electric power generator 11 is also used for driving the wireless transmission device 14. Also, where a sensor for detecting a parameter (such as vibrations or temperature) other than the rotational speed is employed being separate from the electric power generator 11, the wireless transmission device 14 may be used to transmit wireless the rotational speed detection signal detected and outputted by the electric power generator 11 and such parameter signal detected and outputted by the parameter detecting sensor.

Figure 12:
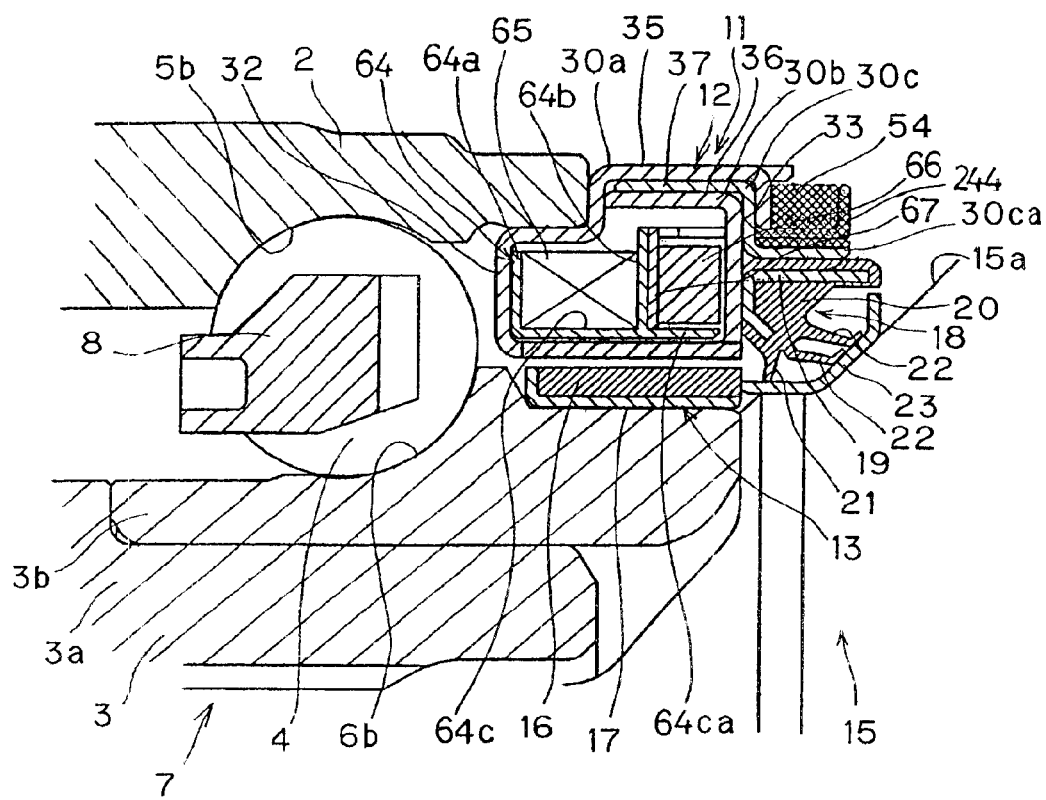
FIG. 12 is a fragmentary longitudinal sectional view, on an enlarged scale, showing the electric power generator employed in the wheel support bearing assembly according to a ninth preferred embodiment of the present invention.

In the embodiment according to a fifth aspect of the present invention, as shown in FIG. 12, a coil 65 wound around a coil bobbin 64 is accommodated within the magnetic ring assembly 12 which defines a yoke of the electric power generator 11. The coil bobbin 64 is in the form of a generally U-sectioned ring member having opposite end walls 64a and 64b and a bottom wall 64c connecting the opposite end walls 64a and 64b together to define a groove that opens radially outwardly. The coil 65 is wound and, hence, accommodated within the groove delimited by the walls 64a to 64c. It is to be noted that the bottom wall 64c of the coil bobbin 64 extends axially outwardly from the end wall 64b to define a cylindrical extension 64ca, and an electric circuit 66 that utilizes an output from the electric power generator 11 is disposed within an annular space delimited between the end wall 64b and the cylindrical extension 64ca. The coil bobbin 64 for the coil 65 is fixed on the magnetic ring assembly 12 by means of an elastic layer 63 (See FIG. 14) prepared from an elastic bonding material, which elastic layer 63 fills up axial and radial gaps 68 and 69 delimited between the coil bobbin 64 and the magnetic ring assembly 12. The elastic layer 63 may be a molded resin having an elasticity. Thus, since the coil bobbin 64 is elastically fixed to the magnetic ring assembly 12 through the elastic layer 63, not only can an undesirable deformation of the magnetic ring assembly 12 be prevented, but an undesirable direct transmission of vibrations to the coil 65 can also be avoided.

Figure 13:
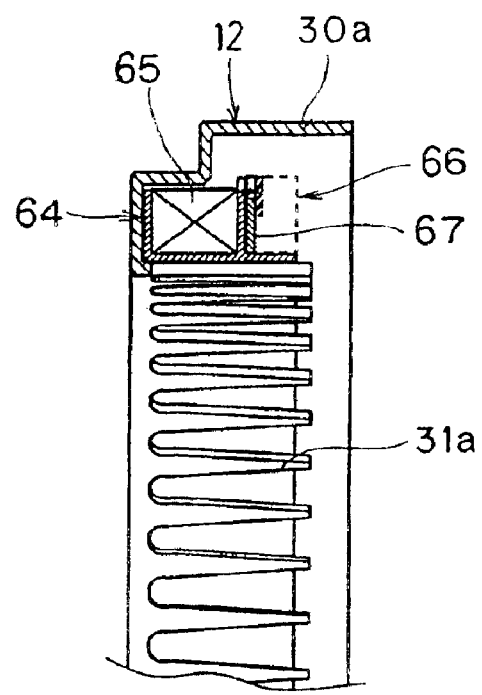
FIG. 13 is a fragmentary side sectional view showing the relationship in position between a component of the magnetic ring assembly and a coil bobbin.
Figure 14:
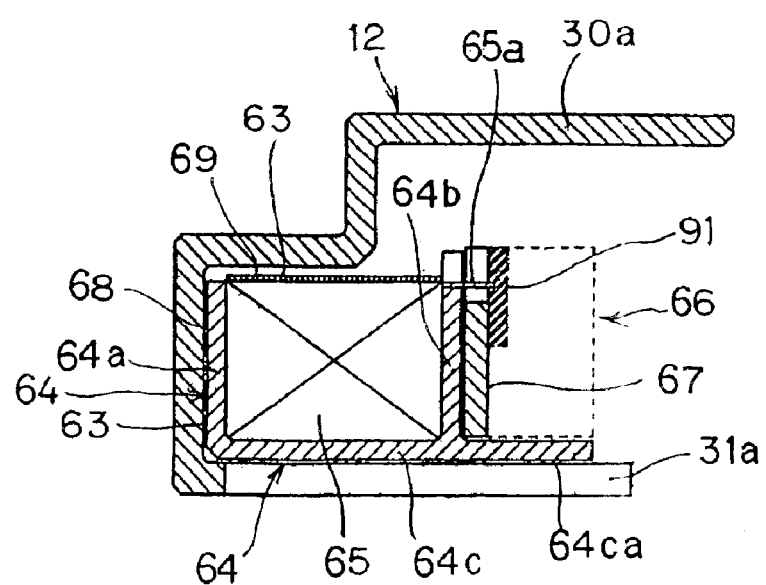
FIG. 14 is a fragmentary side sectional view showing a portion of the magnetic ring assembly on an enlarged scale.
Figure 15A:
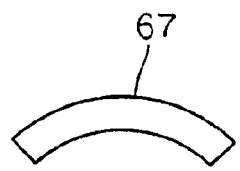
FIGS. 15A and 15B are plan views showing different examples of an electric circuit substrate used in the electric power generator, respectively.
Figure 15B:
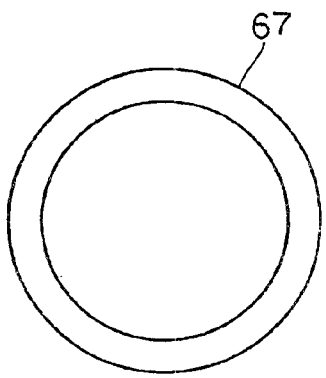

The electric circuit 66 includes an electric circuit substrate 67 having various electric component parts mounted thereon, which electric circuit substrate 67 is fitted to the end wall 64b of the coil bobbin 64. FIG. 13 illustrates a positional connection between the ferromagnetic ring member 30a, which forms a part of the magnetic ring assembly 12, and the coil bobbin 64 that is fitted to the ferromagnetic ring member 30a, and FIG. 14 illustrate that connection on an enlarged scale. As best shown in FIG. 14, the coil 65 has a lead line 65a connected directly to an input terminal 91 of the electric circuit substrate 67, thereby eliminating a terminal treatment such as connecting the lead line of the coil with an extra bold electric line such as required in the conventional wheel support bearing assembly. The electric circuit substrate 67 referred to above is preferably of either a generally arcuate shape such as shown in FIG. 15A or an annular shape such as shown in FIG. 15B so that the electric circuit substrate 67 when fitted to the end wall 64b of the coil bobbin 64 can follow the curvature of the end wall 64b. Accordingly, the electric circuit 66 can be compactly provided in the coil bobbin 64 without allowing any portion of the electric circuit 66 to protrude outwardly from the contour of the coil bobbin 64.

The electric circuit 66 includes, as shown in a circuit block diagram of FIG. 16, a signal processing circuit 240 for processing an electric power output generated by the electric power generator 11 to provide a rotational speed detection signal indicative of the rotational speed, a transmitter circuit 242 for converting the rotational speed detection signal, processed by the signal processing circuit 240, into a radio wave which is subsequently transmitted wireless from a transmitting antenna 244 connected with such transmitter circuit 242, and an electric power source circuit 243 for providing an electric power source for supplying the signal processing circuit 240 and the transmitter circuit 242 with the electric power output generated by the electric power generator 11. The transmitter circuit 242 is comprised of an oscillating and modulating circuit. The transmitter circuit 242 and the transmitting antenna 244 altogether constitutes a transmitting unit 241A of a wireless transmission device 241. The wireless transmission device 241 is made up of the transmitting unit 241A and a receiving unit 241B. The receiving unit 241B includes a receiving antenna 252, and a receiver circuit 253 comprised of a tuning and demodulating circuit for tuning the wireless transmitted signal received for demodulation. It is to be noted that for detection of the rotational speed of the wheel, a separate sensor dedicated therefor may be employed instead of the electric power output from the electric power generator 11 being used therefor such as in the embodiment now under discussion. The rotational speed detection signal received by the receiving unit 241B may be utilized for control of an anti-skid braking system, or the like.

The transmitting antenna 244 of the transmitting unit 241A is, as best shown in FIG. 12, disposed on an outer periphery of a reduced diameter portion 30ca of the ferromagnetic ring member 30c forming a part of the magnetic ring assembly 12, together with an extra member 54. The transmitting antenna 244 and the transmitter circuit 242 in the electric circuit 66 are electrically connected with each other by means of wiring (not shown) passing through a small insertion hole defined in the annular side wall 33 of the magnetic ring assembly 12. This small insertion hole defined in the annular side wall 33 of the magnetic ring assembly 12 for the passage of the wiring is treated to have a water proofing property when the extra member 54 provided together with the transmitting antenna 244 is fitted and, accordingly, any undesirable ingress of foreign matter such as saline dirt and grits through the small insertion hole into the magnetic ring assembly 12 can be effectively avoided.

Figure 17:
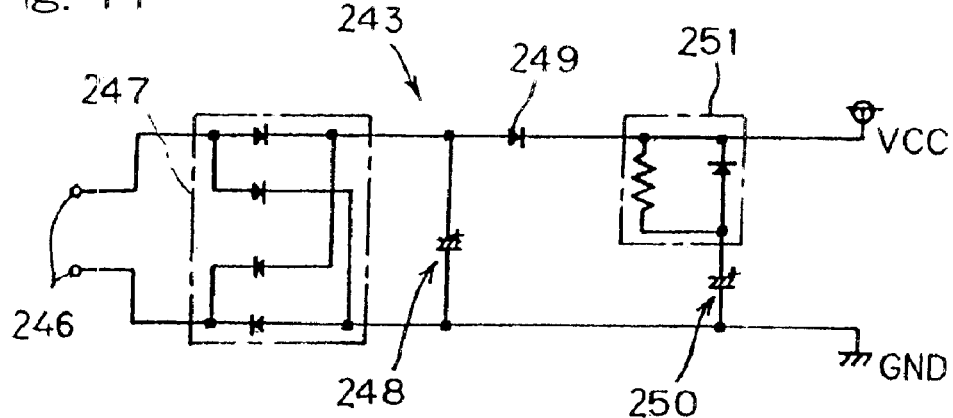
FIG. 17 is an electric circuit diagram showing an example of an electric power source circuit used in the electric circuit shown in FIG. 16.

FIG. 17 illustrates one example of the electric power source circuit 243 referred to above. As shown therein, an electric current generated by the electric power generator 11 is rectified and then smoothed by a rectifier circuit 247 and a smoothing capacitor 248, respectively, and is subsequently outputted from an electric power output terminal VCC through a diode 249. A super capacitor 250 is disposed in a stage following the diode 249 and between the electric power output terminal VCC on a plus side and a ground terminal GND, and a parallel circuit 251 including a diode and a resistor is interposed between a plus end of the super capacitor 250 and the electric power output terminal VCC.

As best shown in FIG. 12, the multi-pole magnet assembly 13 includes the multi-pole magnet member 16 and the annular core metal 17. The magnet member 16 is in the form of, for example, a rubber magnet and is secured by vulcanization to the core metal 17. Where the core metal 17 is employed, the core metal 17 is preferably made of a magnetic material, particularly a ferromagnetic material. The core metal 17 may be in the form of either an annular member of a generally L-shaped section or an annular member of a generally U-shaped section. The annular core metal 17 is fixed in potion as press-fitted on the outer peripheral surface of the inner member 3. The multi-pole magnet assembly 13 may be either a plastic magnet or a sintered magnet and may be bonded to the outer peripheral surface of the inner member 3 by the use of, for example, a bonding agent. Where the multi-pole magnet assembly 13 is employed in the form of the plastic magnet or the sintered magnet, the use of the core metal 17 may be dispensed with.

The sealing member 18 is disposed at a location radially inwardly of the reduced diameter portion 30ca of the ferromagnetic ring member 30c forming a part of the magnetic ring assembly 12. This sealing member 18 includes the sealing element 20 of an elastic material integrated by bonding together with the core metal 19. The core metal 19 is of a generally L-shaped section. The sealing element 20 has a plurality of elastic lips. Although the number of the elastic lips may be suitably chosen, the sealing element 20 so far shown includes a single radial lip 21 and two side lips 22. The slinger 23 made of a stainless steel and defining a seal contact area is disposed on the rotatable member 7 in face-to-face relation with the sealing member 18.

The operation of the electric power generator 11 of the structure discussed above with reference to FIGS. 12 to 17 will now be described. The electric power output from the electric power generator 11 is inputted to the electric circuit 66 disposed inside the magnetic ring assembly 12 that defines the yoke of the electric power generator 11 and is then processed by the signal processing circuit 240 to provide the rotational speed detection signal. The electric power output from the electric power generator 11 is also supplied to the electric power source circuit 243 and then provides the signal processing circuit 240 and the transmitter circuit 242 with an electric power after having been rectified and smoothed by the rectifier circuit 247 and the smoothing capacitor 248, respectively. The resultant rotational speed detection signal is thereafter transmitted wireless in the form of a radio wave from the transmitter circuit 242 to the receiving unit 241B through the transmitting antenna 244.

Figure 18A:
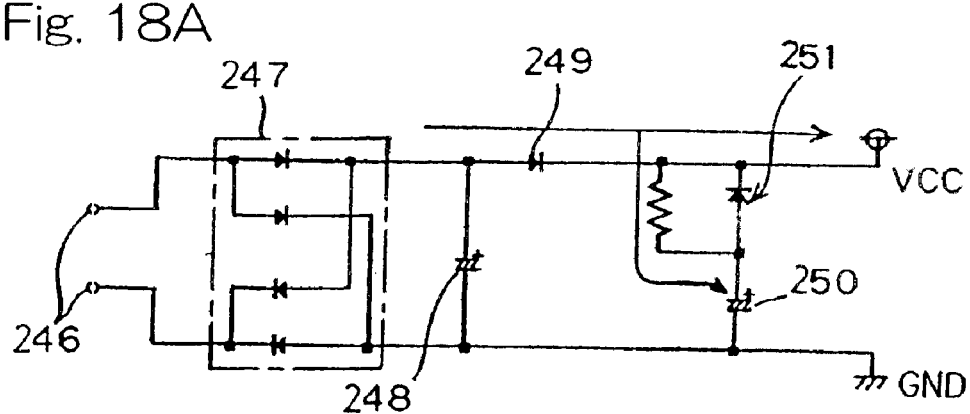
FIGS. 18A and 18B are explanatory diagrams showing the electric power source circuit in charge and discharge modes, respectively.
Figure 18B:
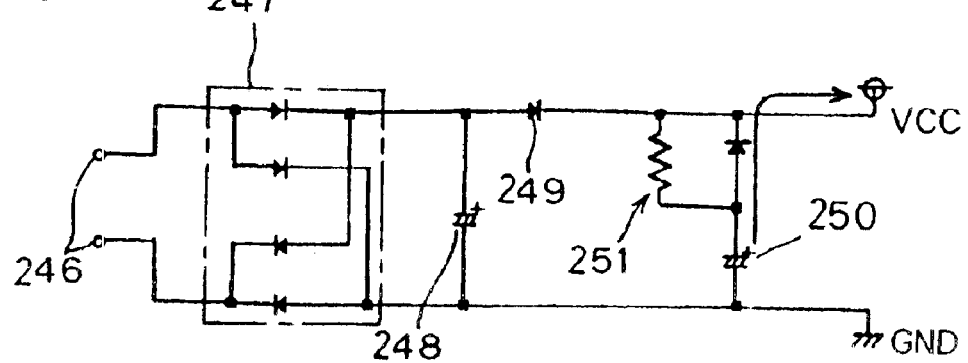

Since the electric power source circuit 243 incorporates the super capacitor 250 as a charging circuit, the electric power generated by the electric power generator 11 can be charged in the super capacitor 250 during a high speed rotation of the rotatable member 7 and, in the event that the rotatable member 7 then driven at a high speed slows down to a speed low enough to cause the electric power generator 11 to generate an insufficient amount of electric power, the electric power charged in the super capacitor 250 can be utilized to compensate for reduction in electric power during a low speed rotation of the rotatable member 7, to keep the various electronic components sufficiently powered electrically. FIG. 18A illustrates the charging during the high speed rotation of the rotatable member 7 whereas FIG. 18B illustrates the discharging during the low speed rotation of the rotatable member 7. Specifically, during the high speed rotation, the electric power generated by the electric power generator 11 is rectified and smoothed by the rectifier circuit 247 and the smoothing capacitor 248, respectively, into a direct current voltage which is utilized as an electric power source for the various electric components and is in part charged in the super capacitor 250 through the resistor of the parallel circuit 251 as shown in FIG. 18A. On the other hand, during the low speed rotation, the electric power is supplied from the super capacitor 250 through the diode of the parallel circuit 251 as shown in FIG. 18B. Thus, the rotational speed detection signal can be assuredly transmitted even during the low speed rotation of the rotatable member 7 at which the electric power generated by the electric power generator 11 is insufficient.

In particular, in this embodiment now under discussion, since the electric circuit 66 that utilizes the output of the electric power generator 11 is disposed inside the magnetic ring assembly 12, shown in FIG. 14, which defines the yoke of the electric power generator 11, electrical connection of the coil 65 of the electric power generator 11 with the electric circuit 66 can easily be accomplished and, therefore, the need to use a special measure to prevent a possible breakage of the wiring used therefor and, also, a protective casing for protecting the electric circuit 66 from external environments can advantageously be dispensed with, allowing the structure to be assembled compact in size and easily. Also, since the electric circuit substrate 67 carrying the electric circuit 66 thereon is mounted on the coil bobbin 64 of the electric power generator 11, electrical connection between the coil 65 of the electric power generator 11 and the electric circuit 66 can advantageously be achieved by a simplified procedure.

Moreover, since the electric power generator 11 is of a structure including the multi-pole magnet assembly 13 having a plurality of alternating magnetic poles arranged in a circumferential direction as shown in FIG. 12, and the magnetic ring assembly 12 accommodating therein the coil 65, the multi-polarization makes it possible for the rotational speed to be accurately detected and for the electric power generator 11 to generate the electric power efficiently with a simplified and compact structure. Considering that the magnetic ring assembly 12 is of the claw-pole type having the plural claws 31a and 31b interleaved with each other to define the alternating magnetic poles as shown in FIG. 4A, the use thereof in combination with the multi-pole magnet assembly 13 makes it possible for the rotational speed to be further accurately detected.

In addition, since the use is made of the wireless transmission device 241 for transmitting wireless the rotational speed detection signal outputted from the electric power generator 11 or the output from the rotational speed sensor utilizing the electric power generator 11 as its electric power source and since the electric circuit 66 disposed inside the magnetic ring assembly 12 that defines the yoke of the electric power generator 11 includes the rectifier circuit 247 for rectifying the generated electric power, the signal processing circuit 240 and the transmitting circuit 242 of the wireless transmission device 241, no extra electric power source dedicated for the wireless transmission is needed and the rotational speed detection signal can be transmitted to the outside of the wheel support bearing assembly with no risk of brakeage of any wiring.

FIGS. 19 to 25 illustrate different manners in which the electric circuit 66 is secured to the coil bobbin 64, respectively. Any of those modifications shown in FIGS. 19 to 25 can be equally applied to the embodiment shown in and described with reference to FIG. 12.

Figure 19:
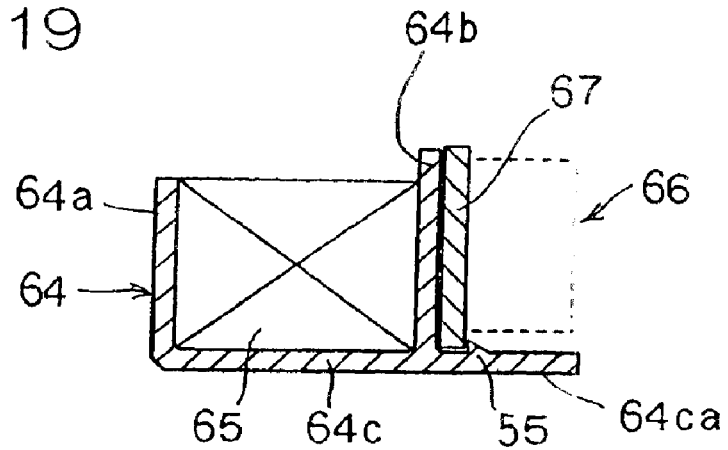
FIG. 19 is a sectional view showing an example of the structure in which the electric circuit is mounted on the coil bobbin.

In the example shown in FIG. 19, the cylindrical extension 64ca of the coil bobbin 64 has its outer periphery formed with projections 55 for securement of the electric circuit substrate 67. The presence of the projections 55 is effective to axially fix the electric circuit substrate 67 disposed to follow the curvature of the end wall 64b of the coil bobbin 64.

Figure 20:
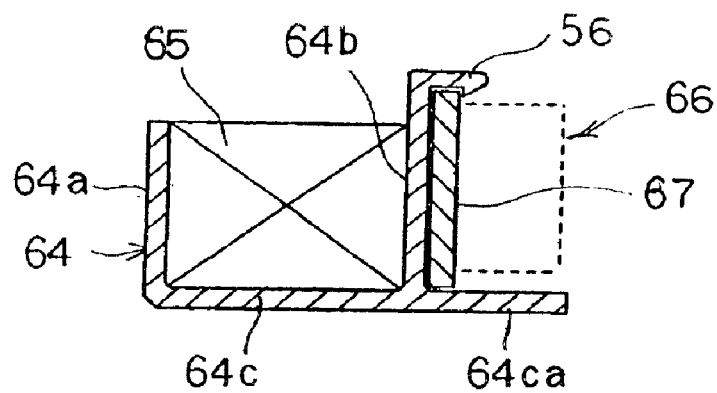
FIG. 20 is a sectional view showing another example of the structure in which the electric circuit is mounted on the coil bobbin.

In the example shown in FIG. 20, an outer peripheral edge portion of the end wall 64b of the coil bobbin 64 is formed with a plurality of engagement pawls 56 for securement of the electric circuit substrate 67. The electric circuit substrate 67 fitted to the end wall 64b of the coil bobbin 64 can be axially fixed in position by those engagement pawls 56. Each of those engagement pawls 56 extends axially from the outer peripheral edge portion of the end wall 64b a distance about equal to the thickness of the electric circuit substrate 67, with its tip bent to protrude radially inwardly to thereby secure the electric circuit substrate 67 against the end wall 64b of the coil bobbin 64.

Figure 21A:
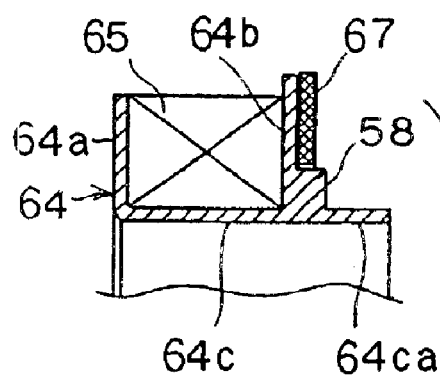
FIG. 21A is a sectional view showing a further example of the structure in which the electric circuit is mounted on the coil bobbin.
Figure 21B:
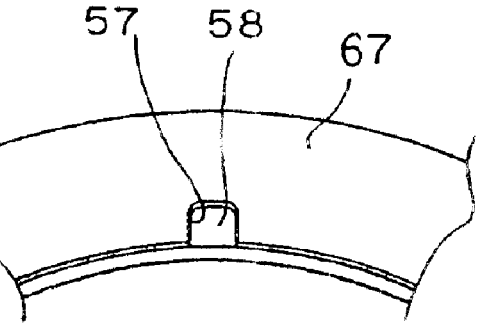
FIG. 21B is a fragmentary elevational view showing a further example of the structure in which the electric circuit is mounted on the coil bobbin.

In the example shown in FIGS. 21A and 21B, the electric circuit substrate 67 has its inner peripheral edge portion formed with one or more positioning cutouts 57 and, on the other hand, the end wall 64b of the coil bobbin 64 has its base formed with corresponding retainer projections 58 engageable in the positioning cutouts 57. By causing the retainer projections 58 to engage in the corresponding cutouts 57, the electric circuit substrate 67 can be fixed in position with no possibility of being displaced in a direction circumferentially thereof.

In the example shown in FIGS. 22A and 22B, the electric circuit substrate 67 is formed with one or more engagement holes 59 for securement and, on the other hand, the end wall 64b of the coil bobbin 64 is formed with corresponding positioning projections 60 engageable in the engagement holes 59. By engaging the positioning projections 60 in the corresponding engagement holes 59, it will readily be seen that the electric circuit substrate 67 can be not only fixed in position in a direction circumferentially thereof but also secured without being displaced in a direction axially thereof.

In the example shown in FIG. 23, one of the opposite end walls of the coil bobbin 64, that is, the end wall 64b thereof shown in FIG. 12 is dispensed with and, instead thereof, the annular electric circuit substrate 67 is used as a substitute for the end wall 64b. In other words, the electric circuit substrate 67 forms a part of the coil bobbin 64. In such case, the electric circuit substrate 67 is fixed in position on the coil bobbin 64 against an end face of the coil 65 by means of a plurality of projections 61 formed on the outer periphery of the cylindrical extension 64ca of the coil bobbin 64. The use of the electric circuit substrate 67 as a substitute for the end wall 64b of the coil bobbin 64 is effective to reduce the axial dimension of the entire electric power generator 11.

In the example shown in FIG. 24, a circuit pattern of the electric circuit 66 is formed directly on the end wall 64b of the coil bobbin 64, followed by mounting of the various electric component parts on the circuit pattern so formed on the end wall 64b to thereby complete the electric circuit 66. In other words, in this example, the end wall 64b of the coil bobbin 64 is used as the electric circuit substrate 67 and, accordingly, the axial dimension of the entire electric power generator 11 can advantageously be reduced.

In the example shown in FIG. 25, the embodiment shown in and described with reference to FIG. 12 is modified in such a manner that at the time of assembling the magnetic ring assembly 12 with the three ferromagnetic ring members 30a, 30b and 30c, a plurality of spacers 62 made of an elastic material are circumferentially disposed between the electric circuit substrate 67 and the annular side wall 33 of the magnetic ring assembly 12 to thereby assist fixing of the electric circuit substrate 67 in a direction axially thereof. In this case, respective portions of a surface of the electric circuit substrate 67 with which the corresponding spacers 62 contact are defined as blank areas where no electric component parts are mounted.

In describing any of the foregoing embodiments of the present invention, reference has been made to the electric circuit 66 in its entirety disposed inside the magnetic ring assembly 12 that defines the yoke of the electric power generator 11. However, a high frequency circuit section of the electric circuit 66 which requires adjustment may be disposed outside the magnetic ring assembly 12 together with the transmitting antenna 244 and the external member 54. By way of example, the high frequency circuit section and the transmitting antenna 244 may be disposed on an outer periphery of the reduced diameter portion 30ca of the ferromagnetic ring member 30c forming a part of the magnetic ring assembly 12. The electric power source circuit 243 and the signal processing circuit 240, both of which do not require any adjustment, are to be disposed inside the magnetic ring assembly 12. By so constructing, as an electric power generator unit having the electric power source circuit built therein, the assembly can be used in various applications, but not limited to the wireless transmission use.

In the embodiment according to a sixth aspect of the present invention, as shown in FIG. 2, the magnetic ring assembly 12 is in the form of a tubular ring having a substantially closed hollow defined therein. The outer peripheral surface of the magnetic ring assembly 12 represents a generally stepped cylindrical surface having the stepped portion or shoulder 40 defined at one end thereof. The stepped portion 40 is made up of a generally U-shaped corner defined by a peripheral surface portion 40a and a side surface portion 40b. The peripheral portion 40a has a diameter reduced relative to a large diameter portion that defines the outer peripheral surface of the magnetic ring assembly 12. The magnetic ring assembly 12 is directly press-fitted at the peripheral surface portion 40a into the inner peripheral surface of the outer member 2 adjacent one end thereof. This press-fit is carried out until the side surface portion 40b of the stepped portion 40 is brought into abutment with the end face of the outer member 2 to thereby position the magnetic ring assembly 12 with respect to the axial direction. The magnetic ring assembly 12 has a seal mount 41 of a generally U-shaped configuration defining a stepped form, which seal mount 41 is defined in an inner peripheral surface of the magnetic ring assembly 12 axially opposite to the stepped portion 40. The sealing member 18 is thus mounted on the seal mount 41.

Referring to FIG. 2, the multi-pole magnet assembly 13 is in the form of a ring member magnetized to have a plurality of alternating magnetic poles spaced an equal distance from each other in a direction circumferentially thereof. This multi-pole magnet assembly 13 is made up of the multi-pole magnet member 16 and the annular core metal 17. The magnet member 16 is in the form of, for example, a rubber magnet and is secured by vulcanization to the core metal 17. Where the core metal 17 is employed, the core metal 17 is preferably made of a magnetic material, particularly a ferromagnetic material. The core metal 17 may be in the form of either an annular member of a generally L-shaped section or an annular member of a generally U-shaped section. The annular core metal 17 is fixed in potion as press-fitted on the outer peripheral surface of the inner member 3. The multi-pole magnet assembly 13 may be either a plastic magnet or a sintered magnet and may be bonded to the outer peripheral surface of the inner member 3 by the use of, for example, a bonding agent. Where the multi-pole magnet assembly 13 is employed in the form of the plastic magnet or the sintered magnet, the use of the core metal 17 may be dispensed with.

The wireless transmission device 14 serves as a device for transmitting wireless the electric power generated by the electric power generator 11 as the rotational speed detection signal, i.e., the signal indicative of the number of revolutions of the wheel. This wireless transmission device 14 so far shown is of an annular shape and is fixedly connected with the magnetic ring assembly 12. This wireless transmission device 14 is positioned at a location axially outwardly of the magnetic ring assembly 12 and has its inner and outer diameters generally matching with those of an axial outer end of the magnetic ring assembly 12. The wireless transmission device 14 may be of a box-like configuration instead of the annular configuration and may not necessarily be connected with the magnetic ring assembly 12, but may be fixedly secured to, for example, the outer member 2 or the knuckle 10. Some or all of the electronic component parts of the wireless transmission device 14 may be included within the magnetic ring assembly 12 of the electric power generator 11.

Figure 16:
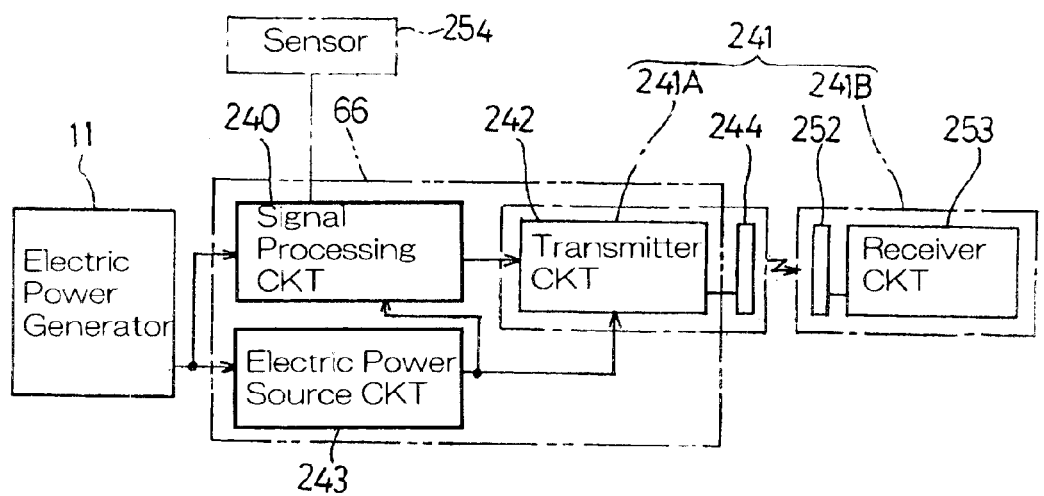
FIG. 16 is a circuit block diagram showing the electric power generator and an electric circuit employed in the electric power generator.

The wireless transmission device 14 referred to above is basically similar to that shown in the circuit block diagram of FIG. 16 and, while the details thereof are not reiterated for the sake of brevity, as shown in FIG. 16, the sensor 254, separate from the electric power generator 11, for detecting the rotational speed or any other parameter such as vibrations or temperature may be disposed in or in the vicinity of the bearing assembly so that the signal outputted from the separate sensor 254 can be transmitted wireless by the wireless transmitting means 241. In such case, the electric power generated by the electric power generator 11 is utilized to electrically drive both of the separate sensor 254 and the wireless transmitting means 241.

The seal mount 41 defined in the magnetic ring assembly 12 is, as shown in FIG. 2, in the form of a stepped member defining a generally U-shaped corner area delimited by the side wall 33 and the inner peripheral wall 34. The sealing member 18 is mounted on the seal mount 41 of the stepped configuration. This sealing member 18 is of a structure including a core metal 19 of a generally L-shaped section integrated together with the sealing element 20 made of an elastic material. The sealing element 20 has one or more elastic lips. Although the number of the elastic lips forming the sealing element 20 may be suitably chosen, the sealing element 20 so far shown includes a single radial lip 21 and two side lips 22. Thus, since the magnetic ring assembly 12 is provided with the seal mount 41 and the sealing member 18 is in turn mounted on the seal mount 41, the sealing member 18 can easily be mounted.

The slinger 23 made of a stainless steel and defining a seal contact area is provided in the rotatable member 7 so as to confront the sealing member 18. Specifically, this slinger 23 is press-fitted onto a shoulder of the cup portion 37 of the outer race 15*a* of the constant velocity universal joint 15 and includes the cylindrical portion 24, relatively slidably engaged with the radial lip 21 of the sealing member 18, and the inclined collar 25 relatively slidably engaged with the side lips 22 and 22 of the sealing member 21.

The sealing member 18 having the sealing element 20 covering an outer peripheral surface of the hollow cylindrical wall 19*a* of the core metal 19 is mounted to the magnetic ring assembly 12 with the radial end wall 19*b* of the core metal 19 held in abutment with the annular side wall 33 of the magnetic ring assembly 12 and also with the hollow cylindrical wall 19*a* of the core metal 19 press-fitted into the inner peripheral wall 34 of the magnetic ring assembly 12. The portion 20*a* of the sealing element 20 covering the outer peripheral surface of the hollow cylindrical wall 19*a* of the core metal 19 is formed with the engaging portion 27 over the entire circumference, or with a plurality of the engaging portions 27 at a corresponding number of locations on the circumference, which engaging portions 27 may be of a recess or projection. On the other hand, the inner peripheral wall 34 of the magnetic ring assembly 12 is formed with the to-be-engaged portion 28 over the entire circumference, or with a plurality of the to-be-engaged portions at a corresponding number of locations on the circumference, which to-be-engaged portions 28 may be of a recess or projection. Accordingly, when the sealing member 18 is mounted inside the magnetic ring assembly 12, the engaging portions 27 of the sealing element 20 are engaged with the to-be-engaged portions 28 of the magnetic ring assembly 12, respectively.

Accordingly, the outboard sealing member 9 and the inboard sealing member 18 cooperate with each other to prevent external saline dirt and grits from entering the annular working space between the outer and inner members 2 and 3.

The operation of the foregoing structure will now be described. When the inner member 3 carrying the multi-pole magnet assembly 13 of the electric power generator 11 rotates together with the wheel, change in flux interlinkage resulting from the rotation results in an electric power that is outputted by the magnetic ring assembly 12 carried by the outer member 2 confronting with the inner member 3. The electric power output so generated from the electric power generator 11 is supplied to the wireless transmission device 241 which subsequently transmits wireless a radio wave descriptive of the rotational speed of the wheel. Specifically, the electric power output so generated is processed by the signal processing circuit 240 to provide the rotational speed detection signal of the wheel which is in turn transmitted from the transmitter circuit 242 to the receiving unit 253 through the transmitting antenna 244.

In this rolling bearing assembly equipped with this electric power generator 11, the magnetic ring assembly 12 of the electric power generator 11 is directly press-fitted into the inner periphery of the outer member 2 through the peripheral surface portion 40*a* of the stepped portion 40 and, accordingly, the electric power generator 11 can be easily and accurately incorporated in the bearing assembly with a minimized number of component parts. In other words, the number of component parts can advantageously be reduced since no extra mounting member such as required in the conventional bearing assembly of a similar kind to mount the magnetic ring assembly 12 on the outer member 2 does not intervene therebetween. Also, since the magnetic ring assembly 12 is press-fitted directly into the inner periphery of the outer member 2 having a machining precision, the magnetic ring assembly 12 can be highly accurately positioned enough to secure a gap between the magnetic ring assembly 12 and the multi-pole magnet assembly 13. In addition, since the side surface portion 40*b* of the stepped portion 40 of the magnetic ring assembly 12 is engaged with the annular end face of the outer member 2, the magnetic ring assembly 12 can be axially positioned and positioning accuracy of the electric power generator 11 can accordingly be increased. Yet, since the positioning accuracy of the magnetic ring assembly 12 in the axial direction can advantageously be secured, the axial position of the sealing member 18 that is fitted to the magnetic ring assembly 12 can be precisely controlled to thereby facilitate management of the sealing performance.

The magnetic ring assembly 12 is made up of two divided ferromagnetic ring members 30*a* and 30*b* held axially in face-to-face relation with each other with their outermost peripheral portions 35 and 36 capped relative to each other, while the outermost peripheral portion 35 of the ferromagnetic ring member 30*a* having the stepped portion 40 formed thereon is positioned radially externally of the outermost peripheral portion 36. Accordingly, the strength with which the respective outermost peripheral portions 35 and 36 of the ferromagnetic ring members 30*a* and 30*b* are engaged with each other can be increased as the magnetic ring assembly 12 undergoes deformation upon mounting thereof on the outer member 2. For this reason, an undesirable increase in magnetic resistance of the magnetic circuit defined by the magnetic ring assembly 12, which would occur in the area of contact between the ferromagnetic ring members 30*a* and 30*b* forming the magnetic ring assembly 12, can advantageously be avoided to thereby secure the electric power generated by the electric power generator 11.

Also, in the illustrated embodiment, the magnetic ring assembly 12, the wireless transmission device 14 and the sealing member 18 can be arranged in a minimized space. Specifically, since the magnetic ring assembly 12 is mounted on the outer member 2, the sealing member 18 is fitted to the inner periphery opposite to the area on which the magnetic ring assembly 12 is mounted, and the ring-shaped wireless transmission device 14 is disposed axially in side-by-side fashion with the magnetic ring assembly 12, the magnetic ring assembly 12, the wireless transmission device 14 and the sealing member 18 can efficiently be arranged in a generally triangular-sectioned, relatively narrow space encompassed between the outer race 15a of the constant velocity universal joint 15, mounted on the inner member 3, and the knuckle 10.

It is to be noted that in the foregoing embodiment, instead of the separate use of the core metal 17 of the multi-pole magnet assembly 13 and the slinger 23, the core metal 17 and the slinger 23 may be integrally formed in one-piece construction.

In a different preferred embodiment of the present invention, the embodiment shown in and described with reference to FIGS. 1 and 2 may be modified in such a manner that instead of the seal mount 41 provided in the magnetic ring assembly 12, the mounting ring 26 defining a seal mount for the support of the sealing member 18 is formed in a portion axially opposite to the stepped portion 40 of the magnetic ring assembly 12 as shown in FIG. 8. The mounting ring 26 is a stepped cylindrical member of a generally Z-shaped section delimited by the inner cylindrical body 26a, the annular stepped wall 26b and the outer cylindrical body 26c defined in the order from the inboard side towards the outboard side in an axial direction. This mounting ring 26 is mounted on the magnetic ring assembly 12 with the outer cylindrical body 26c thereof clamped between the respective outermost peripheral portions 35 and 36 of the ferromagnetic ring members 30a and 30b forming respective parts of the magnetic ring assembly 12. While an outer end wall of the magnetic ring assembly 12 is flat, the inner cylindrical body 26a of the mounting ring 26 protrudes axially outwardly from a portion intermediate between inner and outer diameters of the flat annular end face of the magnetic ring assembly 12. The sealing member 18 is fitted inside the inner cylindrical body 26a of the mounting ring 26. The inner cylindrical body 26a of the mounting ring 26 is formed with the to-be-engaged portion 28 over the entire circumference thereof or with a plurality of the to-be-engaged portions at a corresponding number of locations on the circumference thereof, which to-be-engaged portions 28 may be, for example, lanced protuberances. The wireless transmission device 14 having an annular shape conforming to the curvature of the inner cylindrical body 26a is mounted on an outer periphery of the inner cylindrical body 26a of the mounting ring 26. The mounting ring 26 is made of a magnetic material so that it can cooperate with the magnetic ring assembly 12 to define a yoke of the electric power generator 11. Other structural features than those described hereinabove are similar to those described in connection with the previously described embodiments and, therefore, the details thereof are not reiterated for the sake of brevity.

According to the foregoing embodiment, since the mounting ring 26 is provided in the magnetic ring assembly 12 and the sealing member 18 is fitted to the inner periphery thereof, even this embodiment is effective to permit the sealing member 18 to be easily mounted. Although as an extra component part the mounting ring 26 is required, the magnetic ring assembly 12 can have a simple shape because no stepped portion or the like that defines the seal mount such as indicated by 41 in FIG. 2 need not be formed in the magnetic ring assembly 12. Also, if the mounting ring 26 is fitted to the magnetic ring assembly 12 beforehand, the mounting ring 26 and the magnetic ring assembly 12 can be treated as a single integer at the time of assemblage of the magnetic ring assembly 12. In addition, since the sealing member 18 is disposed radially inwardly of the inner cylindrical body 26a of the mounting ring 26 while the wireless transmission device 14 is disposed radially outwardly of the inner cylindrical body 26a of the mounting ring 26, the axial dimension can advantageously be minimized.

In a further preferred embodiment of the present invention, the mounting ring 26 employed in the embodiment shown in and described with reference to FIG. 8 is modified as follows. Specifically, the mounting ring 26 shown in FIG. 9 is mounted on the outer member 2 with its outer cylindrical body 26c press-fitted onto the outer peripheral surface of the outer member 2. The magnetic ring assembly 12 mounted on the outer member 2 has its outer peripheral surface and a portion of an outer annular end face covered by the outer cylindrical body 26c and the stepped wall 26b of the mounting ring 26. As is the case with the embodiment shown in and described with reference to FIG. 8, the sealing member 18 is fitted inside the inner cylindrical body 26a of the mounting ring 26 with the wireless transmission device 14 mounted externally on such inner cylindrical body 26a. Also, the engaging portions 27 and the to-be-engaged portions 28 are also provided. Other structural features than those described above are similar to those shown in and described with reference to FIG. 8 in connection with the previous embodiment.

In the embodiment shown in FIG. 9, since the magnetic ring assembly 12 is covered by the mounting ring 26 and the sealing member 18, there is no possibility that the magnetic ring assembly 12 may be exposed to foreign matter such as saline dirt and grits and, therefore, no rust proofing is needed in the magnetic ring assembly 12. For this reason, a material having a higher magnetic permeability than that of a magnetic stainless material, such as an ordinary rolled steel plate, silicon steel plate or Permalloy®, can advantageously be employed as material for the magnetic ring assembly 12. Thus, considering that the magnetic ring assembly 12 can be made of the material having a high magnetic permeability, the resultant electric power generator 11 can have an increased capability of generating the electric power and the electric power generator 11 can have a size advantageously reduced for the same electric power output. Also, the provision of the mounting ring 26 of the generally Z-shaped configuration is effective to avoid any possible separation of the electric power generator 11 from the bearing assembly which would otherwise occur under the influence of vibrations.

In a still further preferred embodiment, the embodiment shown in and described with reference to FIG. 2 is modified to render the electric power generator 11 to be of an axial type in which the multi-pole magnet assembly 13 and the magnetic ring assembly 12 confront with each other in a direction axially of the wheel support bearing assembly. The core metal 17 employed therein is of a generally L-sectioned configuration having the hollow cylindrical wall 44 and the radially outwardly extending annular upright wall 45 lying perpendicular to the hollow cylindrical wall 44, and the multi-pole magnet assembly 13 employed therein includes a magnet member 16 fixedly mounted on the annular upright wall 45 of the core metal 17. The magnetic ring assembly 12 is provided with a comb-shaped arrangement of the claws 49a and 49b disposed in a plane confronting the multi-pole magnet assembly 13. Other structural features than those described above are similar to those employed in the previously described embodiment and, therefore, the details thereof are not reiterated for the sake of brevity.

It is to be noted that although in any one of the above described various embodiments of the present invention, the magnetic ring assembly 12 has been described and shown as mounted on the outer member 2, the present invention can be equally applied to the structure in which the magnetic ring assembly 12 is fixedly mounted on the inner member 7. In such case, the stepped portion 40 of the magnetic ring assembly 12 has to be disposed radially inwardly thereof.

Figure 26:
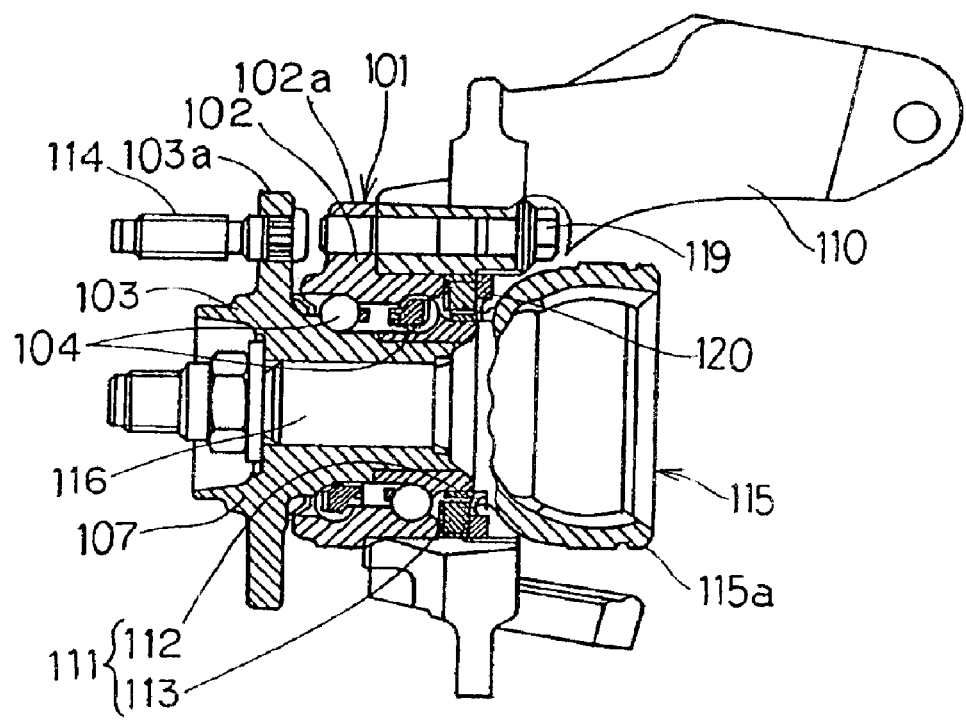
FIG. 26 is a longitudinal sectional view of a wheel support bearing assembly equipped with the electric power generator according to a tenth preferred embodiment of the present invention.
Figure 27:
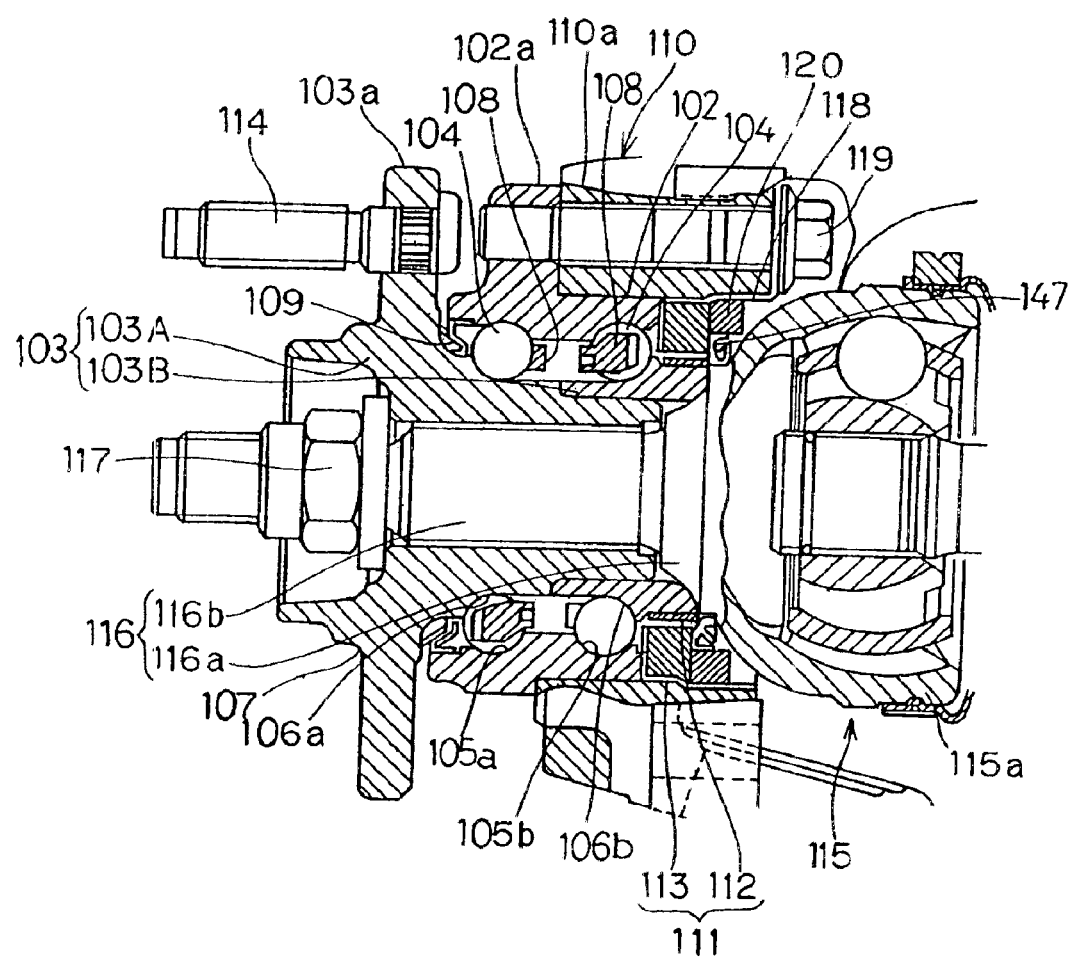
FIG. 27 is a longitudinal sectional view, on an enlarged scale, showing a portion of the wheel support bearing assembly shown in FIG. 26.

Hereinafter, a preferred embodiment of the present invention according to a seventh aspect thereof will be described in detail with particular reference to FIGS. 26 to 28. This embodiment is directed to the wheel support bearing assembly equipped with the electric power generator serving as a rotation sensor, The illustrated wheel support bearing assembly includes a stationary member 101 made up of an outer member 102 and a knuckle 110. The outer member 102 is secured through a flange 102a to the knuckle 110 which is in turn fixed to an automobile body structure or chassis. The wheel support bearing assembly also includes a rotatable member 107 comprised of an inner member 103 and an outer race 115a of a constant velocity universal joint 115 secured to an inner peripheral surface of the inner member 103. The constant velocity universal joint 115 includes a shank 116 extending integrally from the outer race 115a and having a large diameter portion 116a adjacent the outer race 115a and a reduced diameter portion 116b remote from the outer race 115a. This constant velocity universal joint 115 is connected with the inner member 103 for rotation together therewith by means of a splined engagement achieved between an outer peripheral surface of the reduced diameter portion 116b and the inner peripheral surface of the inner member 103. The constant velocity universal joint 115 has its outer race 15a firmly clamped with the inner member 103 by means of an anchor nut 117 fastened to an outboard end of the reduced diameter portion 116b.

The outer member 102 has its inner peripheral surface formed with a plurality of, for example, two, axially spaced outer raceways 105a and 105b and, correspondingly, the inner member 103 has its outer peripheral surface formed with axially spaced inner raceways 106a and 106b aligned respectively with the raceways 105a and 105b. The inner member 103 includes a hub wheel 103A and an inner race forming member 103B, and the inner raceways 106a and 106b referred to above are defined in the hub wheel 103A and the inner race forming member 103B, respectively. Circumferentially extending rows of rolling elements 104 are accommodated within an annular working space defined between the outer and inner members 102 and 103 and are received in part within the outer raceways 105a and 105b and in part within the inner raceways 106a and 106b, respectively. The rolling elements 104 of each circumferential row are retained in position by a retainer or cage 108. The inner member 103 has a wheel mounting flange 103a formed therewith and a wheel is secured to the wheel mounting flange 103a by means of a plurality of bolts 114. The outer member 102, the inner member 103, the rows of the rolling elements 104 and the respective retainers 108 altogether constitute a rolling bearing assembly with the outer and inner members 102 and 103 serving as raceways of the rolling bearing assembly. An outboard open end of the annular working space between the outer and inner members 102 and 103 that is adjacent the wheel mounting flange 103a is sealed by an outboard sealing member 109. An electric power generator 111 is disposed in an inboard open end of the rolling bearing assembly.

The electric power generator 111 includes a multi-pole magnet assembly 112 having a plurality of alternating magnetic poles N and S arranged in a circumferential direction thereof and a magnetic ring assembly 113 confronting the multi-pole magnet assembly 112. An end face of the outer member 102 on an inboard side is axially inwardly set back from a plane flush with an end face of the inner member 103, leaving a space in which the magnetic ring assembly 113 of the electric power generator 111 is arranged. The magnetic ring assembly 113 is fitted inside an inner periphery of an outer member mount 110a of the knuckle 110 whereas the multi-pole magnet assembly 112 is fitted externally around the inner member 103. The magnetic ring assembly 113 is provided with a wireless transmission device 120 for transmitting wireless the electric power output of the electric power generator 111 as a rotational speed detection signal indicative of the number of revolutions of a wheel.

Figure 28:
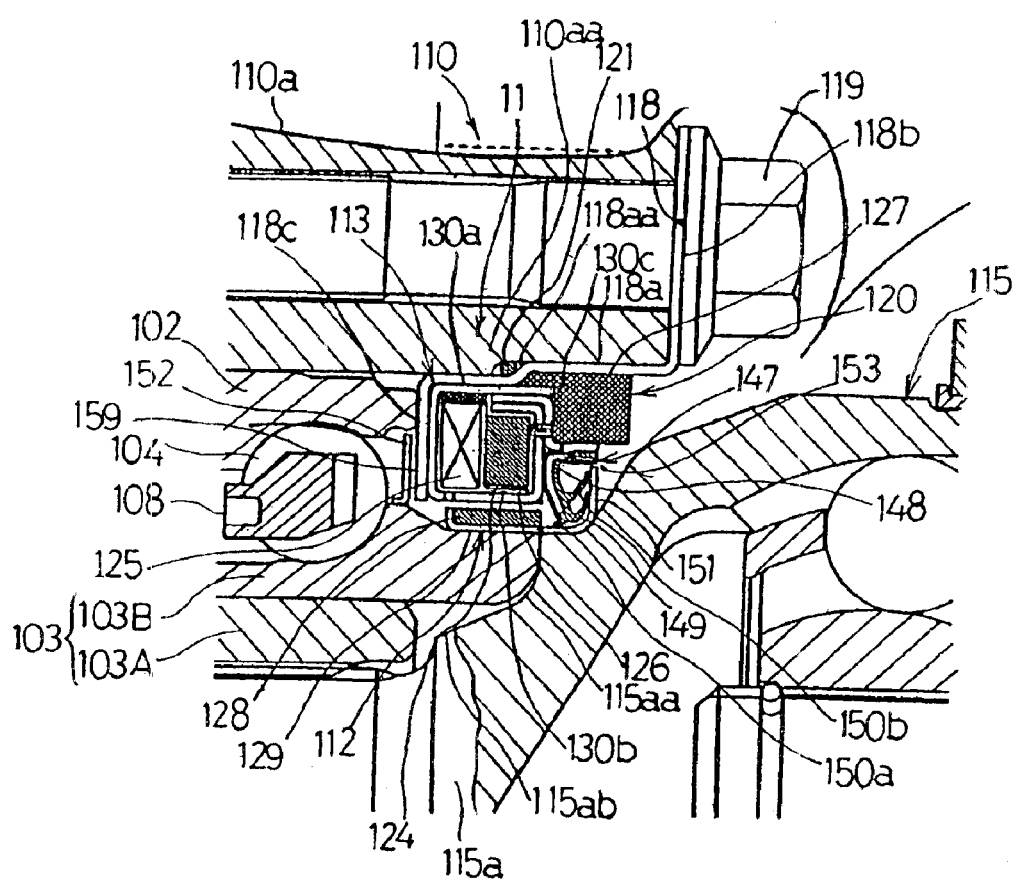
FIG. 28 is a fragmentary longitudinal sectional view, on a further enlarged scale, showing the details of mounting of the electric power generator in the wheel support bearing assembly.

The magnetic ring assembly 113 is mounted on the knuckle 110 through a support plate 118 as shown in FIG. 28. This support plate 118 includes a cylindrical portion 118a following an inner periphery of the outer member mount 110a representing a ring shape in the knuckle 110 and a radially outwardly extending mounting flange 118b bent from an inboard end of the cylindrical portion 118a so as to extend radially outwardly. The mounting collar 118b is formed with a bolt insertion hole for passage therethrough of a bolt 119 used to secure the outer member 102 to the knuckle 110 and is held against the end face of the outer member mount 110a of the knuckle 110. When the outer member 102 is bolted to the knuckle 110 by means of the bolt 119 with the mounting flange 118b therefore clamped between the bolt 119 and the outer member mount 110a, the support plate 118 is rigidly secured to the knuckle 110. Thus, the magnetic ring assembly 113 is fitted to the knuckle 110 through the support plate 118 with the outer periphery of the magnetic ring assembly 113 press-fitted in the inner periphery of the cylindrical portion 118a of the support plate 118.

An outboard end of the cylindrical portion 118a of the support plate 118 has a radially inwardly extending flange 118c formed by bending it so as to extend radially inwardly therefrom. This radially inwardly extending flange 118c is held in contact with one end face of the magnetic ring assembly 113 so that the magnetic ring assembly 113 can be axially retained in position. The inner peripheral surface of the outer member mount 110a of the knuckle 110 represents a stepped cylindrical surface with a portion thereof, adjacent the mounting flange 118b of the support plate 118, flaring radially outwardly in a direction away from the electric power generator 111, thereby leaving a reduced inner diameter portion and a large inner diameter portion. The cylindrical portion 118a of the support plate 118 is correspondingly stepped to have a reduced diameter portion, engaged around the reduced inner diameter portion of the outer member mount 110a, and a large diameter portion engaged around the large inner diameter portion of the outer member mount 110a. An elastic sealing element 121 is clamped between a step 110aa of the inner peripheral surface of the outer member mount 110a and a step 118aa of the cylindrical portion 118a of the support plate 118, to thereby seal an axial gap between the inner peripheral surface of the outer member mount 110a and the cylindrical portion 118a of the support plate 118. The elastic sealing element 121 is of a ring shape and may be, for example, an O-ring.

In the wheel support bearing assembly of the structure discussed above, the magnetic ring assembly 113 employed therein is of the structure shown in and described with reference to FIG. 4 and, therefore, the details thereof are not reiterated for the sake of brevity.

As shown in FIG. 28, the magnetic ring assembly 113 defining the yoke of the electric power generator 111 has a hollow in which a coil 125 wound around a coil bobbin 124 and an electric circuit 126 of the wireless transmission device 120 are accommodated.

Figure 25:
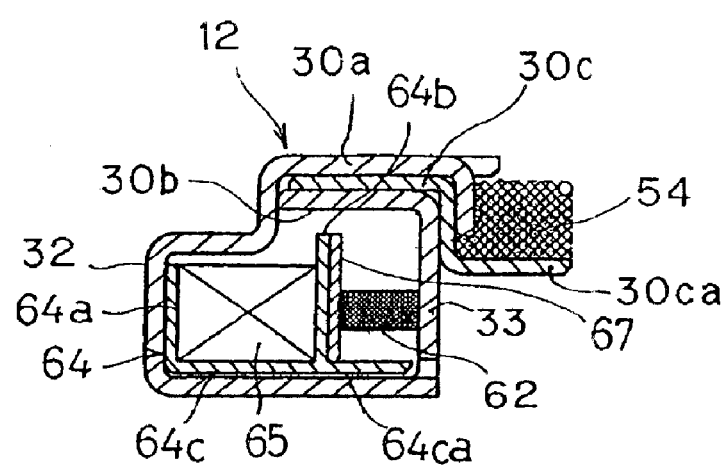
FIG. 25 is a fragmentary sectional view showing a still further example of the structure in which the electric circuit is mounted on the coil bobbin.

While the electric circuit 126 of the wireless transmission device 120 is similar to that shown in the circuit block diagram of FIG. 16 and, accordingly, the details thereof are not reiterated for the sake of brevity, the transmitting antenna 244 (FIG. 16) of the wireless transmission device 120 is mounted on an outer periphery of the reduced diameter portion of the ferromagnetic ring member 30c that protrudes from one end of the magnetic ring assembly 12, shown in FIG. 25, towards the inboard side and is resin molded by a resin filler 127 as shown in FIG. 28. The electric circuit 66 inside the magnetic ring assembly 113 and the transmitting antenna 244, both shown in FIG. 16, are electrically connected with each other by means of a wiring passing through a wiring hole defined in one side wall of the magnetic ring assembly 113 so as to extend completely across the thickness thereof. It is to be noted that a circuit portion of the electric circuit 66 may be positioned outside the magnetic ring assembly 113 together with the transmitting antenna 244.

Figure 30:
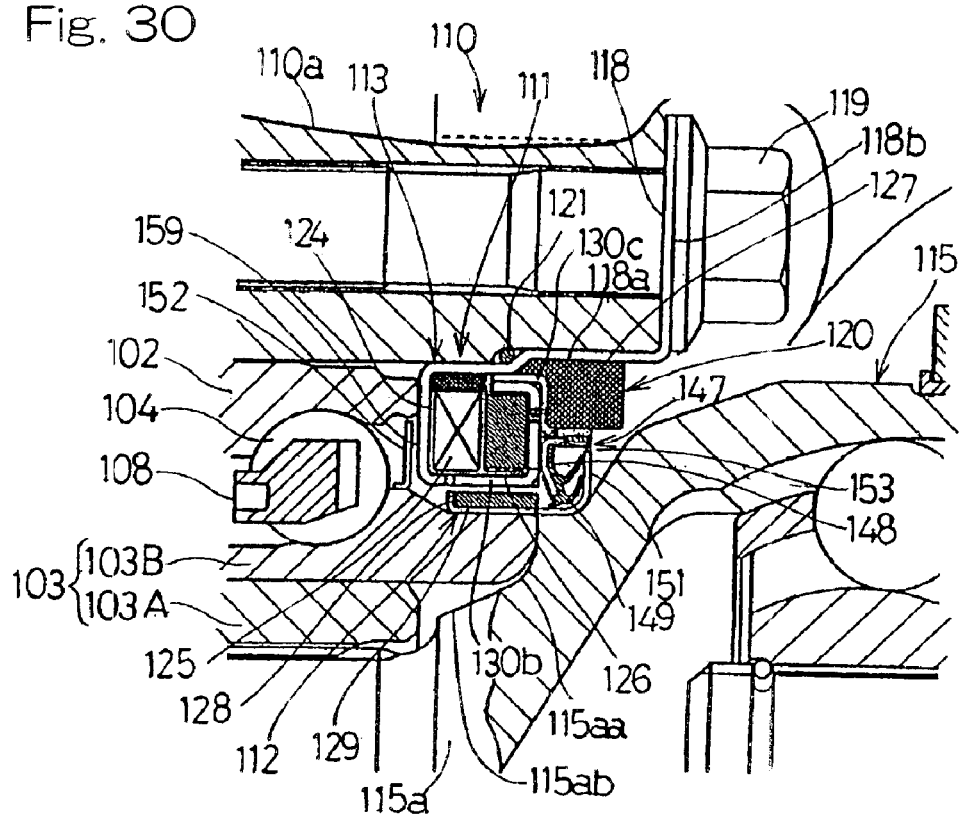
FIG. 30 is a fragmentary longitudinal sectional view, on an enlarged scale, showing the wheel support bearing assembly according to a twelfth preferred embodiment of the present invention.

Referring now to FIG. 28, the multi-pole magnet assembly 112 is made up of a multi-pole magnet member 128 and an annular core metal 129. The magnet member 128 is, for example, a rubber magnet and is bonded by vulcanization to the core metal 129. Where the core metal 129 is employed, the core metal 129 is preferably made of a magnetic material, particularly a ferromagnetic material. The core metal 129 may be in the form of either an annular member of a generally L-shaped section as shown in FIG. 30 or an annular member of a generally U-shaped section. The annular core metal 129 is fixed in potion as press-fitted on the outer peripheral surface of the inner member 103. The multi-pole magnet assembly 112 may be either a plastic magnet or a sintered magnet and may be bonded to the outer peripheral surface of the inner member 103 by the use of, for example, a bonding agent. Where the multi-pole magnet assembly 112 is employed in the form of the plastic magnet or the sintered magnet, the use of the core metal 129 may be dispensed with.

A sealing member 147 is mounted inside the reduced diameter portion of the ferromagnetic ring member 130c forming a part of the magnetic ring assembly 113. This sealing member 147 is of a structure including a core metal 148 of a generally L-shaped section bonded and, hence, integrated together with a sealing element 149 made of an elastic material. The sealing element 149 has a plurality of elastic lips. Although the number of the elastic lips forming the sealing element 149 may be suitably chosen, the sealing element 149 so far shown includes a single radial lip 150a and two side lips 150b. A slinger 151 made of a stainless steel and defining a seal contact area is provided in a shoulder of the outer race 115a of the constant velocity universal joint 115 so as to confront the sealing member 147. The inboard sealing member 147 and the outboard sealing member 109 (See FIG. 27) cooperate with each other to prevent external saline dirt and grits from entering the annular working space between the outer and inner members 102 and 103.

The slinger 151 is of a generally L-shaped section having a radially extending flange that terminates at a location adjacent a radially outer base end of the sealing member 147 to define a slight gap between it and the radially outer base end of the sealing member 147 to thereby form a non-contact seal 153. By so designing, the sealability can be increased advantageously.

The radially inwardly extending flange 118c of the support plate 118 is held in contact with the annular end face of the outer member 102 and extends radially inwardly beyond the inner peripheral surface of the outer member 102. A generally ring-shaped sealing plate 152 positioned axially inwardly of and spaced a slight distance from the radially inwardly extending flange 118c is mounted on the outer periphery of the inner member 103 so that the sealing plate 152 can cooperate with the radially inwardly extending flange 118c to define a labyrinth seal 159. The sealing plate 152 is of a generally L-shaped section having a cylindrical portion that is mounted on the outer peripheral surface of the inner member 103. By this labyrinth seal 159, any possible leakage of a grease filled in the bearing assembly can be avoided advantageously.

The outer race 115a of the constant velocity universal joint 115 is, in order to secure a required thickness, formed with a curved surface portion 115aa following a fillet surface, formed on an inner race forming member 103B forming a part of the inner member 103, that extends radially inwardly from the inboard end to the inner periphery of the inner race forming member 103B, and a tapering portion 115ab continued from the curved surface portion 115aa to the shank 116.

The operation of the bearing assembly of the structure described above will now be described. A portion of the electric power generated by the electric power generator 111 is supplied to the electric circuit 126 disposed inside the magnetic ring assembly 113 and is subsequently processed by the signal processing circuit 240 in FIG. 16 to provide the rotational speed detection signal indicative of the number of revolutions of the wheel. The electric power generated by the electric power generator 111 is also supplied to the electric power source circuit 243 in which it is rectified and smoothed to provide an electric power source for the signal processing circuit 240 and the transmitter circuit 242. The resultant rotational speed detection signal is transmitted wireless as a radio wave from the transmitter circuit 242 to the receiver circuit 253 through the transmitting antenna 244.

In the wheel support bearing assembly of the type equipped with the electric power generator as discussed above, since the magnetic ring assembly 113 of the electric power generator 111 is mounted on the knuckle 110 and the multi-pole magnet assembly 112 is mounted on the inner member 103, the electric power generator 111 can be effectively and efficiently incorporated in a relatively small space left on the inboard side of the bearing assembly, resulting in increase of the freedom of design choice. In particular, since the end face of the outer member 102 is set back axially inwardly relative to the end face of the inner member 103 with the magnetic ring assembly 113 of the electric power generator 111 arranged within the space created by the set-back, a relatively large space is available for installation of the electric power generator 111. Also, since the amount of material used to construct the outer member 102 can advantageously be reduced in a quantity corresponding to a portion of the outer member 102 that has been set back axially inwardly, the cost of material can also be reduced.

Also, considering that the support plate 118 is fitted to the knuckle 110 by means of the bolt 119 used to bolt the outer member 102 to the knuckle 110 and the magnetic ring assembly 113 of the electric power generator 111 is mounted on the inner peripheral surface of the cylindrical portion 118a defined in the support plate 118, mounting of the magnetic ring assembly 113 can easily be accomplished. Also, since the provision of the radially inwardly extending flange 118c in the support plate 118 is effective to define the labyrinth seal 159 between it and the sealing plate 152 on the outer periphery of the inner member 103, an effect of preventing the grease from leaking can be obtained with a minimized number of component parts.

In addition, since the slinger 151 is disposed on an inboard side of the portion of the inner member 103 where the multi-pole magnet assembly 112 is mounted and the sealing member 147 slidably engageable with the slinger 151 is mounted on the magnetic ring assembly 113, the sealing within the bearing assembly and the protection of the multi-pole magnet assembly 112 of the electric power generator 111 can both be achieved by the common sealing member 147. Formation of the non-contact seal 153 between the sealing member 147 and a free end of the slinger 151 is effective to increase the sealability. Also, since the elastic sealing element 121 is interposed in the area where the stepped cylindrical portion 118a of the support plate 118 is mounted on the knuckle 110, the sealing at this area can be secured.

Figure 29:
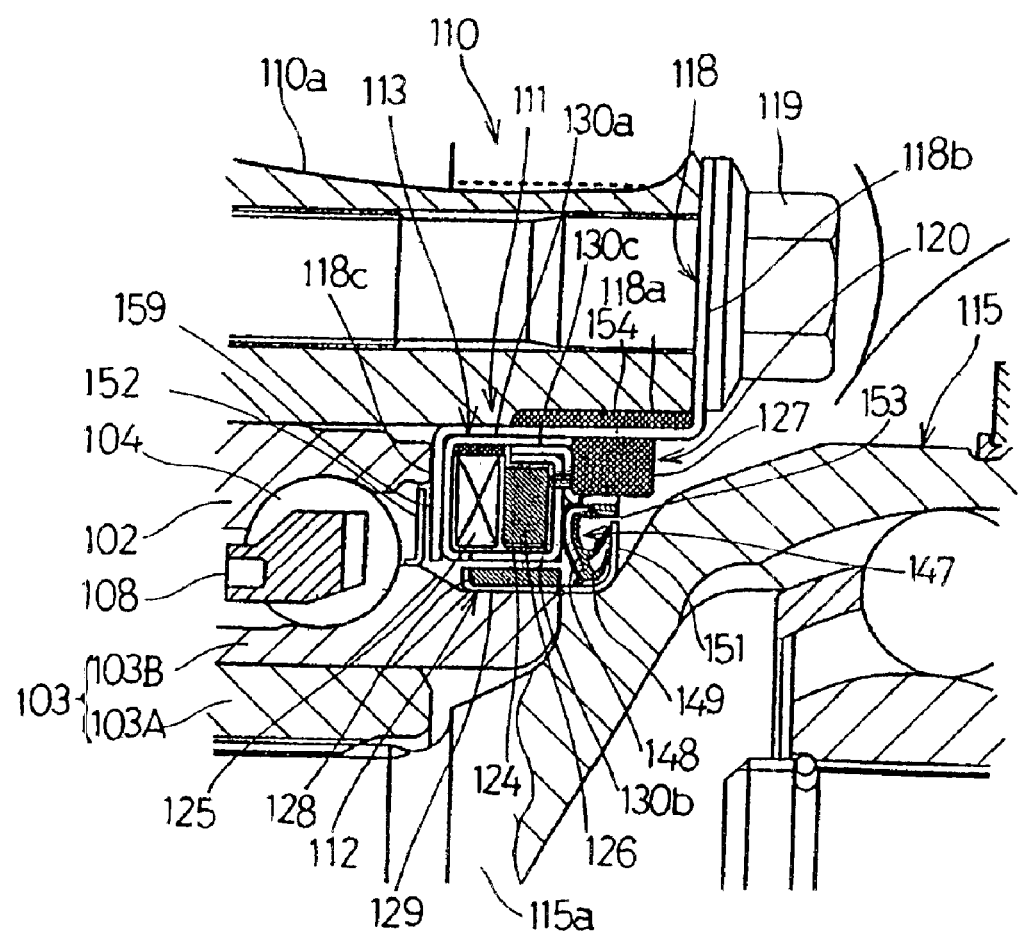
FIG. 29 is a fragmentary longitudinal sectional view, on an enlarged scale, showing the wheel support bearing assembly according to an eleventh preferred embodiment of the present invention.

FIG. 29 illustrates a still further preferred embodiment of the present invention. The embodiment of FIG. 29 is similar to that shown in and described with reference to FIGS. 26 to 28, except that the cylindrical portion 118a of the support plate 118 employed in the embodiment of FIG. 29 has no step and, instead, a resin layer 154 is formed on an outer peripheral surface of the cylindrical portion 118a. By causing the resin layer 154 to be mounted on the large diameter portion of the stepped cylindrical portion of the outer member mount 110a in the knuckle 110, a seal can be achieved between the inner peripheral surface of the knuckle 110 and the cylindrical portion 118a of the support plate 118. Other structural features than those described above are similar to those in the previously described embodiment and, therefore, the details thereof are not reiterated for the sake of brevity.

In the case of the embodiment shown in FIG. 29, the seal can be achieved between the knuckle 110 and the cylindrical portion 118a of the support plate 118 with no need to use the elastic seal 121 such as an O-ring, the number of component parts employed can be reduced advantageously and assemblage can also be easily accomplished.

FIG. 30 illustrates a still further preferred embodiment of the present invention. This embodiment is similar to that shown in and described with reference to FIGS. 26 to 28, except that one end of the ferromagnetic ring member 130a forming a part of the magnetic ring assembly 113 has an extension to define the support plate 118. Other structural features than those described above are similar to those in the previously described embodiment and, therefore, the details thereof are not reiterated for the sake of brevity.

According to the embodiment shown in FIG. 30, since the support plate 118 is an integral part of the ferromagnetic ring member 130a forming a part of the magnetic ring assembly 113, the electric power generator 111 can be inexpensively constructed with a minimized number of component parts. In such case, a portion of the magnetic ring assembly 113 is exposed to the outside of the bearing assembly and, therefore, a material having an excellent water proofing property, such as a stainless steel is employed as a material for the magnetic ring assembly 113.

Figure 31:
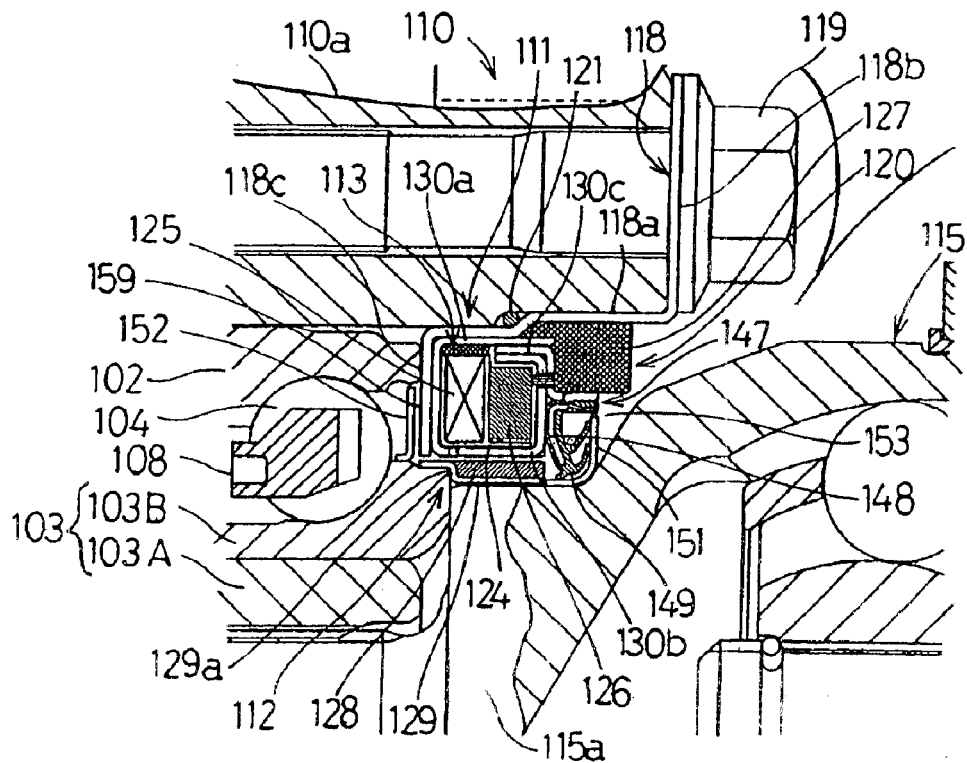
FIG. 31 is a fragmentary longitudinal sectional view, on an enlarged scale, showing that portion of the wheel support bearing assembly according to a thirteenth preferred embodiment of the present invention.

FIG. 31 also illustrates a still further preferred embodiment of the present invention. This embodiment of FIG. 31 is similar to the embodiment shown in and described with reference to FIGS. 26 to 28, except that the core metal 129 of the multi-pole magnet assembly 112 is of a generally stepped cylindrical configuration having a large diameter portion and a reduced diameter portion continued axially inwardly therefrom with the large diameter portion held in contact with the outer peripheral surface of the inner member 103 and also with the reduced diameter portion engaged with the shoulder of the outer race 115a of the constant velocity universal joint 115, while an annular step 129a of the core metal 129 is held in abutment with the annular end face of the inner race forming member 103B. The magnet member 128 is bonded by vulcanization to an outer peripheral surface of the reduced diameter portion of the core metal 129. Other structural feature than those described are similar to those in the previously described embodiment and, therefore, the details thereof are not reiterated for the sake of brevity.

According to the embodiment shown in FIG. 31, the inner member 103 can have its axial length reduced by a quantity corresponding to the space occupied by the multi-pole magnet assembly 112. Accordingly, the outer race 115a of the constant velocity universal joint 115 can have an increased axial length by a quantity equal to the reduction in the axial length of the inner member 103 and, therefore, the outer race 15a can have an increased wall thickness.

Figure 32:
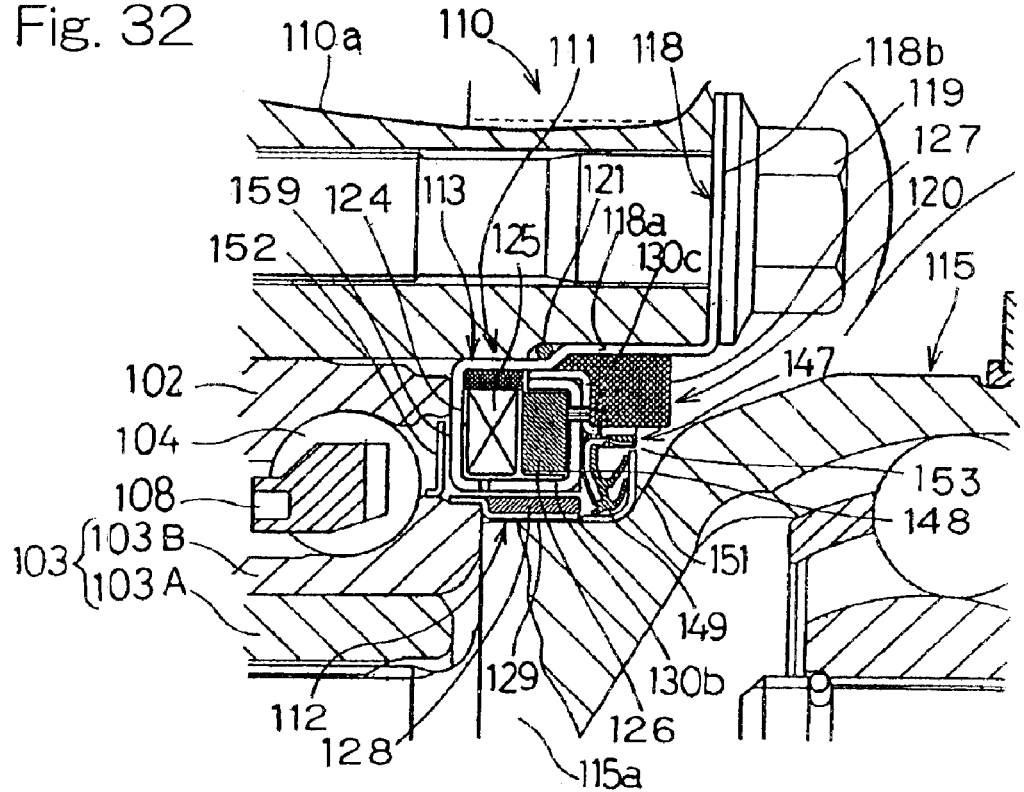
FIG. 32 is a fragmentary longitudinal sectional view, on an enlarged scale, showing the wheel support bearing assembly according to a fourteenth preferred embodiment of the present invention.

A yet further preferred embodiment of the present invention is shown in FIG. 32. The embodiment shown therein is similar to the embodiment shown in FIG. 30, in which a constituent member 130a of the magnetic ring assembly 113 and the support plate 118 are integrated together. However, the embodiment of FIG. 32 differs from the embodiment of FIG. 30, in that the core metal 129 of the multi-pole magnet assembly 112 is mounted so as to straddle between the inert member 103 and the outer race 115a of the constant velocity universal joint 115 as is the case with the embodiment shown in and described with reference to FIG. 31. Except for this difference, other structural feature than those described are similar to those in the previously described embodiment and, therefore, the details thereof are not reiterated for the sake of brevity.

According to the embodiment of FIG. 32, not only can the number of component parts used be reduced advantageously, but also the electric power generator 111 can be inexpensively manufactured, and also the outer race 115a can have an increased wall thickness.

Figure 33:
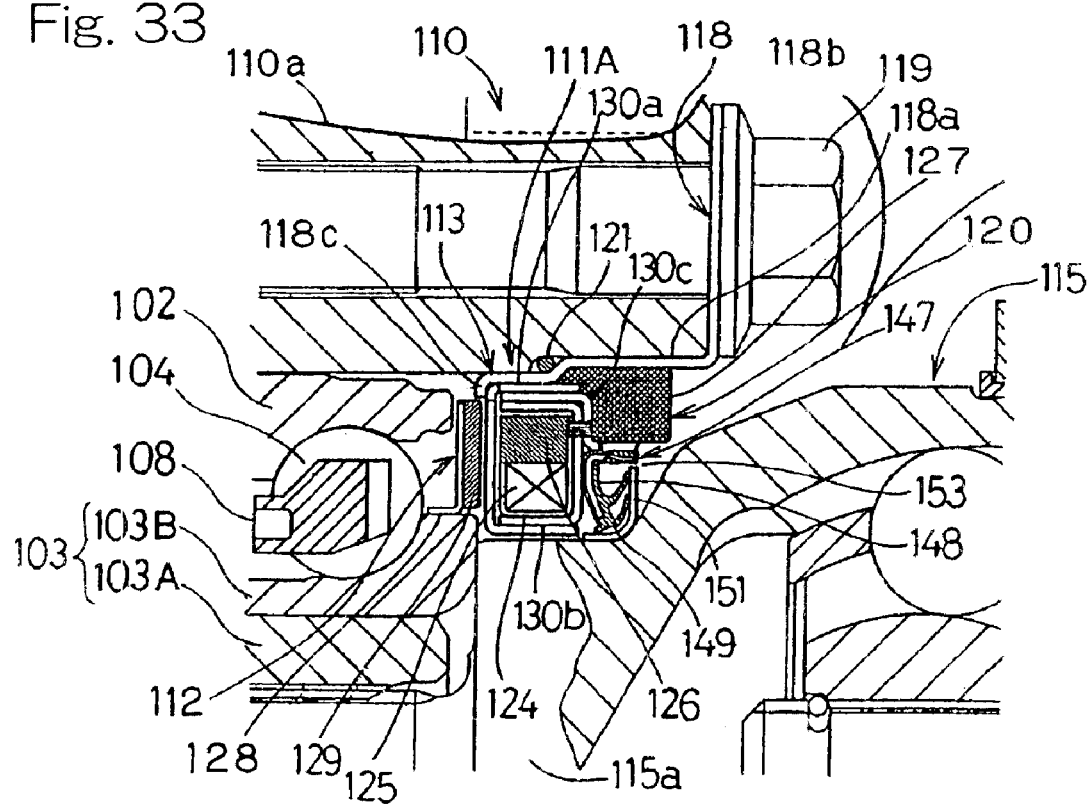
FIG. 33 is a fragmentary longitudinal sectional view, on an enlarged scale, showing the wheel support bearing assembly according to a fifteenth preferred embodiment of the present invention.

FIG. 33 illustrates a yet further preferred embodiment of the present invention. This embodiment of FIG. 33 is similar to that shown in and described with reference to FIGS. 26 to 28, except that the electric power generator 111A employed in this embodiment of FIG. 33 is of an axial type. Specifically, the multi-pole magnet assembly 112 mounted on the inner member 103 is so disposed as to permit a magnetized surface having the alternating magnetic poles N and S to confront in a direction axially of the bearing assembly. The magnetic ring assembly 113 mounted on the knuckle 110 is so disposed as to axially confront the magnetized surface of the multi-pole magnet assembly 112. The comb-shaped claws 31a and 31b (FIG. 4B) of the magnetic ring assembly 113 are formed on a side surface confronting the multi-pole magnet assembly 112. Also, the radially inwardly extending flange 118c of the support plate 118 has such a short length that it will not cover the claws 31a and 31b of the magnetic ring assembly 113. The sealing plate 152 in FIG. 26 is dispensed with. Other structural features than those described above are similar to those used in the previously described embodiment and, therefore, the details thereof are not reiterated for the sake of brevity.

According to the embodiment shown in and described with reference to FIG. 33, since the electric power generator 111 is so designed as to be an axial type, the mounting space, that is, the axial size of the space in which the multi-pole magnet assembly 112 is mounted on the inner member 103 can be reduced and, correspondingly the axial length of the outer race 115a of the constant velocity universal joint can be increased advantageously to permit the outer race 115a to have an increased wall thickness. Also, in view of the axial type, the multi-pole magnet assembly 112 assumes a radially extending shape and, as is the case with the sealing plate 152 used in the previously described embodiment, the multi-pole magnet assembly 112 has a role of defining a labyrinth seal for prevention of leakage of the grease. Because of this, the use of the sealing plate 152 can advantageously be dispensed with, resulting in inexpensive manufacture of the wheel support bearing assembly with the reduced member of components parts and manufacturing steps.

Figure 34:
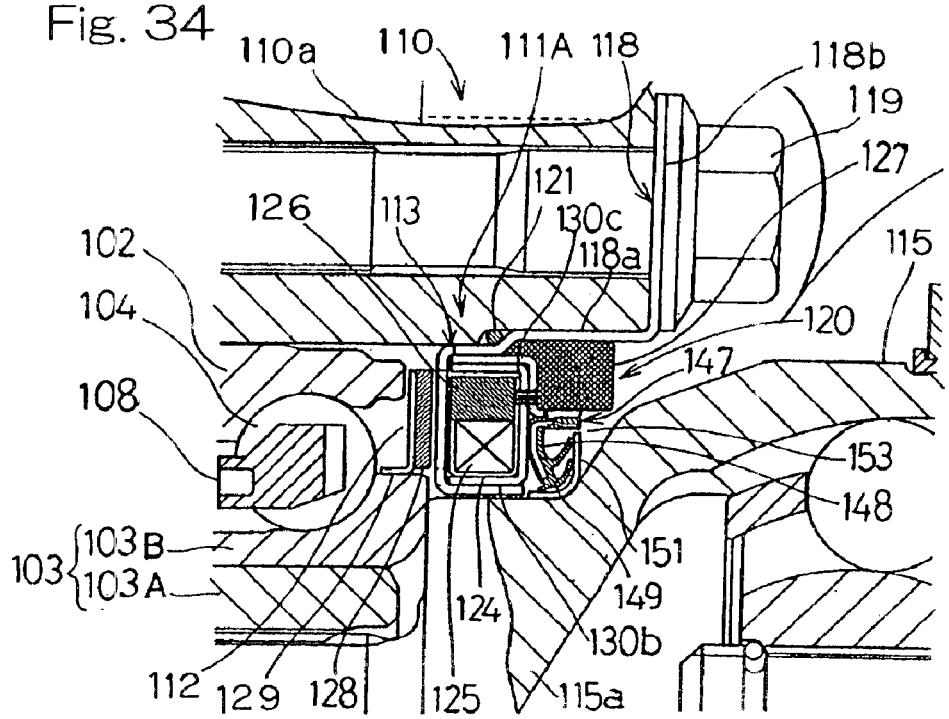
FIG. 34 is a fragmentary longitudinal sectional view, on an enlarged scale, showing the wheel support bearing assembly according to a sixteenth preferred embodiment of the present invention.

FIG. 34 illustrates a still further preferred embodiment of the present invention. This embodiment of FIG. 34 is similar to the axial type embodiment shown in and described with reference to FIG. 33, except that the ferromagnetic ring member 130a forming a part of the magnetic ring assembly 113 has one end extended to provide an extension that in turn defines the support plate 118. Other structural feature than those described above are similar to those in the previously described embodiment and, therefore, the details thereof are not reiterated for the sake of brevity.

In the embodiment of FIG. 34, since the extension and, hence, the support plate 118 is an integral part of the ferromagnetic ring member 130a forming a part of the magnetic ring assembly 113, the number of component parts can advantageously be reduced and the electric power generator 111A can be assembled inexpensively.

Figure 35:
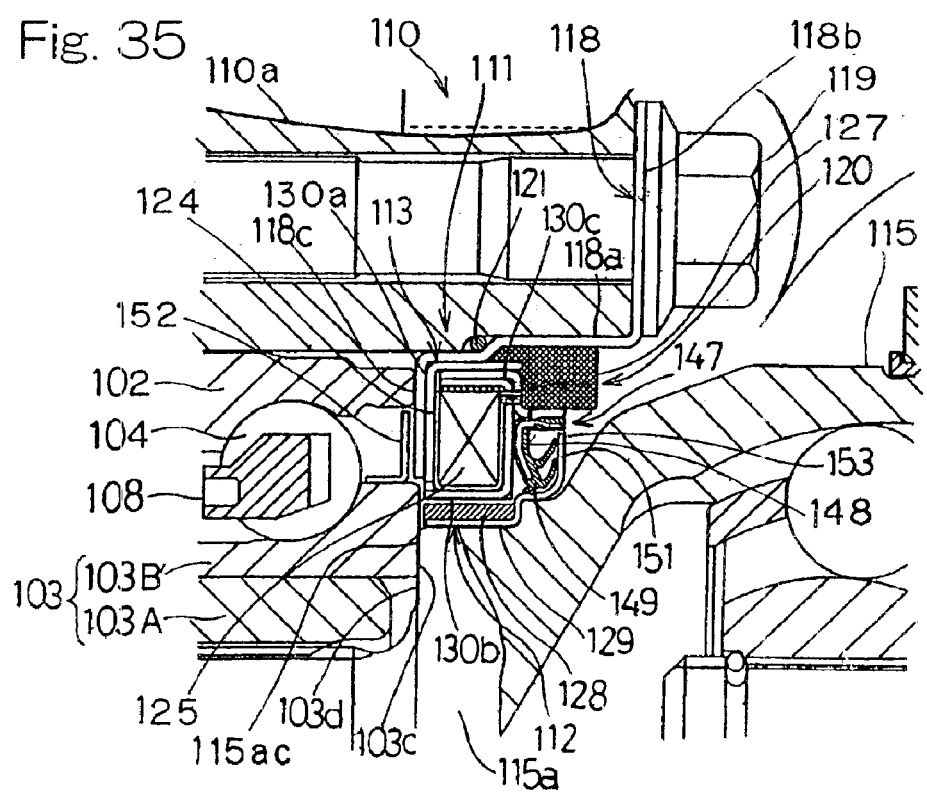
FIG. 35 is a fragmentary longitudinal sectional view, on an enlarged scale, showing the wheel support bearing assembly according to a seventeenth preferred embodiment of the present invention.

FIG. 35 illustrates a still further preferred embodiment of the present invention. This embodiment of FIG. 34 is similar to the embodiment shown in and described with reference to FIGS. 26 to 28, but differs therefrom in that the multi-pole magnet assembly 112 in its entirety is mounted on the shoulder of the outer race 115a of the constant velocity universal joint. The core metal 129 of the multi-pole magnet assembly 112 used therein has one end extended towards the inboard side to define an extension that in turn forms the slinger 151 defining a seal contact member. It is to be noted that the outer race 115a of the constant velocity universal joint 115 is firmly connected with the inner member 103 when the nut 117 is firmly fastened to the shank 116 as shown in FIG. 27, but a contact pressure is developed between an end face 103c of the inner race forming member 103B defining the inner member 103 and an end face 115ac of the shoulder of the outer race 115a confronting therewith, thus requiring a contact surface area therebetween. In view of this, in the embodiment of FIG. 34, the curvature of an angled portion 103d varying radially inwardly from the end face 103c of the inner race forming member 103B has its radius reduced for the purpose of securing the contact surface area between the end face 103c of the inner race forming member 103B defining the inner member 103 and the end face 115ac of the shoulder of the outer race 115a. Other structural features than those described above are similar to those in the previously described embodiment and, therefore, the details thereof are not reiterated for the sake of brevity.

According to the embodiment shown in FIG. 35, since the extension and, hence, the slinger 151 is an integral part of the core metal 129 of the multi-pole magnet assembly 112, the number of the component parts used and the number of manufacturing steps can be reduced advantageously, allowing the wheel support bearing assembly to be manufactured inexpensive.

Figure 36:
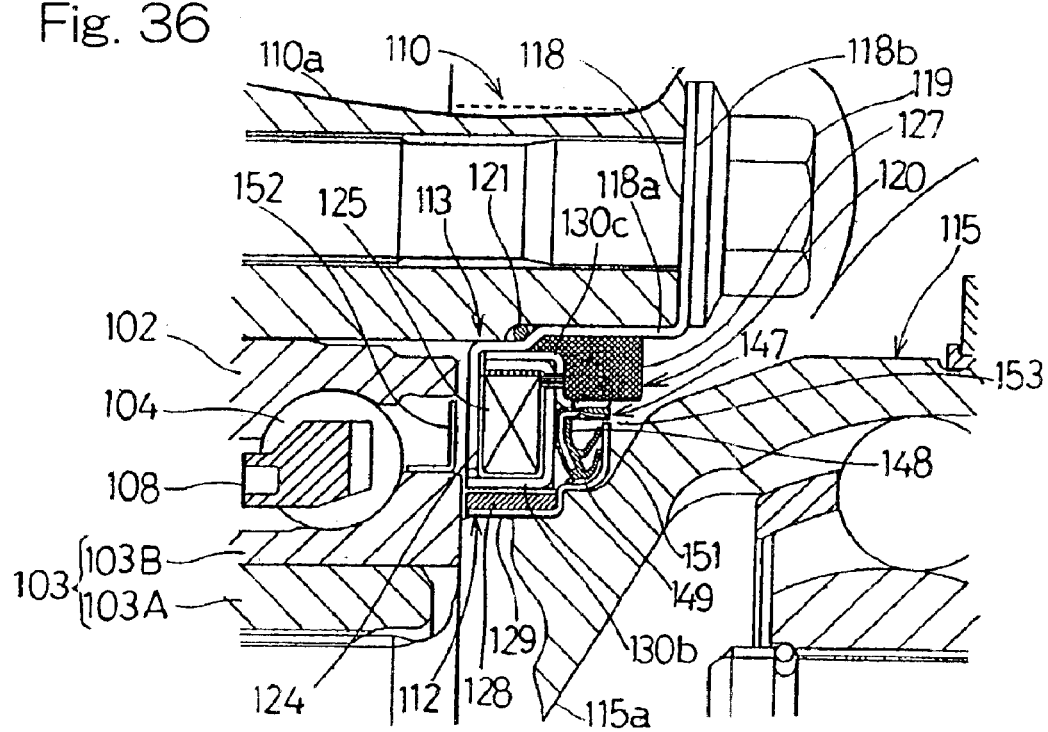
FIG. 36 is a fragmentary longitudinal sectional view, on an enlarged scale, showing the wheel support bearing assembly according to an eighteenth preferred embodiment of the present invention.

FIG. 36 illustrates a still further preferred embodiment of the present invention. This embodiment of FIG. 36 is similar to the embodiment of FIG. 35 in which the slinger 151 is an integral part of the core metal 129 of the multi-pole magnet assembly 112, but differs therefrom in that the ferromagnetic ring member 130a forming a part of the magnetic ring assembly 113 has one end extended to form an extension which then defines the support plate 118. Other structural features than those described above are similar to those in the previously described embodiment and, therefore, the details thereof are not reiterated for the sake of brevity.

According to the embodiment of FIG. 36, not only since the slinger 151 is an integral part of the core metal 129 of the multi-pole magnet assembly 112, but also since the magnetic ring assembly 113 and the support plate 118 are integrated together, the number of the component parts used and the number of manufacturing steps can be reduced advantageously, allowing the wheel support bearing assembly to be manufactured inexpensive.

Figure 37:
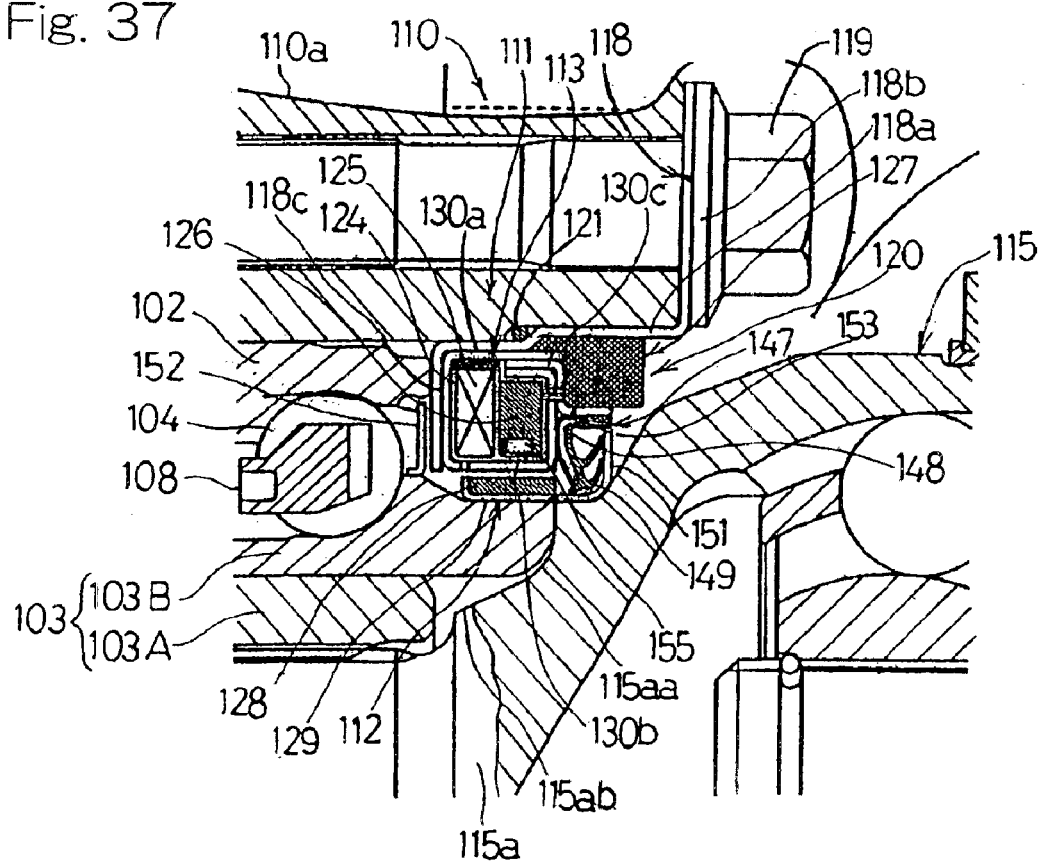
FIG. 37 is a fragmentary longitudinal sectional view, on an enlarged scale, showing the wheel support bearing assembly according to a nineteenth preferred embodiment of the present invention.
Figure 38A:
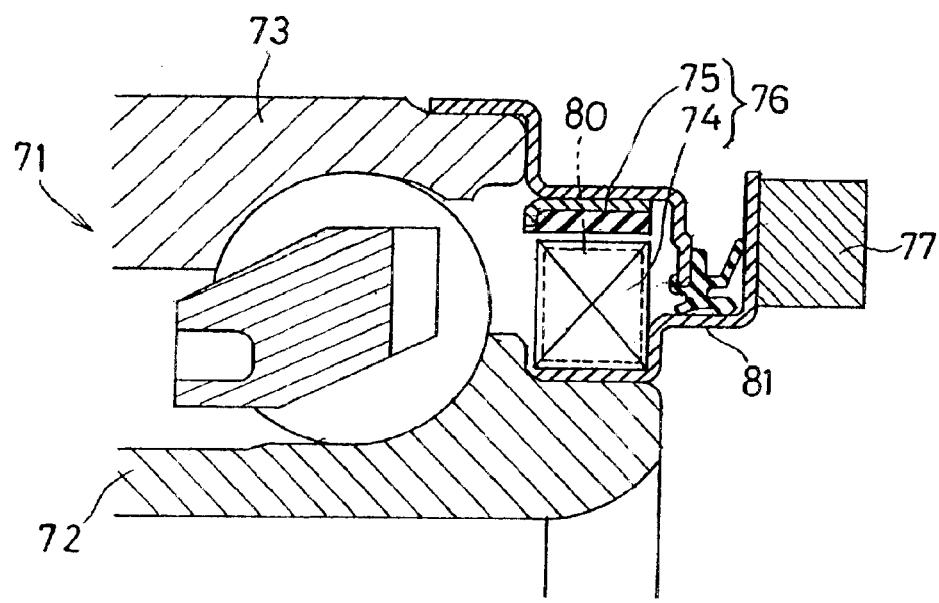
FIG. 38A is a longitudinal sectional view of the conventional wheel support bearing assembly.
Figure 38B:
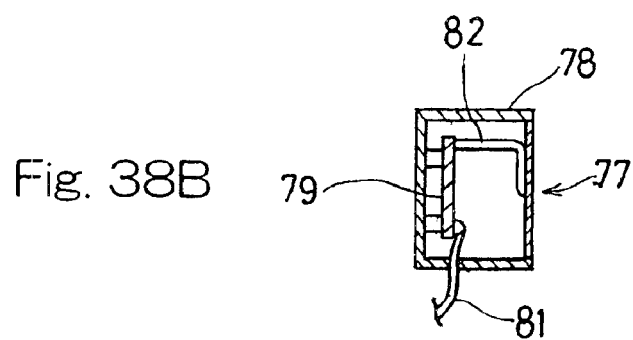
FIG. 38B is a sectional view showing the details of an electric circuit employed in the conventional wheel support bearing assembly of FIG. 38A.
Figure 39:
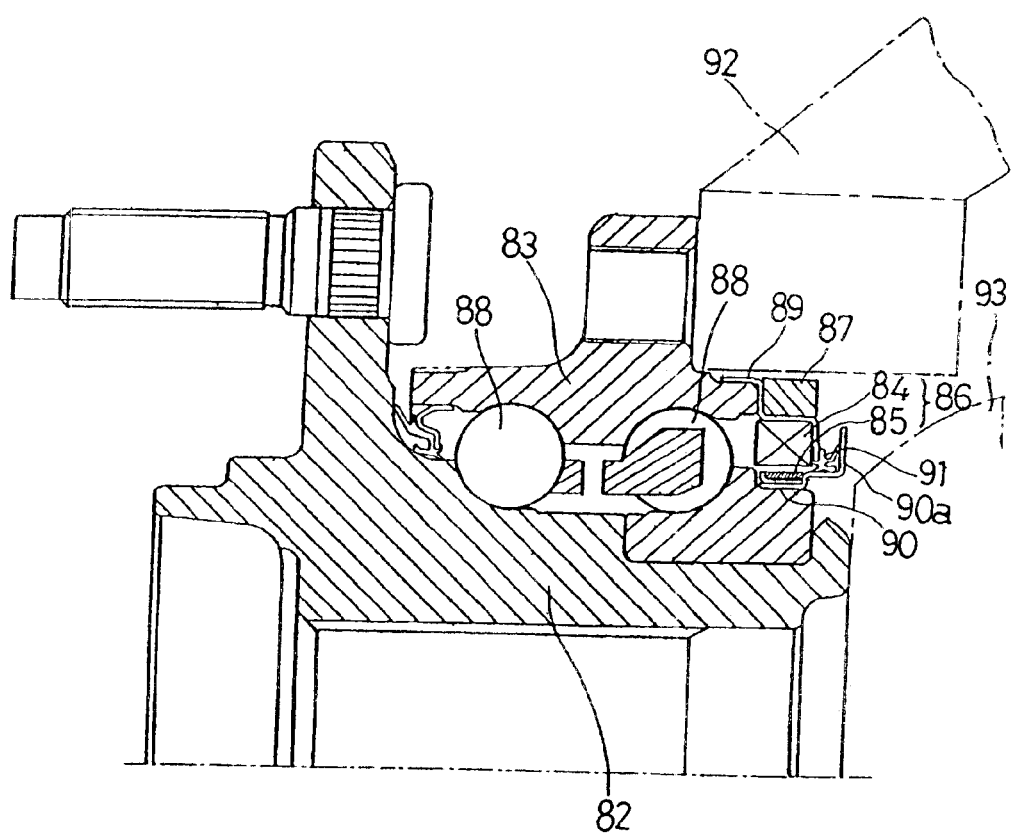
FIG. 39 is a sectional view of the different conventional wheel support bearing assembly.

Yet a still further preferred embodiment of the present invention is shown in FIG. 37. This embodiment of FIG. 37 is similar to the embodiment shown in and described with reference to FIGS. 26 to 28, but differs therefrom in that a rotation detecting sensor 155 is provided inside the magnetic ring assembly 113 of the electric power generator 111. This rotation detecting sensor 155 is comprised of a Hall element or the like. In this case, the sensor 155 detects the rotational speed detection signal in terms of change in polarity of the multi-pole magnet assembly 112 resulting from rotation of the wheel, which signal is transmitted wireless by the wireless transmission device 120 as a radio wave. The electric power generated by the electric power generator 111 is used as an electric power source for the rotation detecting sensor 155 and the wireless transmission device 120. It is to be noted that the rotation detecting sensor 155 referred to above may not always detect only the rotational speed, but may detect any other parameter such as vibrations and/or temperature. Also, the position of the rotation detecting sensor 155 may not be always limited to the inside of the magnetic ring assembly 113, but may be disposed in the outer member 102 or the knuckle 110.

Although in describing any one of the foregoing embodiments the outer race 115a of the constant velocity universal joint 115 has been described as a member separate from the inner member 103 and, hence, has been described as mounted on the inner member 103, the wheel support bearing assembly according to a broad aspect of the present invention may be of a structure in which the outer race 115a of the constant velocity universal joint 115 forms an element that defines a part of the inner member 103 and, therefore, one or more inner raceways 106b may be defined in such outer race 115a.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rotation detecting device which comprises:

a rotatable member rotatably supported on a non-rotatable member;

an electric power generator for generating an electric power by a relative rotation between the non-rotatable member and the rotatable member;

a transmission device for transmitting wireless at least one of a rotational speed detection signal outputted by the electric power generator and an output signal from a sensor that operates using as an electric power source the electric power generated by the electric power generator, said transmission device being of an annular configuration; and a sealing member for sealing a space delimited between the non-rotatable member and the rotatable member;

said electric power generator comprising a multi-pole magnet assembly having a plurality of alternating magnetic poles arranged in a circumferential direction, and a magnetic ring assembly accommodating a coil and confronting the multi-pole magnet assembly;

said wireless transmission device being disposed axially outwardly, but adjacent to the magnetic ring assembly of the electric power generator;

said sealing member being mounted on the wireless transmission device and having a lip member slidingly engaged with a seal contact area defined in the rotatable member; and said magnetic ring assembly and the multi-pole magnet assembly of the electric power generator confronting with each other at a location inwardly of the sealing member.

2. A rotation detecting device which comprises:

a rotatable member rotatably supported on a non-rotatable member;

an electric power generator for generating an electric power by a relative rotation between the non-rotatable member and the rotatable member;

a transmission device for transmitting wireless at least one of a rotational speed detection signal outputted by the electric power generator and an output signal from a sensor that operates using as an electric power source the electric power generated by the electric power generator, said transmission device being of an annular configuration; and a sealing member for sealing a space delimited between the non-rotatable member and the rotatable member;

said electric power generator comprising a multi-pole magnet assembly having a plurality of alternating magnetic poles arranged in a circumferential direction, and a magnetic ring assembly accommodating a coil and confronting the multi-pole magnet assembly;

said wireless transmission device being integrated together with the magnetic ring assembly;

said sealing member being mounted on the wireless transmission device and having a lip member slidingly engaged with a seal contact area defined in the rotatable member; and said magnetic ring assembly and the multi-pole magnet assembly of the electric power generator confronting with each other at a location inwardly of the sealing member.

3. A rotation detecting device which comprises:

a rotatable member rotatably supported on a non-rotatable member;

an electric power generator for generating an electric power by a relative rotation between the non-rotatable member and the rotatable member;

a transmission device for transmitting wireless at least one of a rotational speed detection signal outputted by the electric power generator and an output signal from a sensor that operates using as an electric power source the electric power generated by the electric power generator, said transmission device being of an annular configuration; and a sealing member for sealing a space delimited between the non-rotatable member and the rotatable member;

said electric power generator comprising a multi-pole magnet assembly having a plurality of alternating magnetic poles arranged in a circumferential direction, and a magnetic ring assembly accommodating a coil and confronting the multi-pole magnet assembly;

said wireless transmission device being mounted on the non-rotatable member;

said sealing member being mounted on the wireless transmission device and having a lip member slidingly engaged with a seal contact area defined in the rotatable member; and said magnetic ring assembly and the multi-pole magnet assembly of the electric power generator confronting with each other at a location inwardly of the sealing member.

4. The rotation detecting device as claimed in claim 1, wherein the wireless transmission device has an inner peripheral surface formed with a to-be-engaged portion comprised of a projection or a recess and the sealing member is formed with an engaging portion comprised of a recess or a projection engageable with the to-be-engaged portion on the inner peripheral surface of the wireless transmission device, said sealing member being mounted on the inner peripheral surface of the wireless transmission device with the engaging portion engaged with the to-be-engaged portion.

5. A rotation detecting device which comprises:

a rotatable member rotatably supported on a non-rotatable member;

an electric power generator for generating an electric power by a relative rotation between the non-rotatable member and the rotatable member;

a transmission device for transmitting wireless at least one of a rotational speed detection signal outputted by the electric power generator and an output signal from a sensor that operates using as an electric power source the electric power generated by the electric power generator; and a sealing member for sealing a space delimited between the non-rotatable member and the rotatable member;

said electric power generator comprising a multi-pole magnet assembly having a plurality of alternating magnetic poles arranged in a circumferential direction, and a magnetic ring assembly accommodating a coil and confronting the multi-pole magnet assembly;

said sealing member being mounted on an inner peripheral surface of the magnetic ring assembly and having a lip member slidingly engaged with a seal contact area defined in the rotatable member; and said magnetic ring assembly and the multi-pole magnet assembly of the electric power generator confronting with each other at a location inwardly of the sealing member.

6. The rotation detecting device as claimed in claim 5, wherein the inner peripheral surface of the magnetic ring assembly of the electric power generator is formed with a to-be-engaged portion comprised of a projection or a recess and the sealing member is formed with an engaging portion comprised of a recess or a projection and engageable with the to-be-engaged portion on the inner peripheral surface of the magnetic ring assembly, said sealing member being mounted on the inner peripheral surface of the magnetic ring assembly with the engaging portion engaged with the to-be-engaged portion.

* * * * *